(12) United States Patent
Weaver et al.

(10) Patent No.: US 6,776,930 B2
(45) Date of Patent: Aug. 17, 2004

(54) METHOD FOR PREPARING LIGHT-ABSORBING POLYMERIC COMPOSITIONS

(75) Inventors: Max Allen Weaver, Kingsport, TN (US); James John Krutak, Sr., Kingsport, TN (US); Brian Edison Maxwell, Westfield, MA (US); Gerry Foust Rhodes, Piney Flats, TN (US); Samuel David Hilbert, Jonesborough, TN (US); Jean Carroll Fleischer, Kingsport, TN (US); William Whitfield Parham, Johnson City, TN (US)

(73) Assignee: Eastman Kodak Company, Kingsport, TN (US)

( * ) Notice: Subject to any disclaimer, the term of this patent is extended or adjusted under 35 U.S.C. 154(b) by 0 days.

(21) Appl. No.: 09/751,766

(22) Filed: Dec. 29, 2000

(65) Prior Publication Data

US 2001/0023938 A1 Sep. 27, 2001

Related U.S. Application Data

(60) Division of application No. 09/320,002, filed on May 26, 1999, now Pat. No. 6,197,223, which is a continuation-in-part of application No. 08/976,206, filed on Nov. 21, 1997, now abandoned.
(60) Provisional application No. 60/031,478, filed on Nov. 27, 1996.

(51) Int. Cl.[7] .............................. F21V 9/00; F21V 9/04; C08F 283/00; C08G 63/00
(52) U.S. Cl. ....................... 252/582; 252/587; 252/589; 528/271; 528/272; 525/418; 525/419; 525/450; 525/471; 525/534; 525/535; 525/540
(58) Field of Search ................................ 252/582, 587, 252/589; 525/418, 419, 450, 471, 534, 535, 540; 526/271, 272

(56) References Cited

U.S. PATENT DOCUMENTS

| | | | |
|---|---|---|---|
| 2,994,693 A | 8/1961 | Blake et al. | |
| 3,403,200 A | 9/1968 | Randall | |

(List continued on next page.)

FOREIGN PATENT DOCUMENTS

| | | |
|---|---|---|
| BE | 680 765 | 11/1966 |
| CH | 396 833 | 1/1966 |
| DE | 2 333 828 | 1/1974 |
| EP | 0 040 139 | 11/1981 |
| EP | 0 356 080 | 2/1990 |
| EP | 0 417 017 | 3/1991 |
| FR | 2 243 194 | 4/1974 |
| FR | 2 229 807 | 12/1974 |
| FR | 2 269 566 | 11/1975 |
| JP | 08 220 714 | 8/1996 |
| WO | WO 96 13553 | 5/1996 |

OTHER PUBLICATIONS

The Chemistry of Synthetic Dyes, vol. 8, K. Venkataraman, Editor, Academic Press, New York, 1978, pp. 81–131.

Dyes and Pigments, M. Weaver and L. Shuttleworth, 3 (1982), pp. 81–121.

Chem. Appl. Dyes, L. Shuttleworth and M. Weaver, Edited by D. Waring and G. Hallas, Pleanum, New York, NY, 1990, pp. 107–163.

Dyes and Pigments, H. R. Schwander, 3 (1982), pp. 133–160.

Plastics Additives Handbook, R. Gächter and H. Müeller, Editors, Hansu Publishers, New York, 1985, pp. 507–533 and 729–741.

*Primary Examiner*—Philip C. Tucker
(74) *Attorney, Agent, or Firm*—Eastman Chemical Company

(57) ABSTRACT

The present invention recites a method comprising reacting in a solvent in the presence of a base a) at least one diacidic monomer comprising about 1 to 100 mole % of at least one light-absorbing monomer having a light absorption maximum between about 300 nm and about 1200 nm and 99-0 mole % of a non-light absorbing monomer which does not absorb significant light at wavelengths above 300 nm or has a light absorption maximum below 300 nm, with b) an organic compound of Formula II

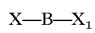

wherein B is a divalent organic radical to form a light absorbing composition comprising a mixture of a polymer having the formula

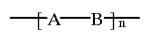

and a cyclic compound having the general formula

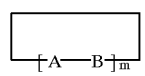

wherein B is as defined above; n is at least 2, m is 1, 2, 3 or 4 and A comprises the residue of a diacidic monomer comprising about 1 to 100 mole % of at least one light-absorbing monomer having a light absorption maximum between about 300 nm and about 1000 nm and wherein the remaining portion of A comprises the residue of a non-light absorbing monomer which does not absorb significant light at wavelengths above 300 nm or has a light absorption maximum below 300 nm.

48 Claims, No Drawings

U.S. PATENT DOCUMENTS

| | | |
|---|---|---|
| 3,438,961 A | 4/1969 | Wallace et al. |
| 3,573,273 A | 3/1971 | Seedfelder et al. |
| 3,639,384 A | 2/1972 | Weaver et al. |
| 3,639,385 A | 2/1972 | Weaver et al. |
| 3,657,215 A | 4/1972 | Weaver et al. |
| 3,673,169 A | 6/1972 | Weaver et al. |
| 3,689,501 A | 9/1972 | Weaver et al. |
| 3,707,532 A | 12/1972 | Artz et al. |
| 3,790,557 A | 2/1974 | Weaver et al. |
| 3,816,388 A | 6/1974 | Weaver et al. |
| 3,816,392 A | 6/1974 | Weaver et al. |
| 3,829,410 A | 8/1974 | Fisher et al. |
| 3,878,189 A | 4/1975 | Coates et al. |
| 3,919,188 A | 11/1975 | Hagen et al. |
| 3,950,130 A | 4/1976 | Renfrew et al. |
| 3,980,634 A | 9/1976 | Weaver |
| 4,012,372 A | 3/1977 | Weaver et al. |
| 4,039,522 A | 8/1977 | Weaver et al. |
| 4,041,025 A | 8/1977 | Maier et al. |
| 4,049,643 A | 9/1977 | Weaver et al. |
| 4,083,684 A | 4/1978 | Hansen et al. |
| 4,083,844 A | 4/1978 | Gottschlich et al. |
| 4,097,475 A | 6/1978 | James |
| 4,105,655 A | 8/1978 | Gottschlich et al. |
| 4,116,923 A | 9/1978 | Gattner et al. |
| 4,119,621 A | 10/1978 | Hansen et al. |
| 4,140,683 A | 2/1979 | Weaver et al. |
| 4,179,435 A | 12/1979 | Ramanathan |
| 4,180,503 A | 12/1979 | vor der Bruck et al. |
| 4,189,503 A | 2/1980 | Giguere |
| 4,207,233 A | 6/1980 | Seybold et al. |
| 4,211,696 A | 7/1980 | Baird et al. |
| 4,234,482 A | 11/1980 | Brouard et al. |
| 4,264,495 A | 4/1981 | Maher et al. |
| 4,267,306 A | 5/1981 | Davis et al. |
| 4,283,332 A | 8/1981 | Gourley |
| 4,338,247 A | 7/1982 | Zannucci et al. |
| 4,341,700 A | 7/1982 | Matzinger |
| 4,359,570 A | 11/1982 | Davis et al. |
| 4,396,547 A | 8/1983 | Weaver et al. |
| 4,400,318 A | 8/1983 | Weaver et al. |
| 4,403,092 A | 9/1983 | Davis et al. |
| 4,431,585 A | 2/1984 | Tappe et al. |
| 4,456,551 A | 6/1984 | Weaver et al. |
| 4,487,719 A | 12/1984 | Weaver et al. |
| 4,542,207 A | 9/1985 | Niwa et al. |
| 4,564,673 A | 1/1986 | Niwa et al. |
| 4,617,373 A | 10/1986 | Pruett et al. |
| 4,617,374 A | 10/1986 | Pruett et al. |
| 4,619,990 A | 10/1986 | Elmasry |
| 4,619,991 A | 10/1986 | Matzinger |
| 4,619,992 A | 10/1986 | Bergmann et al. |
| 4,621,136 A | 11/1986 | Imahori et al. |
| 4,642,339 A | 2/1987 | Niwa et al. |
| 4,650,861 A | 3/1987 | Weaver et al. |
| 4,668,775 A | 5/1987 | Bergmann et al. |
| 4,707,537 A | 11/1987 | Pruett et al. |
| 4,734,490 A | 3/1988 | Schwander et al. |
| 4,740,581 A | 4/1988 | Pruett et al. |
| 4,749,774 A | 6/1988 | Weaver et al. |
| 4,751,288 A | 6/1988 | Bergmann et al. |
| 4,760,133 A | 7/1988 | Niwa et al. |
| 4,764,600 A | 8/1988 | Bergmann et al. |
| 4,778,742 A | 10/1988 | Ong et al. |
| 4,804,719 A | 2/1989 | Weaver et al. |
| 4,826,903 A | 5/1989 | Weaver et al. |
| 4,837,269 A | 6/1989 | Etzbach et al. |
| 4,841,036 A | 6/1989 | Imahori et al. |
| 4,843,153 A | 6/1989 | Eilingsfeld et al. |
| 4,845,187 A | 7/1989 | Weaver et al. |
| 4,888,432 A | 12/1989 | Hamprecht |
| 4,892,922 A | 1/1990 | Weaver et al. |
| 4,933,426 A | 6/1990 | McClelland et al. |
| 4,950,732 A | 8/1990 | Weaver et al. |
| 4,960,874 A | 10/1990 | Bergmann et al. |
| 4,981,516 A | 1/1991 | Kluger et al. |
| 4,999,418 A | 3/1991 | Krutak et al. |
| 5,030,708 A | 7/1991 | Krutak et al. |
| 5,032,670 A | 7/1991 | Parham et al. |
| 5,037,966 A | 8/1991 | Naef |
| 5,057,594 A | 10/1991 | Krutak et al. |
| 5,102,978 A | 4/1992 | Richard, Jr. |
| 5,102,980 A | 4/1992 | Krutak et al. |
| 5,106,942 A | 4/1992 | Krutak et al. |
| 5,132,411 A | 7/1992 | Egli et al. |
| 5,144,015 A | 9/1992 | Chapman |
| 5,194,463 A | 3/1993 | Krutak et al. |
| 5,194,571 A | 3/1993 | Weaver et al. |
| 5,235,047 A | 8/1993 | Krutak et al. |
| 5,243,021 A | 9/1993 | Langer et al. |
| 5,283,326 A | 2/1994 | Hansen et al. |
| 5,296,325 A | 3/1994 | Ohtsuka et al. |
| 5,310,837 A | 5/1994 | May |
| 5,334,710 A | 8/1994 | Ahlheim et al. |
| 5,352,774 A | 10/1994 | Hansen et al. |
| 5,359,008 A | 10/1994 | Amano et al. |
| 5,384,377 A | 1/1995 | Weaver et al. |
| 5,401,612 A | 3/1995 | Etzbach et al. |
| 5,432,248 A | 7/1995 | Bonfanti et al. |
| 5,434,231 A | 7/1995 | Wiesenfeldt et al. |
| 5,461,131 A | 10/1995 | Wiesenfeldt et al. |
| 5,466,777 A | 11/1995 | Caruso et al. |
| 5,504,183 A | 4/1996 | Shi et al. |
| 5,670,603 A | 9/1997 | Wu et al. |
| 5,691,053 A | 11/1997 | Gailberger et al. |
| 5,955,564 A | 9/1999 | Weaver et al. |
| 6,197,223 B1 * | 3/2001 | Weaver et al. ............... 252/582 |

\* cited by examiner

METHOD FOR PREPARING LIGHT-ABSORBING POLYMERIC COMPOSITIONS

RELATED APPLICATION

This is a divisional application of U.S. patent application Ser. No. 09/320,002, filed May, 26, 1999 now U.S. Pat. No. 6,197,223, which is a continuation-in-part of our application Ser. No. 08/976,206 filed Nov. 21, 1997, now abandoned which is based upon and claims the priority of provisional application Ser. No. 60/031,478 filed Nov. 27, 1996.

BACKGROUND OF THE INVENTION

This invention relates to an improved method for preparing light-absorbing polymeric compositions, which are useful as powders or pellets for incorporation into a variety of thermoplastic resins such as cellulose esters, polyesters, polyolefins, polycarbonates, polyamides, etc. by conventional melt or solution blending techniques. The colored thermoplastic resins thus produced have good clarity, good color development, excellent fastness to light and are useful for a variety of end uses where nonhazardous, nonmigrating, or nonextractable colorants are needed.

It is well-known that thermoplastic polymers may be colored by adding pigments or solvent dyes (e.g., see Thomas G. Weber, Editor, *Coloring of Plastics*, John Wiley & Sons, New York, 1979). The use of pigments, however, is accompanied by undesirable properties such as opacity, dullness of color, low tintorial strength, etc. Also, difficulties in uniformly blending the insoluble pigments with the thermoplastic resin are often encountered. Also useful for coloring thermoplastic polymers are the solvent dyes (K. Venkataraman, Editor, *The Chemistry of Synthetic Dyes*, Vol. 8, Academic Press, New York, 1978, pp. 81–131), which provide compositions having improved clarity, brightness in hue and high tinctorial strength, but which may lead to dye migration, extraction, etc. from the colored thermoplastic polymer. These problems are of particular concern when solvent dyes are used to color flexible polymers such as polyvinyl chloride, polyethylene and polypropylene which have low glass transition temperatures.

Plastics, paints, printing inks, rubber, cosmetics, and similar materials are typically colored by organic pigments when superior brilliance and tinctorial strength are important. Toxicity considerations have presented chronic problems relative to the use of organic pigments since some have been shown to be potential carcinogens and to cause contact dermatitis.

Plastics are also colored by using color concentrates consisting of physical admixtures of polymers and colorants (usually solvent dyes). However, the use of such physical admixtures to color polymeric materials such as polyester, e.g., poly(ethylene terephthalate) and blends thereof, present a number of problems, including:

Colorant migration during drying of the colored polyester pellets.

Colorant migration during extrusion and colorant accumulation on dies which can cause shutdowns for clean-up. Such colorant migration and accumulation result in time consuming and difficult clean-up, particularly when a polymer of another color is subsequently processed on the same equipment.

Colorants may not mix well, for example, when using two or more color cencentrates to obtain a particular shade.

Colorants may diffuse or exude during storage and use of the colored polymeric material.

The colored polymeric compositions which are prepared by the process of this invention eliminate or minimize the aforementioned problems associated with the use of conventional dyes and pigments.

PRIOR ART

To attempt to overcome some of the problems mentioned above, particularly as relates to coloring polyesters, colored polyester compositions have been prepared by copolymerizing relatively low amounts of monomeric colorants during the polymer preparation (U.S. Pat. Nos. 5,194,571; 5,106,942; 5,102,980; 5,032,670; 4,892,922; 4,740,581; 4,403,092; 4,359,570; 4,267,306 and W092/07913). However, the preparation of these colored polymers require dyes having outstanding thermal stability since the colorants are exposed to very high temperatures for prolonged periods of time necessary for polyester formation, thus severely circumscribing the selection of efficacious colorants. For example, only the nonazo type colorants have been shown to have the adequate thermal stability for copolymerization into polyesters, since azo type compounds do not have the resquite thermal stability for copolymerization.

Furthermore, it is known to prepare polymeric dyes by reacting dyes containing reactive hydroxy and amino groups with organic di-acid chlorides in solvents (U.S. Pat. Nos. 2,994,693; 3,403,200; 4,619,990; 4,778,742; 5,401,612). Although this method of polymer preparation allows the use of a wide range of chromophoric classes, including azo compounds, as colorant monomers, the polymerization reaction in each case involves the use of very reactive organic di-acid chlorides which are toxic and involve difficult to handle inorganic halogen compounds in their preparation and have accompanying problems of hydrolysis in the presence of water which causes serious handling and storage problems. The hydrolysis product (HCl) is particularly corrosive and makes storage of these compounds difficult. Furthermore, since the di-acid chlorides will react with water, the monomeric dyes must be specially dried to avoid side reactions in the polymer preparation.

In a similar attempt to prepare polymeric dyes using relatively low temperatures, polyurethanes have been prepared by reacting dyes bearing two hydroxyalkyl group with aliphatic and aromatic isocyanates (U.S. Pat. No. 5,194,463). However, the organic isocyanates themselves are extremely toxic and present difficult handling problems. They also are reactive with water and thus the reaction requires specially dried monomeric dyes. Also, the colored polyurethanes as a class do not have excellent thermal stability.

It is further known to prepare colored condensation polymers by reacting a polymerizable lactone or a hydroxyalkanoic acid with a dye containing reactive hydroxy group (U.S. Pat. No. 4,933,426). The procedure again requires relatively high reaction temperatures and prolonged times and use a large excess of the lactone reactant. The method is further hindered by the fact that some lactones are suspected carcinogens.

Light-absorbing polymeric compositions have also been produced by free radical polymerization of vinyl functionalized light-absorbing monomers (U.S. Pat. Nos. 5,310,837; 5,334,710; 5,359,008; 5,434,231 and 5,461,131).

Finally, it is known that one may color plastics, in particular polyolefins, with low melting, cross-linked colored polyester compositions containing residues of terephthalic acid, isophthalic acid, or both, a low-molecular weight trimethylol alkane, i.e., 1,1,1-trimethylol propane and a copolymerizable colorant, said colorant being present at a level of 0.1–25% by weight (U.S. Pat. No. 4,116,923). Difficulties are encountered, however, in preparing these highly cross-linked colored polymers as extreme care with regard to the temperature, amount of vacuum, the level of colorant present, and the reaction time, is necessary in order to attempt to reproduce the same quality of cross-linked colored polyester composition. Further, these colored polyester compositions are brittle or low melting and may cause deterioration in physical properties of themoplastic polymers when added in quantities sufficient to produce a high level of coloration.

PRACTICE OF THE INVENTION

This invention relates to a method for preparing a light absorbing linear polymeric having Formula I

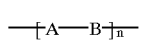  I wherein A comprises the residue of a diacidic monomer comprising about 1 to 100 mole % of at least one light-absorbing monomer having a light absorption maximum between about 300 nm and about 1200 nm and wherein the remaining portion of A comprises the residue of a non-light absorbing monomer which does not absorb significantly at wavelengths above 300 nm or has a light absorption maximum below 300 nm and wherein B is a divalent organic radical selected from $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, $C_2$–$C_4$ alkylene-O—$C_2$–$C_4$ alkylene, and $C_2$–$C_4$-alkylene-L-arylene-$C_2$–$C_4$ alkylene and $C_2$–$C_4$ alkylene-(L-$C_2$–$C_4$ alkylene)$_{1-4}$, wherein L is a linking group selected from—O—, —S—, —$SO_2$—, —NH—, —N($C_1$–$C_6$ alkyl)-, —N(aryl)-, —N($SO_2$ $C_1$–$C_6$ alkyl)-, —N($SO_2$aryl)-, —$SO_2$N($C_1$–$C_6$ alkyl)- and combinations thereof; wherein n is at least 2.

The process comprises reacting said diacidic monomer with an organic compound of Formula II

X—B—$X_1$  II wherein B is as defined above and X and $X_1$ reactive groups and are independently selected from bromine, iodine and R—$SO_2$O; wherein R is selected from $C_1$–$C_6$ alkyl; $C_1$–$C_6$ alkyl substituted with chlorine, fluorine, $C_1$–$C_6$ alkoxy, aryl, aryloxy, arylthio or $C_3$–$C_8$ cycloalkyl; $C_3$–$C_8$ cycloalkyl or aryl, with said reaction being carried out in a solvent in the presence of a base; wherein the useful diacid light-absorbing monomers have Formula III

  III wherein H represents an acidic hydrogen atom; Y is a divalent light-absorbing moiety selected from a variety of chromophoric classes including azo, disazo, bis-azo, methine, arylidene, polymethine, azo-methine, azamethine, anthraquinone, anthrapyridone (3H-dibenz[f,ij] isoquinoline-2,7-dione, nitroarylamines anthrapyridine (7H-dibenz[f,ij]isoquinoline-7-one, phthaloylphenothiazine (14H-naphth[2,3-a] phenothiazine-8,13-dione, benzanthrone(7H (de) anthracene-7-one), anthrapyrimidine (7H-benzo[e] perimidine-7-one), anthrapyrazole, anthraisothiazole, triphenodioxazine, thiaxanthene-9-one, fluorindine (5,12-dihydroquinoxaline[2,3-b]phenazine, quinophthalone, phthalocyanine, metal phthalocyanine, naphthalocyanine, metal naphthalocyanine, nickel dithiolenes, squarylium compounds, croconium compounds, coumarin (2H-1-benzopyran-2-one), coumarin imine (2H-1-benzopyran-2-imine), perinone, benzodifuran, phthaloylacridone, phthaloylphenoxazine (14H-naphtho[2,3-a]phenoxazine-8,13-done, phthaloylacridone (13H-naphtho[2,3-c]acridine-5,8,14-trione), anthraquinonethioxanthane (8H-naphtho[2,3-c]thioxanthene-5,8,13-trione, anthrapyridazone, pyrrolo[3,4-c]pyrrole, indigo, thioindigo, quinoline, xanthene, acridine, azine, cyanine, oxazine, 1,4 and 1,5-naphthoquinones, 2,5-diarylaminoterephthalic acids and esters, pyromellitic acid dimide, naphthalene-1,4,5,8-tetracarboxylic acid diimide, 3,4,9,10-perylene-tetracarboxylic acid diimide, 3-aryl-2,5-dioxypyrroline, 3-aryl-5-dicyanomethylene-2-oxopyrroline, arylisoindoline, hydroxybenzophenone, benoztriazole, naphthotriazole, diminoisoindoline, naphthopyran (3H-naphtho[2,1–6] pyran-3-one and 3-imine, phthalimides, 2-arylbenzazoles, carbostyryls, 1,2-diarylethenes, 2,5-diarylthiophenes, 2,5-diaryl-1,3,4-oxadiazoles, triazines, 2,5-diarylfurans, 2,5-diaryl-1,3,4-thiadiazoles, thiophenes, 1,3-diphenyl-2-pyrazolines, 2-arylbenzofurans, 2,6-diphenylbenzofurans, quinolines, quinoxalines, 3,4-diarylfuanones, distyrylarenes, benzanthrones, polyarenes and naphthalimides; wherein the hydrogen atoms of Formula III are independently bonded to an oxygen, sulfur, or nitrogen atom which is a part of the light absorbing moiety Y; wherein the useful non light-absorbing monomers have Formula IV,

  IV wherein H represents an acidic hydrogen atom; $Y_1$ is a divalent moiety, selected from—$O_2C$—$R_1$—$CO_2$— and —O—$R_2$—O— and—$O_2C$—$R_3$—O—, wherein $R_1$ is selected from $C_2$–$C_{12}$ alkylene, 1–4-cyclohexylene, arylene, arylene-O-arylene, arylene-$SO_2$-arylene, arylene-S-arylene, and $C_1$–$C_4$ alkylene-O-$C_1$–$C_4$ alkylene; wherein $R_2$ is selected from arylene, arylene-O-arylene, arylene-S-arylene, arylene-$SO_2$-arylene, phenylene-phenylene, and phenylene-C($R_4$)$_2$-phenylene; wherein $R_4$ is selected from hydrogen and $C_1$–$C_4$ alkyl; wherein $R_3$ is selected from arylene.

In diacid light absorbing monomers having Formula III, the hydrogen atoms are preferably attached to an oxygen, a sulfur or a nitrogen atom which in combination provides two acidic functional group which can produce the corresponding anions under basic conditions by removal of the protons. The acidic functional groups usually have an acid dissociation constant of about $10^{-1.5}$ to about $10^{-12}$ (pK$_a$ of from about 1.5 to about 12). In the case of nitrogen, both protons may be attached to a single nitrogen which is attached to a sulfonyl moiety thus providing two acidic hydrogens on a single functional group.

Typical, acidic groups which provide one acidic hydrogen include—$CO_2H$, —SH, —OH attached to an aromatic ring, —CONHCO—, —$SO_2$—NH—CO—, —$SO_2$—NH—$SO_2$—, 1(H)-1,2,4-triazol-3-yl-, imidazolyl, benzimidazolyl, pyrazolyl, —$SO_2H$ attached to aromatic ring, —NH$SO_2R_5$ and—$SO_2NHR_5$, wherein $R_5$ is selected from $C_1$–$C_6$ alkyl; $C_1$–$C_6$ alkyl substituted with at least one group selected from $C_1$–$C_6$ alkoxy, aryl, aryloxy, arylthio or $C_3$–$C_8$ cycloalkyl; $C_3$–$C_8$ cycloalkyl; aryl.

An example of an acidic functional group providing two acidic hydrogen attached to nitrogen is the sulfamoyl group (—$SO_2NH_2$).

The preferred method for producing light absorbing polymeric compositions utilizes the monomers of Formula III, wherein the protons are a part of the—$CO_2H$, OH attached to aromatic ring, —CO—NH—CO— or 1(H)-1,2,4-triazol-3-yl functional groups. The carboxy groups are normally attached to an aromatic ring carbon or aliphatic carbon which is a part of Y. The hydroxy groups are normally attached to an unsubstituted or substituted phenyl or naphthyl radical which is a part of Y. The —CO—NHCO— groups are usually attached to an aromatic ring to provide an imide such as phthalimide or naphthalimide which are a part of Y. The 1(H)-1,2,4-triazol-3-yl group has the following Formula V, wherein $R_5'$ is

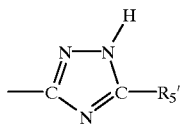

V selected from hydrogen, $C_1$–$C_6$ alkyl or aryl. It should be observed that the triazole may exist in isomeric form as follows:

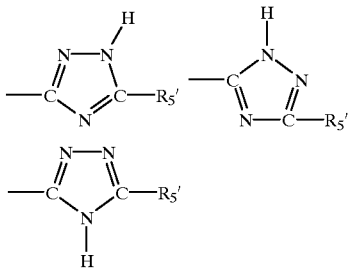

The 1(H)-1,2,4-triazol-3-yl group is preferably attached to a sulfur atom which is attached to the remainder of Y.

The method of the invention in the broadest sense involves the preparation of light absorbing polymeric compositions by reacting a diacidic monomer comprising at least 1 mole % of at least one diacidic light absorbing monomer represented by H—A—H with an organic compound containing two reactive groups represented by X—B—$X_1$, where B, X and $X_1$ are as defined above. Thus, the method may be summarized as:

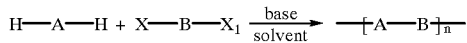

The diacidic monomer H—A—H must be acidic enough to form two nucleophiles in the presence of base under convenient reaction conditions for the most advantageous process. This usually requires that diacidic monomers have $pK_a$ values of about 12 or below.

The dinucleophilic monomer, formed by the removal of the two hydrogen atoms by the base, attacks the electrophilic compound II, thus displacing anions $X^-$ and $X_1^-$, with head-to-tail combination with covalent bonding to produce a linear polymer $-[A—B]_n-$, wherein n represents the number of repeating units. The number of repeating units must be at least 2, but usually ranges between about 2 and about 25, with the preferred number being between about 3 and about 15.

The composition produced by the method of the invention comprises, as stated above, a polymer having the general formula $-[A—B]_n-$. The composition also comprises one or more cyclic compounds having the general formula

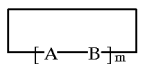

I-A wherein m may be 1, 2, 3, or 4, e.g., the cyclic compounds having the general structures:

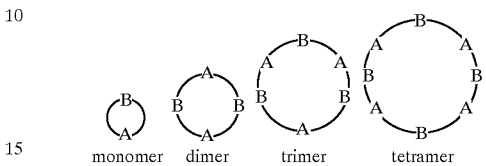

monomer    dimer    trimer    tetramer

The number and concentrations of the cyclic compounds is dependent upon a variety of factors such as the structure of diacid H—A—H, the structure of the organic compound X—B—$X_1$, and the conditionss used to facilitate the reaction to produce the composition. The cyclic compounds may constitute up to about 35 weight percent, typically about 0.5 up to 30 weight percent, of the total weight of the composition produced by the method of the invention.

Suitable bases include alkali metal carbonates; alkali metal bicarbonates; tertiary amines such as triethylamine, tri-n-butylamine, N-methylpiperidine, N,N'-dimethylpiperazine, N-methylmorpholine, N,N,N',N'-tetramethylenediamine, etc.; aromatic nitrogen bases such as pyridines, picolines, quinolines, isoquinolines, N-alkylpyrroles, N-alkylimidazoles, etc.; bicyclic nitrogen containing bases having non-hindered electron pairs, such as 1,8-diazabicyclo[4,3,0]undec-7-ene (DBU), 1,5-diazabicylco[4,3,0]non-5-ene (DBN) and 1,4-diazadicyclo[2,2,2]octane (DABCO®).

Typical solvents useful in the polymerization reaction include aprotic polar solvents such as N,N-dimethylacetamide, N,N-dimethylformamide, N-methyl-2-pyrrolidone, N-methyl-N-phenyl formamide, dimethyl sulfoxide, aliphatic nitrites, sulfolane, hexamethyl phosphoramide, etc. and mixtures thereof. Water, alcohols, ketones pyridine and ether-alcohols, such as the Cellosolves, also are sometimes useful. One requirement is that the solvent not form a stronger nucleophile in the presence of the base than that obtained from the diacidic monomer H—A—H.

The new improved process of the invention allows the preparation of near ultraviolet (UV-A, UV-B and UV-C), visible and near infrared light absorbing linear polymeric compositions at relatively low temperatures, usually at from about 75° C. to about 125° C., without prolonged heating times. Furthermore, the method is adaptable to batch-process production which is advantageous for expensive products such as colorants, near infrared absorbers and near ultraviolet absorbers. The method is adaptable to a wide range of chromophoric classes since the polymer preparative reaction is carried out at relatively low temperature, which for example, allows colored polymeric compositions to be readily prepared from the very important azo class of colorants.

The preferred reactants of Formula II

are the disulfonate compounds where X and $X_1$ are both a sulfonate ester of the formula —$OSO_2R$, wherein R is selected from $C_1$–$C_4$ alkyl, phenyl or p-methylphenyl and wherein B is selected from $C_2$–$C_6$ alkylene, —$CH_{2-1,4}$-cyclohexylene-$CH_2$—, 2,2,4,4-tetramethyl-1,3-cyclobutylene, 1,4-cyclohexylene, —$CH_2CH_2(OCH_2CH_2)_{2-3}$ and —$CH_2CH_2O$-1,4-phenylene-O—$CH_2CH_2$—. Particularly, preferred reactants of Formula II are those where B is selected from —$CH_2CH_2$—, —$CH_2CH(CH_3)CH_2$—, —$CH_2C(CH_3)_2CH_2$—, —$(CH_2)_4$—, —$(CH_2)_6$—, —$CH_2CH_2(OCH_2CH_2)_{1-4}$ and —$CH_2$-1,4-cyclohexylene-$CH_2$—.

Typical reactants of Formula II are as follows:

$CH_3SO_2OCH_2CH_2OSO_2CH_3$
1,2-Ethanediol,
dimethanesulfonate

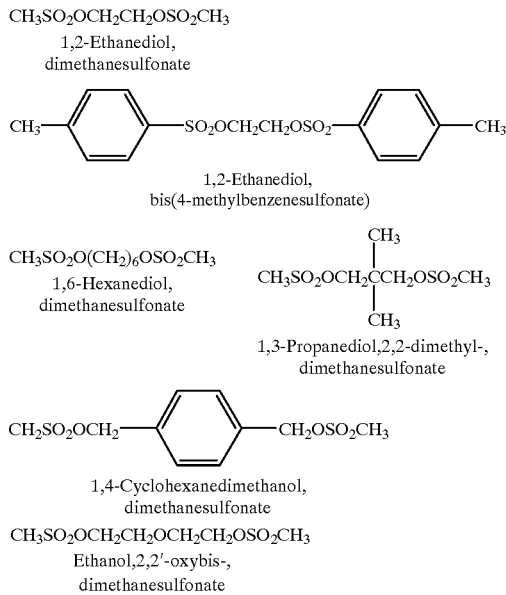

1,2-Ethanediol,
bis(4-methylbenzenesulfonate)

$CH_3SO_2O(CH_2)_6OSO_2CH_3$
1,6-Hexanediol,
dimethanesulfonate $CH_3SO_2OCH_2\overset{\underset{\displaystyle CH_3}{|}}{\underset{\underset{\displaystyle CH_3}{|}}{C}}CH_2OSO_2CH_3$ 1,3-Propanediol,2,2-dimethyl-,
dimethanesulfonate 1,4-Cyclohexanedimethanol,
dimethanesulfonate $CH_3SO_2OCH_2CH_2OCH_2CH_2OSO_2CH_3$
Ethanol,2,2'-oxybis-,
dimethanesulfonate The invention also relates to a light absorbing linear polymeric composition having Formula Ia:

Ia wherein $A_1$ comprises the residue of at least one diacidic monomer having a light absorption maximum between about 300 nm and about 1200 nm, preferably between about 325 nm and 1100 nm and most preferably between about 350 nm and 1000 nm and wherein B is defined above and which has been prepared by reacting a diacid light-absorbing monomer of Formula III (H—Y—H) as defined above with an organic compound having Formula II (X—B—$X_1$) as defined above, with the polymer producing reaction having been carried out in a solvent in the presence of base. The above-described light absorbing composition of formula Ia also contains or comprises one or more cyclic compounds having the formula I-B
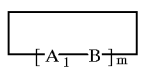

wherein $A_1$ and B are defined above and m may be 1, 2, 3, or 4. As stated hereinabove, the number and concentrations of the cyclic compounds is dependent upon a variety of factors such as the structure of diacid H—A—H, the structure of the organic compound X—B—$X_1$, and the conditions used to facilitate the reaction to produce the composition.

The cyclic compounds of formula I-B may constitute up to about 35 weight percent, typically about 1 up 30 weight percent, of the total weight of the above-described light absorbing composition.

The invention also relates to a light absorbing linear polymeric composition having Formula Ib Ib
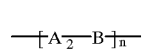

wherein $A_2$ comprises the residue of at least one diacidic monomer, having a light absorption maximum between about 300 nm and about 1200 nm, preferably between about 325 nm and 1100 nm and most preferably between about 350 nm and 1000 nm and which comprises at least about 50% by weight of the total of the composition of Formula Ib and wherein the remainder of $A_2$ comprises the residue of at least one non-light absorbing monomer of Formula IV above, and wherein said polymeric composition has been prepared by reacting diacidic monomers of Formula III and Formula IV with an organic compound having Formula II above, with the polymer producing reaction having been carried out in a solvent in the presence of base. The light absorbing composition of formula Ib also contains or comprises one or more cyclic compounds having the formula I-C

wherein $A_2$ and B are defined above and m may be 1, 2, 3, or 4. Again, the number and concentrations of the cyclic compounds is dependent upon a variety of factors such as the structure of diacid H—A—H, the structure of the organic compound X—B—$X_1$, and the conditions used to facilitate the reaction to produce the composition. The cyclic compounds of formula I-B may constitute up to about 35 weight percent, typically about 1 up 30 weight percent, of the total weight of the above-described light absorbing composition.

The polymer compositions of Formula I, Ia, and Ib and the cyclic compositions of formulas I-A, I-B and I-C are referred to as "polydyes" herein when they absorb visible light thus rendering them strongly colored.

The invention further relates to a thermoplastic polymeric composition which comprises a thermoplastic polymer blended with at least one light absorbing linear polymeric composition of Formula I, Ia or Ib above which, as noted above, contain or comprise one or more cyclic compounds having the general formula I-A. The thermoplastic polymeric composition is usually selected from polyesters, polyolefins, polyamides, polyimides, polyvinyl chloride, polyurethanes, polycarbonates, cellulose esters, polyacrylates, polyvinylesters, polyester-amides, polystyrene, polyacrylonitrile-butadiene-styrene and polystyrene-acrylonitrile. The preferred thermoplastic polymeric composition comprises the light-absorbing polymeric compositions of Formula Ia.

The invention also relates to some of the diacidic light absorbing monomers used to prepare the light absorbing polymeric composition of Formula I, Ia, or Ib.

Preferred azo compounds useful in the practice of the invention correspond to Formula VI $R_6$—N=N—Z    VI wherein $R_6$ is the residue of an aromatic or heteroaromatic amine which has been dizaotized and coupled with a coupling component H—Z and is preferably derived from the aromatic and heteroaromatic amine classes of aniline, 1-aminonaphthalene, 1-aminoanthraquinone, 4-aminoazobenzene, 2-aminothiazole, 2-aminobenzothiazole, 3-amino-2,1-benzisothiazole, 2-aminothieno[2,3-d]thiazole, 5-aminoisothiazole, 5-aminopyrazole, 4-aminopyrazoloisothiazole, 2-amino-1,3,4-thiadiazole, 5-amino-1,2,4-thiadiazole, 5-amino-1,2,3-triazole, 2-amino-1,3,4-triazole, 2(5) aminoimidazole, 3-aminopyridine, 2(3) aminothiophene, 2(3) aminobenzo[b]thiophene, 2-aminothieno[3,2-b]thiophene, 3-aminothieno[2,3-c]isothiazole, 3-amino-7-benz-2,1-isothiazole, 3-aminobenzothienoisothiazole, 3-aminoisothiazole[3,4-d]pyrimidine, 5-amino-1,2,3-triazole, 3(4) aminophthalimide and 5(6) amino-1,2-benzisothiazolon-1,1-dioxide with said aromatic and heteroaromatic ring systems being unsubstituted or substituted with one or more groups selected from $C_1$–$C_{10}$ alkyl, $C_1$–$C_6$ alkoxy, $C_3$–$C_8$ cycloalkyl, carboxy, halogen, $C_1$–$C_6$ alkoxycarbonyl, formyl, $C_1$–$C_6$ alkanoyl, $C_1$–$C_6$ alkanoyloxy, dicyanovinyl, $C_3$–$C_8$-cycloalkanoyl, thiocyano, trifluroacetyl, cyano, carbamoyl, —CONH $C_1$–$C_6$ alkyl, CONHaryl, CON($C_1$–$C_6$ alkyl)$_2$, sulfamoyl, $SO_2NH$ $C_1$–$C_6$ alkyl, $SO_2N(C_1$–$C_6$ alkyl)$_2$, $SO_2NH$aryl, $SO_2NH$ $C_3$–$C_8$ cycloalkyl, CONH $C_3$–$C_8$ cycloalkyl, aryl, aroyl, —$NHSO_2$ $C_1$–$C_6$ alkyl, —N($C_1$–$C_6$ alkyl)$SO_2$ $C_1$–$C_6$ alkyl, —$NHSO_2$ aryl, NHCO $C_1$–$C_6$ alkyl, NHCO $C_3$–$C_8$ cycloalkyl, NHCOaryl, $NHCO_2$ $C_1$–$C_6$ alkyl, NHCONH $C_1$–$C_6$ alkyl, NHCONHaryl, N($C_1$–$C_6$ alkyl)aryl, arylazo, heteroaryl, aryloxy, arylthio, $C_3$–$C_8$ cycloalkoxy, heteroarylazo, heteroarylthio, arylsulfonyl, tricyanovinyl, aryloxysulfonyl, $C_1$–$C_6$ alkylsulfonyl, trifluoromethyl, fluorosulfonyl, trifluoromethylsulfonyl, thiocyano, hydroxy, nitro or CH═D, wherein D is the residue of an active methylene compound as defined below.

Z is the residue of an electron rich coupling component selected from the classes of anilines, 1-aminonaphthalenes, 1,2-dihydroquinolines, 1,2,3,4-teterahydroquinolines, benzmorpholines (3,4-dihydro-2H-1,4-benzoxazine), pyrazolones, pyrazoles, 3-cyano-6-hydroxy-2-pyridones, 2,3-dihydroindoles, indoles, 4-hydroxycoumarins, 4-hydroxy-2-quinolones, imidazo[2,1-b]thiazoles, julolidines (2,3,6,7-tetrahydro-1H, 5H-benzo[ij]quinolizines), 1-oxajulolidines, 1,2,5,6-tetrahydro-4H-pyrrolo[3,2,1-ij]quinolines, 2,6-diamino-3 cyanopyridines, 2-aminothiazoles, 2-aminothiophenes, 5,5-dimethyl-1,3-cyclohexanedione (dimedone), phenols, naphthols, 2,4-pentanediones or acetoacetarylides; with the proviso that the compounds of Formula VI contain two acidic functional groups containing one acidic hydrogen each or contain one sulfamoyl group (—$SO_2NH_2$) which contains two acidic hydrogens.

Preferred disazo compounds correspond to Formula VII

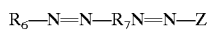

$R_6$—N═N—$R_7$N═N—Z            VII wherein $R_6$ and Z are as defined above and $R_7$ is a divalent aromatic or heteroaromatic radical selected from the classes 1,4-phenylene, naphthalene-1,4-diyl, thiazol-2,5-diyl and thiophene-2,5-diyl:

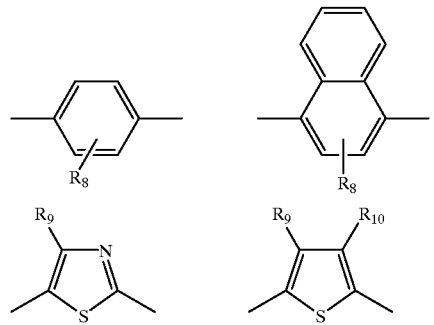

wherein $R_8$ is selected from hydrogen or 1–2 groups selected from $C_1$–$C_6$ alkyl, $C_1$–$C_6$ alkoxy, cyano, halogen, —NHCO $C_1$–$C_6$ alkyl, —$NHCO_2$ $C_1$–$C_6$ alkyl, —NHCO aryl, —NHCONH aryl or NHCONH $C_1$–$C_6$ alkyl; $R_9$ is selected from hydrogen, $C_1$–$C_6$ alkyl, halogen, aryl, heteroaryl; $R_{10}$ is selected from hydrogen, $C_1$–$C_6$ alkoxycarbonyl, cyano, carbamoyl, aryl, arylsulfonyl,aroyl, —CONH $C_1$–$C_6$ alkyl, or $C_1$–$C_6$ alkylsulfonyl; with the provision that two acidic functional groups containing one acidic hydrogen each or one functional group containing two acidic hydrogens are present on compounds of Formula VII.

The preferred methine, arylidene, polymethine, azamethine, 3-aryl-2,5-dioxypyrroline, 3-aryl-5-dicyanomethylene-2-oxopyrroline and aryl isoindoline compounds correspond to Formula VIII, VIIIa, VIIIb, IX, X, XI and XII, respectively:

VIII

VIIIa

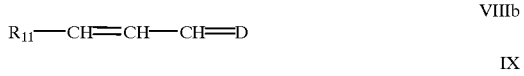
VIIIb

IX

X

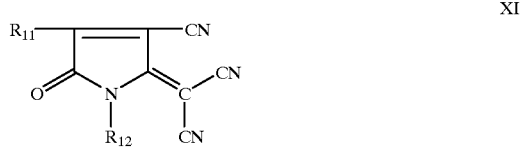
XI

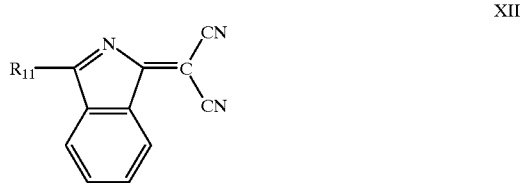
XII wherein $R_{11}$ is the residue of an aniline, 1-naphthylamine, 1,2-dihydroquinoline, 1,2,3,4-tetrahydroquinoline, 1,3,3-trimethyl-2-methyleneindole, 1,3-dihydro-2-methylene-1,1,3-trimethyl-2H-benz[e]indole, imidazo [2,1-b] thiazole, benzomorpholine (3,4-dihydro-2H-1,4, benzoxazine), indole, 2,3-dihydroindole, 2-aminothiazole, julolidine (2,3,6,7-tetrahydro-1H, 5H-benz [ij] quinolizine, 1-oxajulolidine, 4H-pyrrolo [3,2,1-ij]-quinoline, phenol, naphthol, thiophenol, pyrrole, pyrazole, furan, thiophene, carbazole, phenothiazine or phenoxazine compound; $R_{12}$ is selected from hydrogen, $C_1-C_{10}$ alkyl, $C_3-C_8$ alkenyl, $C_3-C_8$-alkynyl, $C_3-C_8$ cycloalkyl, aryl, $(-CH_2CH_2O-)_{1-3}$ $R_{13}$ and $C_1-C_4$ alkylene-$C_3-C_8$ cycloalkylene, wherein the $C_1-C_6$ alkyl groups may be substituted by at least one group selected from carboxy, $C_1-C_6$ carbalkoxy, $C_1-C_6$ alkanoyloxy, cyano, hydroxy, chlorine, fluorine, $C_1-C_6$ alkoxy, $C_3-C_8$ cycloalkyl or aryl; $R_{13}$ is selected from hydrogen, $C_1-C_6$ alkoxy or $C_1-C_6$ alkanoyloxy; wherein D is the residue of an active methylene compound selected from malononitrile, -cyanoacetic acid esters, malonic acid esters, -cyanacetic acid amides, $-C_1-C_6$ alkylsulfonylacetonitriles, -arylsulfonylacetonitriles, $-C_1-C_6$ alkanoylacetonitriles, -aroylacetonitriles, -heteroarylacetonitriles, bis(heteroaryl)methanes, 1,3-indanediones, 2-furanones, benzo-2-furanones, naphtho-2-furanones, 2-indolones, 3-cyano-1,6-dihydro-4-methyl-2,6-dioxy (2H)-pyridines, benzo (b) thieno-3-ylidene propane dinitrile-5,5-dioxides, 1,3-bis (dicyanomethylene) indanes, barbituric acid, 5-pyrazolones, dimedone, 3-oxo-2,3-dihydro-1-benzothiophene-1,1-dioxides or aryl-$C(CH_3)C=C(CN)_2$, with the proviso that two acidic functional groups containing one acidic hydrogen each, or a functional group containing two acidic hydrogens are present in compounds of Formula VIII, VIIIa, VIIIb, IX, X, XI, and XII.

Preferred azo-methine compounds correspond to Formula XIII

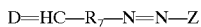    XIII wherein D, $R_7$ and Z are as defined previously. The bis-azo compound corresponds to Formula VIIa

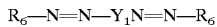    VIIa wherein $R_6$ is as defined above and $Y_1$ is the residue of a bis coupling component selected from the classes of anilines, 1,2-dihydroquinolines, 1,2,3,4-tetrahydroquinolines, benzo-morpholines (3,4-dihydro-2H-1, 4-benzoxazines), 3-cyano-6-hydroxy-2-pyridones, 2,6-diaminopyridines, 2,3-dihydroindoles, naphthylamines, 2-aminothiazoles, or a combination of these; with the provision the compounds of Formula VIIa contain two acidic functional groups containing one acidic hydrogen each or contain one sulfamoyl group ($-SO_2NH_2$) which contains two acidic hydrogens.

Several diacid monomers which are described in U.S. Pat. Nos. 4,804,719 and 3,689,501 are useful in the practice of the invention, including various anthraquinones, anthrapyridones, anthraisothiazoles, anthrapyrimidines, anthrapyrimidones, phthaloylacridones, etc.

Some of the preferred anthraquinone, anthrapyridone and anthrapyrimidine compounds correspond to the light absorbing compounds of Formulae XIV–XIXf

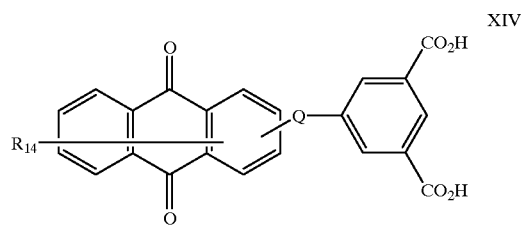    XIV

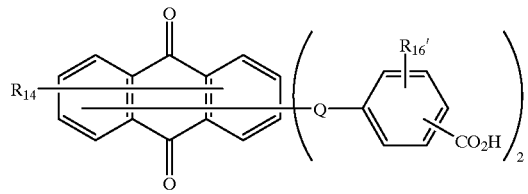    XV

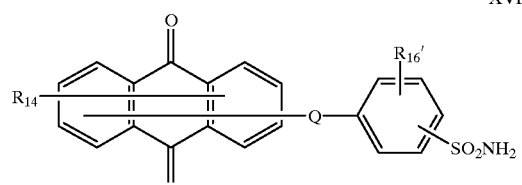    XVI

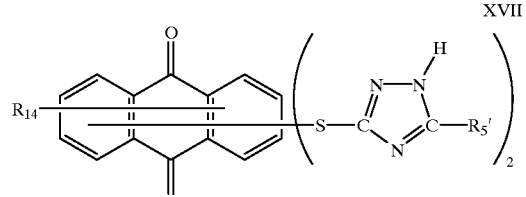    XVII

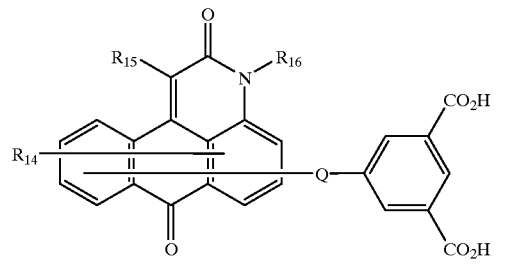    XVIII

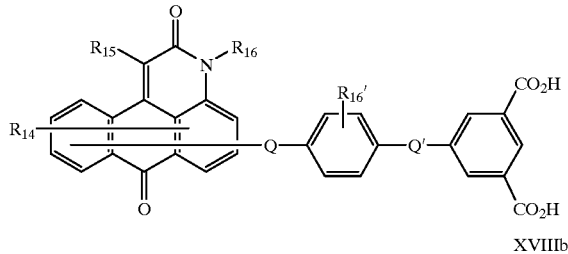    XVIIIa

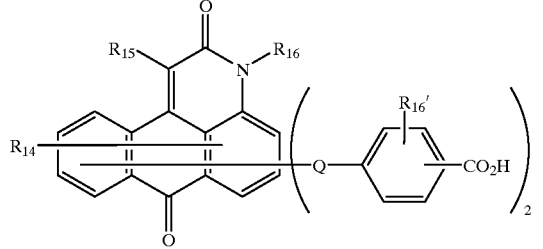    XVIIIb

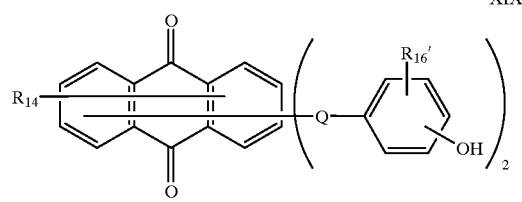    XIX

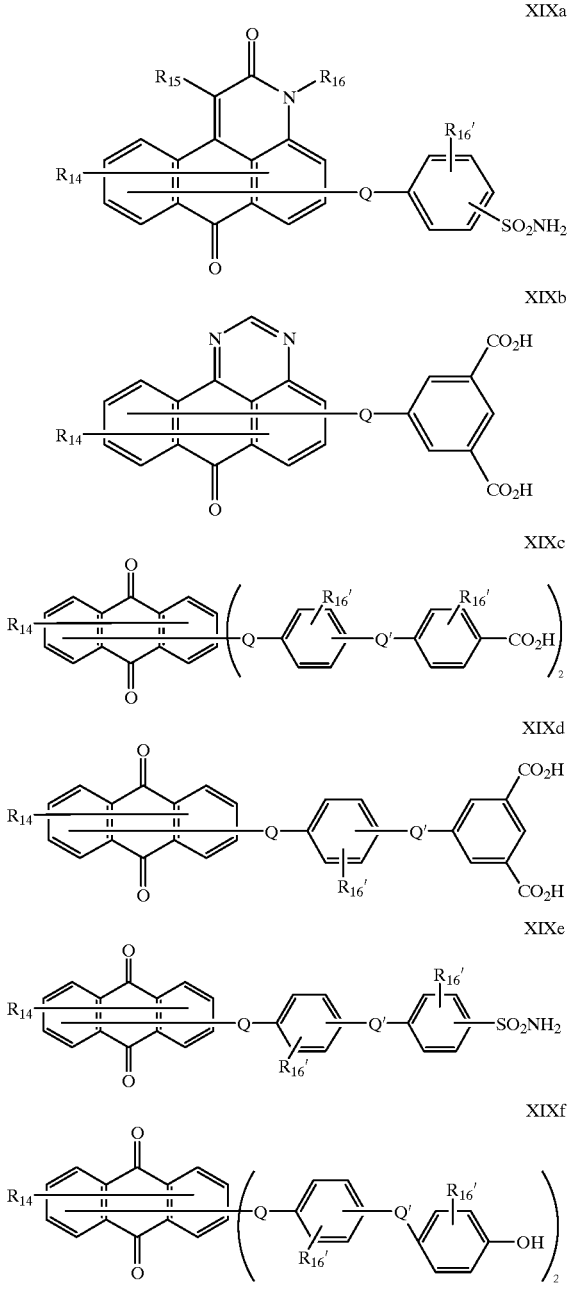

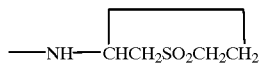

or hydroxy; Q and Q' are independently selected from —O—, —N(COR$_{10}$)—, —N(SO$_2$R$_{10}$)—, —N(R$_{10}$)—, —S—, —SO$_2$—, —CO$_2$—, —CON(R$_{10}$)—, SO$_2$N (R$_{10}$)—, wherein R$_{10}$ is selected from hydrogen, aryl, C$_3$–C$_8$ cycloalkyl, or C$_1$–C$_{10}$ alkyl; R$_{15}$ is selected from hydrogen, cyano, C$_1$–C$_6$ alkylamino, C$_1$–C$_6$ alkoxy, halogen, arylthio, aryl, heteroaryl, heteroarylthio, C$_1$–C$_6$ alkoxycarbonyl, aroyl or arylsulfonyl; R$_{16}$ is selected from hydrogen, C$_1$–C$_{10}$ alkyl, C$_3$–C$_8$ cycloalkyl and aryl; R$_{16}$ is selected from the group consisting of hydrogen, one or two groups selected from C$_1$–C$_6$ alkyl, halogen and C$_1$–C$_6$ alkoxy; wherein each C$_1$–C$_6$ alkyl group and C$_1$–C$_6$ alkyl group which is a portion of another group may contain at least one substituent selected from hydroxy, cyano, chlorine, fluorine, C$_1$–C$_6$ alkoxy, C$_3$–C$_8$ cycloalkoxy, C$_1$–C$_6$ alkylcyclohexyl, hydroxymethyl cyclohexyl, aryl and heteroaryl; with the provision that two acidic groups containing one acidic proton each or one acidic group containing two acidic hydrogens be present in the compounds of Formula XIV–XIXf.

Typical coupler residues which are represented by Z above in Formulae VI, VII, XIII for the classes of azo, disazo and azo-methine compounds, respectively include:

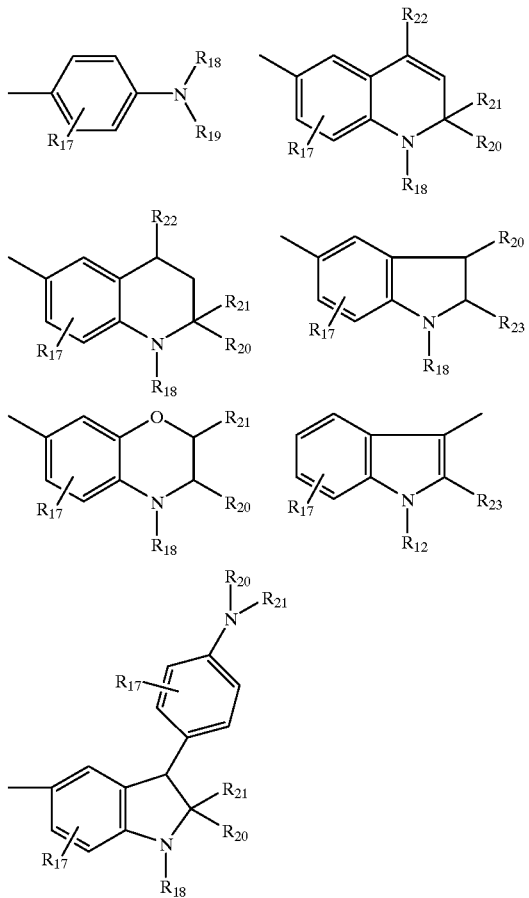

wherein R$_{14}$ is selected from the group consisting of hydrogen, 1–4 groups selected from amino, C$_1$–C$_{10}$ alkylamino, C$_3$–C$_8$ alkenylamino, C$_3$–C$_8$ alkynylamino, C$_3$–C$_8$ cycloalkylamino, arylamino, halogen, C$_1$–C$_6$ alkoxy, C$_1$–C$_6$ alkylthio, aryl, aroyl, C$_1$–C$_6$ alkanoyl, C$_1$–C$_6$ alkanoyloxy, NHCO C$_1$–C$_6$ alkyl, NHCOaryl, NHCO$_2$ C$_1$–C$_6$ alkyl, NHSO$_2$ C$_1$–C$_6$ alkyl, NHSO$_2$ aryl, C$_1$–C$_6$ alkoxycarbonyl, aryloxy, arylthio, heteroarylthio, cyano, nitro, trifluoromethyl, thiocyano, SO$_2$C$_1$–C$_6$ alkyl, SO$_2$ aryl, —SO$_2$NH C$_1$–C$_6$ alkyl, —SO$_2$N(C$_1$–C$_6$ alkyl)$_2$, —SO$_2$N (C$_1$–C$_6$ alkyl) aryl, CONH C$_1$–C$_6$ alkyl, CON(C$_1$–C$_6$ alkyl)$_2$, CON(C$_1$–C$_6$ alkyl) aryl, C$_1$–C$_6$ alkyl, furfurylamino, tetrahydrofurfurylamino, 4-(hydroxymethyl) cyclohexanemethylamino,

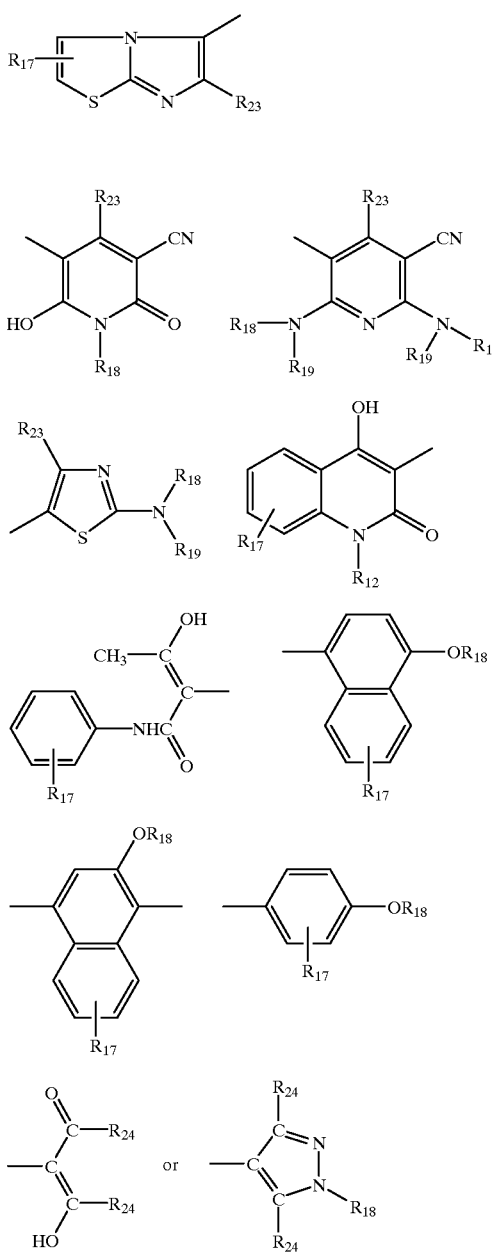

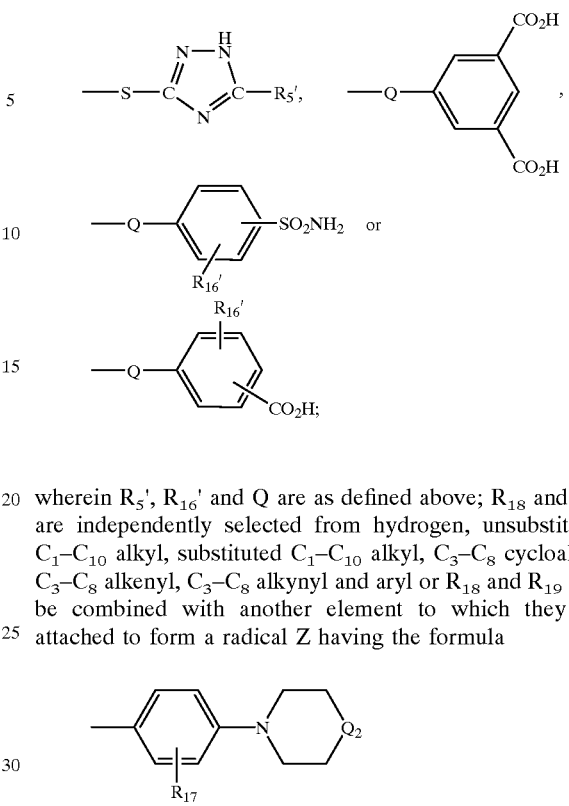

wherein $R_5'$, $R_{16}'$ and Q are as defined above; $R_{18}$ and $R_{19}$ are independently selected from hydrogen, unsubstituted $C_1$–$C_{10}$ alkyl, substituted $C_1$–$C_{10}$ alkyl, $C_3$–$C_8$ cycloalkyl, $C_3$–$C_8$ alkenyl, $C_3$–$C_8$ alkynyl and aryl or $R_{18}$ and $R_{19}$ may be combined with another element to which they are attached to form a radical Z having the formula

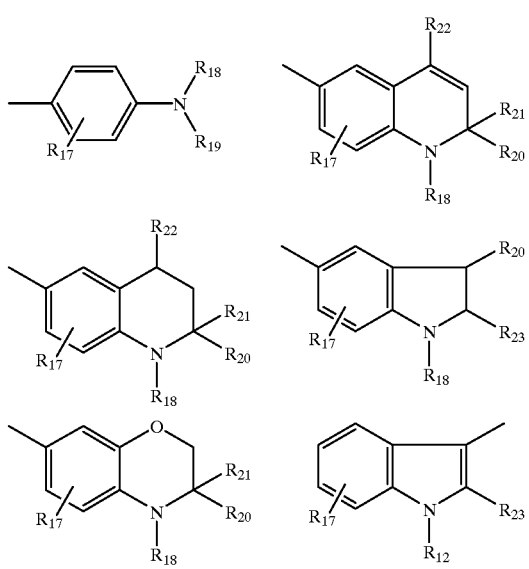

wherein $Q_2$ is selected from a covalent bond, —O—, —S—, —$SO_2$—, —CO—, —$CO_2$—, —N—($C_1$–$C_6$ alkyl)—, —N(CO $C_1$–$C_6$ alkyl)-, —N($SO_2$ $C_1$–$C_6$ alkyl)-, —N(CO aryl)-, or —N($SO_2$ aryl); $R_{20}$, $R_{21}$ and $R_{22}$ are independently selected from of or $C_1$–$C_6$ alkyl; $R_{23}$ is selected from hydrogen, $C_1$–$C_6$ alkyl, $C_3$–$C_8$ cycloalkyl, heteroaryl or aryl.

Typical electron, rich aromatic residues which are represented by $R_{11}$ in Formulae VIII–XII include:

wherein $R_{17}$ is selected from the group consisting of hydrogen, 1–2 groups selected from $C_1$–$C_6$ alkyl, $C_1$–$C_6$ alkoxy, $C_1$–$C_6$ alkylthio, —O—$C_2$–$C_6$ alkylene-OH, O—$C_2$–$C_6$ alkylene-$C_1$–$C_6$ alkanoyloxy, $C_1$–$C_6$ alkylene-OH, $C_1$–$C_6$ alkylene-$C_1$–$C_6$ alkanoyloxy, halogen, carboxy, $C_1$–$C_6$ alkoxycarbonyl, trifluoromethyl, $NHCOR_{24}$, $NHCO_2R_{24}$, $NHCON(R_{24})R_{25}$, and $NHSO_2R_{25}$, wherein $R_{24}$ is selected from hydrogen, $C_1$–$C_{10}$ alkyl, $C_3$–$C_8$ cycloalkyl or aryl, $R_{25}$ is selected from $C_1$–$C_{10}$ alkyl, $C_3$–$C_8$ cycloalkyl or aryl wherein each $C_1$–$C_{10}$ alkyl group in $R_{24}$ and $R_{25}$ may be further substituted with one or more groups selected from $C_3$–$C_8$ cycloalkyl, aryl, aryloxy, arylthio, $CO_2H$, $CO_2$ $C_1$–$C_6$ alkyl, cyano, hydroxy, succinimido, $C_1$–$C_6$ alkoxy, -continued

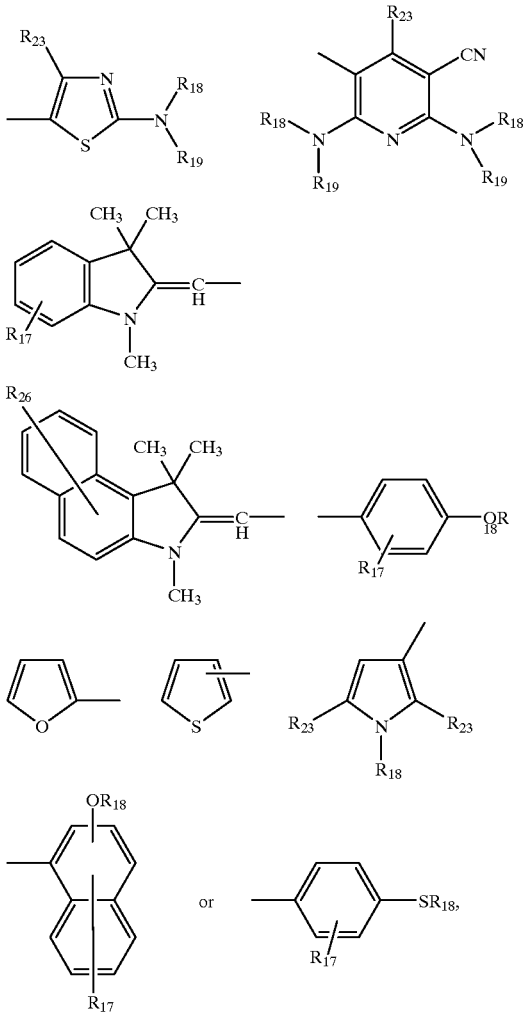

wherein $R_{26}$ is selected from the group consisting of hydrogen, a group selected from $C_1$–$C_6$ alkoxycarbonyl, $CO_2H$, $C_1$–$C_6$ alkyl or $C_1$–$C_6$ alkoxy; wherein $R_{17}$–$R_{23}$ are as defined previously.

Preferred coumarin compounds useful in the practice of the invention correspond to the following formulae:

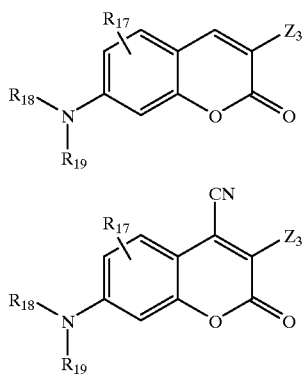

-continued

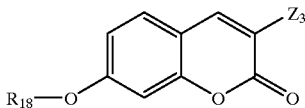

wherein $Z_3$ is selected from cyano, $C_1$–$C_6$ alkoxycarbonyl, $C_1$–$C_6$ alkylsulfonyl, arylsulfonyl, aryl, heteroaryl, formyl, aroyl, $C_1$–$C_6$ alkanoyl or —CH=D, wherein D, $R_{17}$, $R_{18}$ and $R_{19}$ are as defined previously with the provision that the coumarin compounds contain two acidic functional groups containing one acidic hydrogen each or contain one sulfamoyl (—$SO_2NH_2$) group which contains two acidic hydrogens.

Typical coupler residues which are represented by $Y_1$ in Formula VIIa above include those of the formula ($Z_1$—$L_1$—$Z_2$) wherein $Z_1$ and $Z_2$ are independently selected from

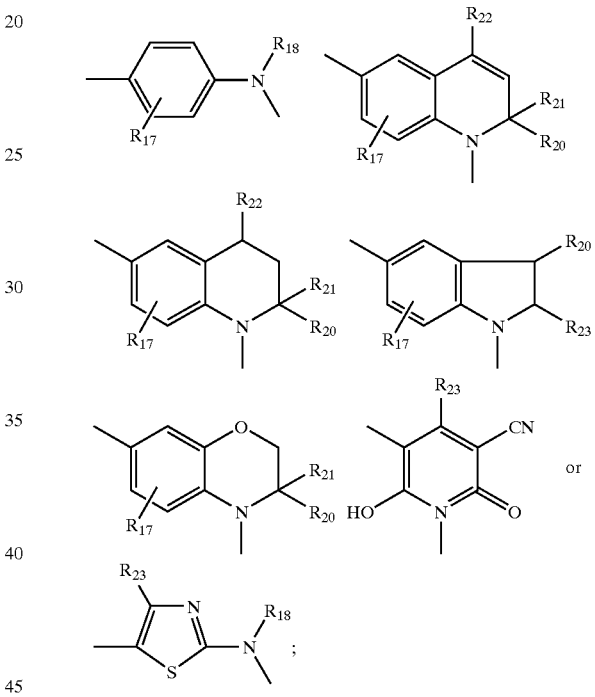

wherein $L_1$ is bonded to the nitrogen atom of $Z_1$ and $Z_2$; wherein $L_1$ is selected from $C_2$–$C_{12}$ alkylene, $C_3$–$C_8$ cycloalkylene, arylene, $C_1$–$C_4$ alkylene-$C_3$–$C_8$ cycloalkylene-$C_1$–$C_4$ alkylene, $C_1$–$C_4$ alkylene-arylene-$C_1$–$C_4$ alkylene, $C_2$–$C_4$ alkylene-O-arylene-O—$C_2$–$C_4$ alkylene, —$C_2$–$C_4$ alkylene $O_{1-3}$—$C_2$–$C_4$ alkylene, $C_2$–$C_4$ alkylene-S—$C_2$–$C_4$ alkylene, $C_2$–$C_4$ alkylene-$SO_2$-$C_2$–$C_4$ alkylene, $C_2$–$C_4$ alkylene-N($SO_2$ $C_1$–$C_6$ alkyl)-$C_2$–$C_4$ alkylene, $C_2$–$C_4$ alkylene-N($SO_2$ aryl)-$C_2$–$C_4$ alkylene, $C_2$–$C_4$ alkylene-$OCO_2$–$C_2$–$C_4$ alkylene, $C_2$–$C_4$ alkylene-$O_2$C-arylene-$CO_2$–$C_2$–$C_4$ alkylene, $C_2$–$C_4$ alkylene-$O_2$C—$C_1$–$C_{12}$ alkylene-$CO_2$–$C_2$–$C_4$ alkylene, $C_2$–$C_4$ alkylene-$O_2$C—$C_3$–$C_8$ cycloalkylene-$CO_2$–$C_2$–$C_4$ alkylene, $C_2$–$C_4$ alkylene-NHCO—$C_2$–$C_4$ alkylene and $C_2$–$C_4$ alkylene-$NHSO_2$-$C_2$–$C_4$ alkylene; wherein $R_{17}$, $R_{18}$, $R_{20}$, $R_{21}$, $R_{22}$, and $R_{23}$ are as defined previously.

In the above definitions it is intended that in the terms $C_1$–$C_6$ alkyl, $C_1$–$C_6$ alkoxy, $C_1$–$C_6$ alkoxycarbonyl, $C_1$–$C_6$ alkylthio, $C_1$–$C_6$ alkylsulfonyl, $C_1$–$C_6$ alkanoyl, —CONH $C_1$–$C_6$ alkyl, —$SO_2NH$ $C_1$–$C_6$ alkyl, —CON($C_1$–$C_6$ alkyl)$_2$, —$SO_2N(C_1$–$C_6$ alkyl)$_2$, —$NHSO_2$ $C_1$–$C_6$ alkyl, —N($C_1$–$C_6$ alkyl) $SO_2$ $C_1$–$C_6$ alkyl, etc. unless otherwise stated that the $C_1$–$C_6$ alkyl portion of the group refers to a straight or branched chain alkyl group containing one to six carbon atoms and these substituted with one or more groups selected from carboxy, cyano, —$SO_2NH_2$, $SO_2NH$ $C_1$–$C_6$ alkyl, cyano, fluorine, chlorine, $C_1$–$C_6$ alkoxy, aryloxy, aryl, heteroaryl, arylthio, heteroarylthio, $C_3$–$C_8$-cycloalkyl, —$O_2C$ $C_1$–$C_6$ alkyl or —$CO_2$ $C_1$–$C_6$ alkyl.

The terms $C_1$–$C_4$ alkylene, $C_2$–$C_4$ alkylene, $C_1$–$C_6$ alkylene, $C_2$–$C_6$ alkylene, and $C_2$–$C_{12}$ alkylene are used to refer to divalent aliphatic hydrocarbon radicals containing one to four carbon atoms, two to four carbon atoms one to six carbon atoms, two to six carbon atoms, or two to twelve carbon atoms, respectively, and these optionally substituted with one or more groups selected from $C_1$–$C_6$ alkoxy, hydroxy, —$O_2C$ $C_1$–$C_6$ alkyl, carboxy, $CO_2$ $C_1$–$C_6$ alkyl, chlorine, fluorine, aryl or aryloxy.

The terms $C_3$–$C_8$ cycloalkyl and $C_3$–$C_8$ cycloalkylene are used to refer to fully saturated monovalent and divalent cycloaliphatic radicals, respectively, and these substituted by one or more $C_1$–$C_6$ alkyl groups.

The terms $C_3$–$C_8$ alkenyl and $C_3$–$C_8$ alkynyl are used to refer to straight or branched hydrocarbon radicals containing at least one double bond or at least one triple bond, respectively.

In the terms aryl, NH aryl, aryloxy, aroyl, arylthio, arylsulfonyl, aryloxysulfonyl, —N($SO_2$ aryl)-, —N(CO aryl)-, NHCO aryl, —NH CONH aryl, $NHSO_2$, aryl, etc., the aryl portion of the group represents phenyl and naphthyl and these substituted with one or more groups selected from—$CO_2H$, $C_1$–$C_6$ alkyl, $CO_2$ $C_1$–$C_6$ alkyl, $SO_2NH_2$, $SO_2NH$ $C_1$–$C_6$ alkyl, hydroxy, O $C_1$–$C_6$ alkyl, S $C_1$–$C_6$ alkyl, phenyl, O-arylene-$CO_2H$, —S-arylene-$CO_2H$, $SO_2$ arylene-$CO_2H$, halogen, $NHSO_2$ $C_1$–$C_6$ alkyl, trifluoromethyl, NH CO $C_1$–$C_6$ alkyl, cyano, or 1(H)-1,2,4-triazol-3-ylthio.

The term arylene is used to represent 1,2-, 1,3-, and 1,4-phenylene and these optionally substituted with one or more groups mentioned above as possible substituents on the aryl radical.

The term "heteroaryl" is used to describe a 5 or 6 membered heterocyclic aromatic ring containing one oxygen atom, and/or one sulfur atom, and/or up to three nitrogen atoms, said heterocyclic aryl ring optionally fused to one or two phenyl rings or another 5 or 6-membered heteroaryl ring. Examples of such ring systems include thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazynyl, thiatriazinyl, oxatriazinyl, dithiadiazinyl, imidazolinyl, dihydropyrimidyl, tetrahydropyrimidyl, tetrazolo [1,5-b]-pyridazinyl and purinyl, benzoxazolyl, benzothiazolyl, benzimidazolyl, indolyl, and the like and those rings substituted with one or more substituents listed above in the definition of the term "aryl".

The term halogen is used to refer to fluorine, chlorine, bromine and iodine.

In the above definitions the unsubstituted and substituted $C_1$–$C_{10}$ alkyl groups or portion of groups mentioned refer to fully saturated hydrocarbon radicals containing one to ten carbon atoms, either straight or branched chain, and such alkyl radicals substituted with one or more of the following: $C_3$–$C_8$ cycloalkyl, aryl, hydroxy, cyano, —O—$C_2$–$C_4$ alkylene OH, —O—$C_2$–$C_4$ alkylene $O_2$ C—$C_1$–$C_6$ alkyl, —S—$C_2$–$C_4$ alkylene-OH, chlorine, fluorine, —O—$C_1$–$C_6$ alkyl, —O-aryl, —$SO_2$ aryl, —$SO_2$-$C_1$–$C_6$ alkyl, 2-pyrrolidino, phthalimidino, phthalimido, succinimido, glutarimido, o-benzoic sulfimide, vinyl sulfonyl, —NHCO $C_1$–$C_6$ alkyl, NHCOH, —$NHSO_2$–$C_1$–$C_6$ alkyl, $NHSO_2$ aryl, —NHCO aryl, —NH—$CO_2$–$C_1$–$C_6$ alkyl, —$SO_2NH_2$, —$SO_2$—NH—$C_1$–$C_6$ alkyl, —$SO_2N$—($C_1$–$C_6$ alkyl)$_2$, —$CO_2$—$C_1$–$C_6$ alkyl, $CONH_2$, —CONH—$C_1$–$C_6$ alkyl, —$CO_2$-aryl, —CON($C_1$–$C_6$ alkyl)$_2$, —CONH aryl, —CONH($C_1$–$C_6$ alkyl) aryl, —$SO_2N$($C_1$–$C_6$ alkyl) aryl, —$SO_2$—NH—$C_3$–$C_8$ cycloalkyl, —CONH—$C_3$–$C_8$ cycloalkyl, —$OCO_2$–$C_1$–$C_6$ alkyl, —O $C_2$–$C_4$ alkylene CN; groups of the formulae:

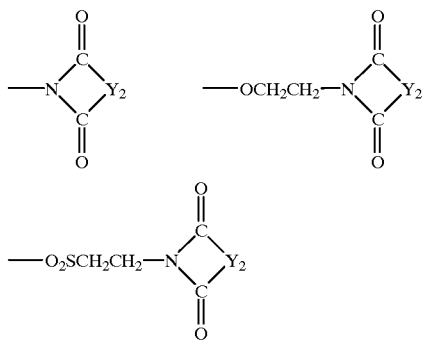

wherein $Y_2$ is selected from 1,2-phenylene; 1,2 pheylene substituted with $C_1$–$C_6$ alkyl, $C_1$–$C_6$ alkoxy, halogen, —$CO_2H$, —$CO_2$ $C_1$–$C_5$ alkyl or nitro; $C_2$–$C_4$ alkylene, vinylene, —O $CH_2$—, —$SCH_2$—, —$CH_2OCH_2$—, —$OCH_2CH_2$—, —$CH_2SCH_2$—, —$NHCH_2$—, —$NHCH_2CH_2$, —N($C_1$–$C_6$ alkyl)$CH_2$—, $NHC(C_1$–$C_6$ alkyl)$_2$, —N($C_1$–$C_6$ alkyl) $CH_2CH_2$ or —NHC (aryl)$_2$—;
groups of the formulae:
—$SR_{25}$, —$SO_2CH_2CH_2SR_{25}$, —$OCH_2CH_2SR_{25}$,

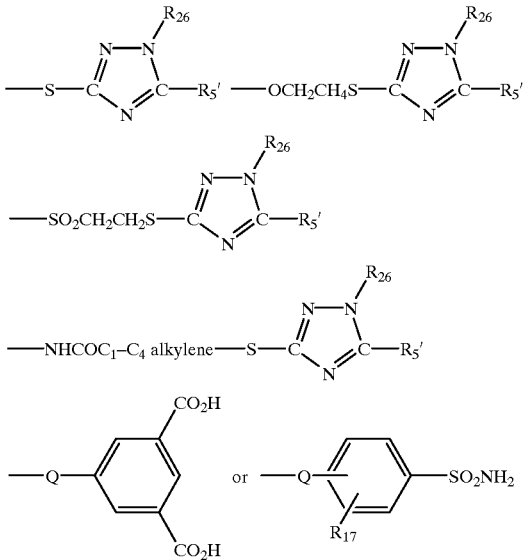

wherein $R_{26}$ is selected from hydrogen, $C_1$–$C_{10}$ alkyl, $C_2$–$C_4$ alkylene-OH, $C_2$–$C_4$ alkylene-$CO_2H$, $C_2$–$C_4$ alkylene-$CO_2$ $C_1$–$C_6$ alkyl, chloro, $C_1$–$C_6$ alkoxy, $C_1$–$C_4$ alkylene-arylene-$CO_2H$, $C_2$–$C_4$ alkylene-O-arylene-$CO_2H$ or $C_2$–$C_4$ alkylene-S-arylene-$CO_2H$ and $R_5'$ $R_{17}$, $R_{25}$ and Q are as defined previously:

The term "light absorbing" is used to indicate the property of absorbing near ultra violet, visible or near infrared light, more particularly absorbing light between the wavelengths of 300–1200 nm, preferably between about 325 nm and 1100 nm, and most preferably between about 325 nm and 1000 nm.

Typical aromatic amines which are useful as the coupling components to prepare compounds of Formulae VI, VII and VIII and as intermediates for preparing the compounds of Formula VIII, VIIIa, IX, X, XI and XII are as follows:

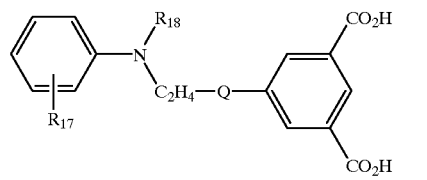
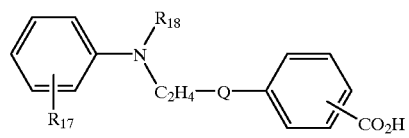
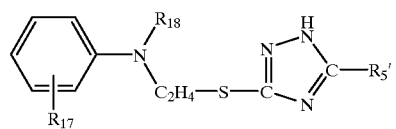
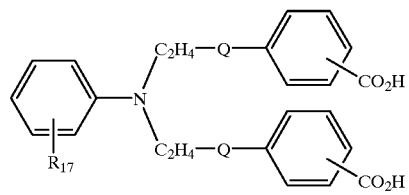
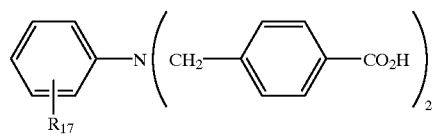
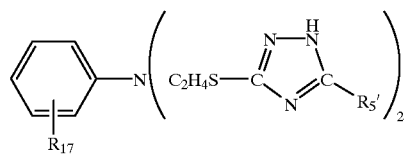
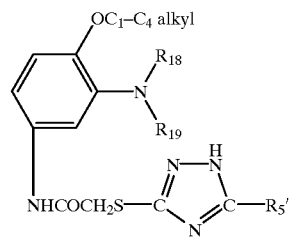

-continued

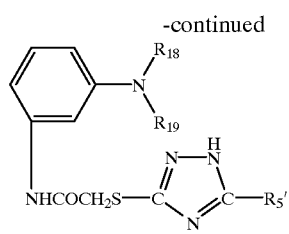
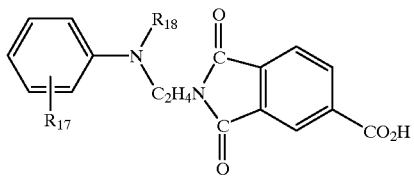
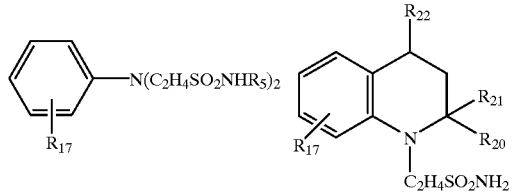
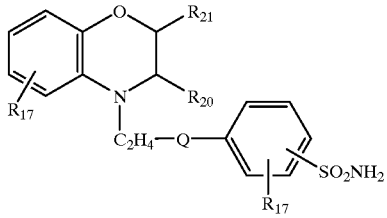
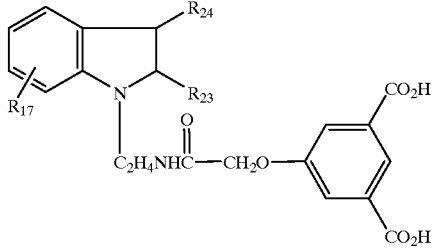
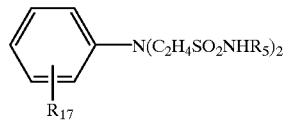
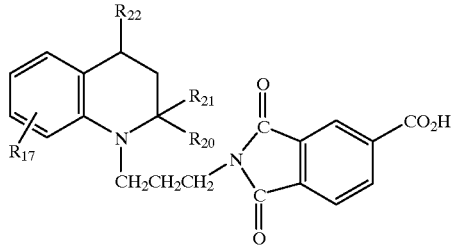
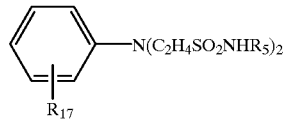
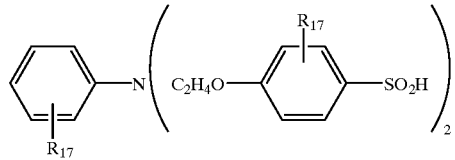

-continued

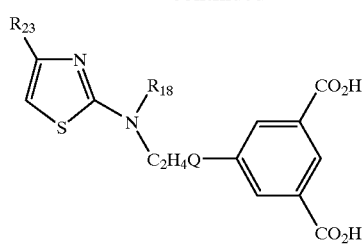
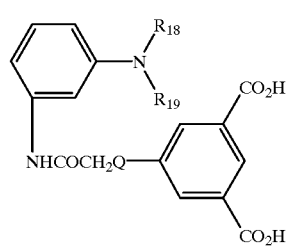
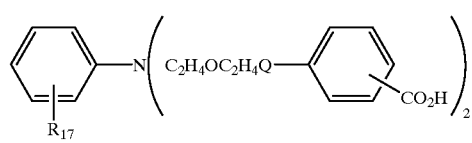
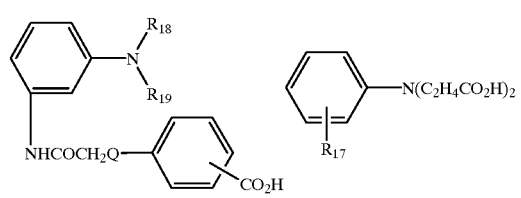
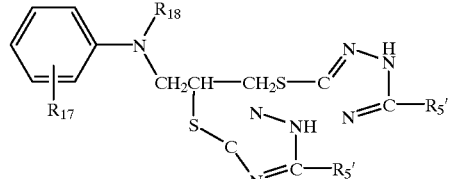
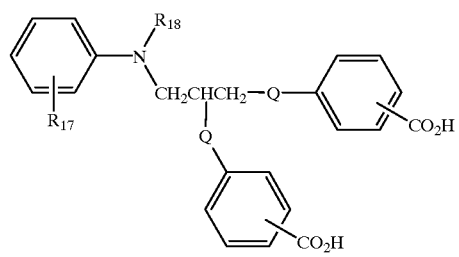
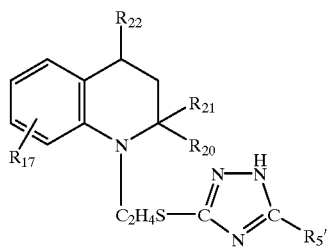

-continued

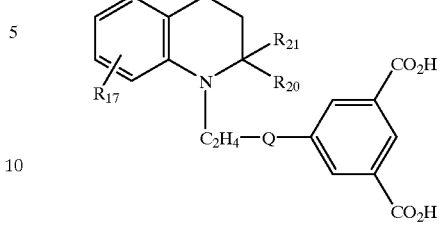
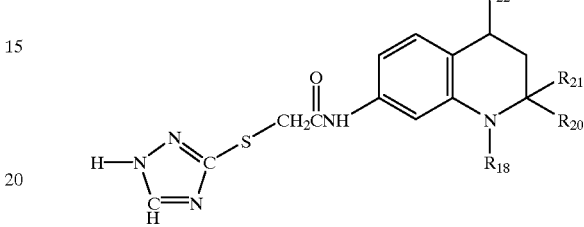
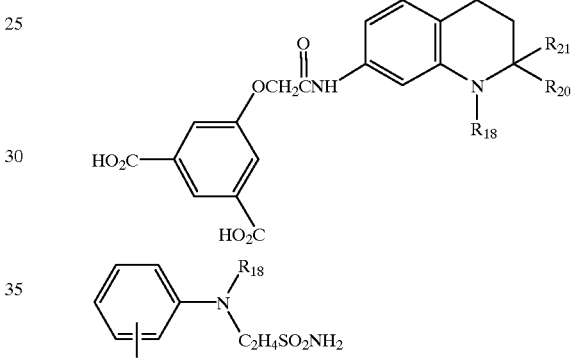
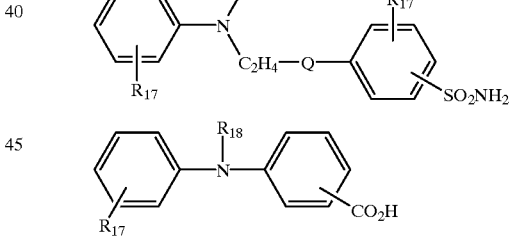

wherein Q, $R_5'$, $R_{17}$, $R_{18}$, $R_{19}$, $R_{20}$, $R_{21}$, $R_{22}$ and $R_{23}$ are as defined previously.

Typical diazotizable amines ($R_6 NH_2$) useful in the preparation of azo, disazo and bis-azo compounds of Formulae VI, VII, and VIIa, respectively, are adequately disclosed in the literature, e.g.:

M. Weaver and L. Shuttleworth, Dyes and Pigments, 3 (1982) 81–121;

L. Shuttleworth and M. Weaver, Chem. Appl. Dyes, 1990, 107–63, edited by D. Waring and G. Hallas, Plenum, New York, N.Y.;

U.S. Pat. Nos. 3,438,961; 3,573,273; 3,639,384; 3,707,532; 3,790,557; 3,816,388; 3,816,392; 3,878,189; 3,980,

634; 4,012,372; 4,039,522; 4,049,643; 4,083,684; 4,083,844; 4,097,475; 4,105,655; 4,119,621; 4,140,683; 4,180,503; 4,189,428; 4,207,233; 4,211,696; 4,264,495; 4,283,332; 4,400,318; 4,431,585; 4,456,551; 4,487,719; 4,542,207; 4,564,673; 4,619,991; 4,621,136; 4,650,861; 4,668,775; 4,734,490; 4,751,288; 4,760,133; 4,764,600; 4,837,269; 4,841,036; 4,843,153; 4,888,432; 4,960,874; 5,037,966; 5,132,411; 5,144,015; 5,283,326; 5,296,325; 5,352,774.

Typical coupling components H—Z useful in preparing azo compounds, disazo and azo-methine compounds of Formula VI, VII and XIII, respectively, are disclosed in the literature, e.g: H. R. Schwander, Dyes and Pigments, 3(1982) 133–160; L. Shuttleworth and M. Weaver, Chem. Appl. Dyes, 1990, 107–63, edited by D. Waring and G. Hallas, Plenum, New York, N.Y.; U.S. Pat. Nos. 3,639,384; 3,639,385; 3,657,215; 3,673,169; 3,816,388; 3,829,410; 3,919,188; 3,950,130; 3,980,634; 4,041,025; 4,097,475; 4,119,621; 4,179,435; 4,234,482; 4,283,332; 4,341,700; 4,400,318; 4,431,585; 4,396,547; 4,619,992; 4,642,339; 4,650,861; 4,668,775; 4,764,600; 4,837,269; 4,843,153; 5,235,047; 5,283,326; 5,352,774.

Typical active methylene compounds useful in the preparation of methine, arylidene, polymethine, azamethine and azo-methine compounds corresponding to Formulae VIII, VIIIa, VIIIb, IX and XIII, respectively, are disclosed in the literature, e.g. U.S. Pat. Nos. 4,338,247; 4,617,373; 4,617,374; 4,707,537; 4,749,774; 4,826,903; 4,845,187; 4,950,732; 4,981,516 and 5,283,326.

According to the present invention the light-absorbing polymeric and cyclic compositions are incorporated into a wide variety of thermoplastic polymers using conventional techniques, e.g. solution or melt blending, such as those employed to incorporate other additives in such polymers (see R. Gachter and H. Mueller, Editors: Plastics Additives Handbook, Hansu Publishers, New York, 1985, pp. 507–533; 729–741). For example, the light absorbing polymeric and cyclic compositions may be dry blended in the form of pellets or powders with or without adhesion promoters or dispersing agents. This premix can be subsequently processed on extruders or injection molding machines. Other conventional additives such as plasticizers, nucleating agents, flame retardants, lubricants, etc. may also be present in the final thermoplastic composition.

A wide range of thermoplastic polymers useful for blending with the light absorbing polymeric and cyclic compositions are known in the art and includes the homopolymers, copolymers and blends of polyesters, e.g., poly(ethylene terephthalate); polyolefins, e.g., polypropylene, polyethylene, linear low density polyethylene, polybutylene, and copolymers made from ethylene, propylene and/or butylene; copolymers from acrylonitrile, butadiene, and styrene; copolymers from styrene and acrylonitrile; polyamides, e.g., Nylon 6 and Nylon 66; polyvinyl chloride; polyurethanes; polyvinylidene chloride; polycarbonates; cellulose esters, e.g., cellulose acetate, propionate, butyrate, or mixed esters; polyacrylates, e.g., poly(methyl methacrylate); polyimides; polyester-amides; polystyrene; and mixtures or blends thereof etc.

It should also be appreciated that a multiplicity of colors may be obtained by combining individual colors, e.g., subtractive colors such as yellow, magenta and cyan according to known color technology (see N. Ohta, *Photographic Science and Engineering*. Volume 15, No. 5, September—October 1971, pp. 395–415).

The particular chromophore groups present will, of course, determine the color (hue+value+chroma) of the colored polymer composition and finally the color (hue+value+chroma) of the thermoplastic polymer blends of the present invention. A large gamut of colors may be obtained, as noted above.

The actual amount of the light absorbing polymers used in combination with thermoplastic polymer will depend upon the inherent tinctorial strength of the chromophore used to prepare the light absorbing polymer, the mole % of the light absorbing monomer used to prepare the light absorbing polymer and the required level of light absorption necessary to achieve a certain property. Typically, the amount of light-absorbing polymer added to the thermoplastic polymer is such that the total amount of light-absorbing polymer in the final thermoplastic blend is from about 0.001% by weight to about 20% by weight, preferably from about 0.01% by weight to about 10% by weight. The final thermoplastic polymer blends thus provided are useful as a variety of molded and extruded articles, including thick and thin plastic films, plastic sheeting, molded plastic articles, containers and fibers, and the like.

When the light-absorbing polymeric compositions absorb visible light they may be used to impart light or heavy shades of a variety of colors to thermoplastics. Certain compounds which possess unique visible light-absorbing properties are useful also as toners in imparting a desirable neutral to slightly blue hue to polyesters having a yellow appearance as described in U.S. Pat. No. 5,384,377, which discloses the copolymerization of certain thermally stable colorants for this purpose during polyester manufacture. Some of the infra-red absorbing polymeric and cyclic compositions are useful in imparting invisible markings to thermoplastics as described in U.S. Pat. No. 5,461,136, wherein the infrared absorbing compounds are fluorescent in the near infrared and are copolymerized into the thermoplastic condensation polymer during manufacture. The ultra violet absorbing polymeric and cyclic compositions may be used to impart ultra violet (UV) light screening properties to the thermoplastics; to serve as optical brighteners for the thermoplastics or to serve as UV stabilizers for the polymers themselves or for other light absorbers such as colorants.

The weight average molecular weights (Mw) and the number average molecular weights (Mn) of the polymeric compositions were determined using gel permeation chromatography (GPC) analysis.

The following examples illustrate further the practice of the invention.

EXAMPLE 1

A mixture of 1,5-bis(2-carboxyphenylthio) anthraquinone (25.60 g, 0.05 mole), 1,2-ethanediol, dimethanesulfonate (10.90 g, 0.05 mole), potassium carbonate (13.82 g, 0.10 mole) and N-methyl-2-pyrrolidinone (NMP) (400 mL) was heated with stirring at 125° C. for 1.0 hr. The reaction mixture was poured into methanol (600 mL) with stirring. The yellow polymeric product was collected by filtration and washed with methanol until filtrate was essentially clear. The methanol—wet filter cake was slurried in 1.0 L of water, the mixture acidified by the addition of acetic acid and the yellow product was collected by filtration, washed with hot water and dried in air (yield—21.16 g). By gel permeation chromatography (GPC) the polymeric product has a weight average molecular weight of 6,083, and number average molecular weight of 3,000 and a polydispersity value of 2.03.

EXAMPLE 2

A mixture of a blue anthraquinone compound (19.65 g 0.03 mole) containing two carboxy groups and having the following structure:

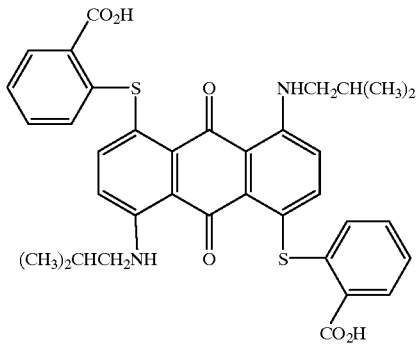

1,2-ethanediol, dimethanesulfonate (6.54 g, 0.03 m), potassium carbonate (8.28 g, 0.06 mole) and N,N-dimethylformamide (DMF) (100 mL) was heated with stirring at about 95° C. for 1.5 hr. The reaction mixture became too thick to stir effectively and additional DMF (50 mL) was added to facilitate stirring. Stirred about 15 min. longer at about 95° C., and then added methanol (100 mL) with good stirring to the slightly cooled reaction mixture. The blue polymeric product was collected by filtration and washed with methanol. The methanol-wet filter cake was added to water (600 mL) and the mixture was acidified with acetic acid, and then the polymeric product was collected by filtration, washed with water and dried in air (yield 18.18 g). By GP analysis the blue polymer had a molecular weight average of 3,038, a number average molecular weight of 1,814 and a polydispersity of 1.67.

EXAMPLE 2a

A mixture of 1,5-bis(isobutylamino)-4,8-dibromoanthraquinone (25.3 g, 0.05 mole), thiosalicylic acid (23.1 g, 0.15 mole), anhydrous $K_2CO_3$ (20.7 g, 0.15 mole), cupric chloride dihydrate (1.2 g) and DMF (250 mL) was heated at 90–95° C. with stirring for 2.0 hours. Thin layer chromatography (TLC) using 1:1 tetrahydrofuran (THF): cyclohexane showed complete conversion of the red starting material to the desired blue polar product. The reaction mixture was allowed to cool and then was drowned into water (800 mL). The blue solid was precipitated by acidification with acetic acid with stirring. The mixture was heated to about 60° C. with occasional stirring and the solid was collected by filtration, washed with hot water and dried in air. Further purification was accomplished by reslurrying the product in hot methanol (300 mL), allowing to cool to room temperature, collecting by filtration, washing with methanol and air drying to yield the starting material (31.5 g) for Example 2.

EXAMPLE 2b 1,5-Bis(isobutylamino)anthraguinone (28.0 g, 0.08 mole) was added to DMF (300 mL) and the mixture stirred at room temperature. A solution of 1,3-dibromo-5,5-dimethylhydantoin (23.0 g, 0.08 m) dissolved in DMF (75.0 mL) was added dropwise to the reaction mixture while warming to about 50° C. After complete addition of the brominating agent, the reaction mixture was heated at 50–60° C. for 1.5 hours, allowed to cool and then drowned by gradual addition to water (500 mL) with stirring. The red product was collected by filtration, washed with water and dried in air. The yield of product was 39.6 g and field desorption mass spectrum analysis (FDMS) showed the product to be 1,5-bis(isobutylamino)-4,8-dibromoanthraquinone used as the intermediate in Example 2a.

EXAMPLE 2c

A mixture of 1,5-dichloroanthraquinone (69.5 g, 0.25 mole), isobutylamine (100 g, 1.4 mole) and 2-ethoxyethanol (400 mL) was heated at reflux for 36.0 hours and allowed to cool. Methanol (400 mL) was added to make the mixture containing the crystallized product more stirrable. The dark red product was collected by filtration, washed with methanol, reslurried in hot methanol and allowed to cool, collected by filtration, washed with methanol and dried in air (yield—67.7 g). FDMS showed the product to be the 1,5-bis(isobutylamino)anthraquinone in high purity which was used as the starting material for Example 2b.

EXAMPLE 3

A mixture of an azo compound (2.93 g, 0.005 m) containing two 1(H)-1,2,4-triazol-3-thio groups and having the following structure:

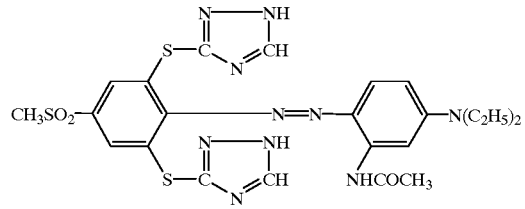

1,2-ethanediol, dimethanesulfonate (1.08 g, 0.005 mole), potassium carbonate (1.50 g) and DMF (25.0 mL) was heated at about 95° C. with stirring for 2.5 hrs. The reaction mixture was drowned into methanol (150 mL) and the red polymeric product was collected by filtration, washed with water containing a little acetic acid and then washed with hot water and dried in air (yield—2.35 g). The polymer by GPC analysis had a weight average molecular weight of 5,396, a number average molecular weight of 3,044 and a polydispersity value of 1.77.

EXAMPLE 4

Eastar® PETG copolyester 6763, a poly(ethylene-1,4-cyclohexanedimethylene) terephthalate, (Eastman Chemical Co.) (400 g. of previously dried pellets) was dry blended with the yellow anthraquinone polymeric composition (0.12 g) of Example 1. The blend was extruded with a C. W. Brabender ¾ in. extruder, equipped with a mixing screw, at 250° C. into a water bath and the extrudate pelletized.

The pellets were redried at 70° C. for about 17 hrs. at a pressure of about 1–5 torr. A portion of the dried pellets (1.40 g) was pressed into a 18–20 mil film at 250° C. using a 2-inch diameter circular mold in a Pasadena Hydraulic, Inc. press using 12,000 pounds ram force (4 inch ram). A transparent yellow film was produced with excellent color development, which contained about 300 ppm by weight of the yellow polymeric composition.

EXAMPLE 5

Example 4 was repeated using 0.12 g of the blue anthraquinone polymeric composition of Example 2 to give a bright blue transparent copolyester film with good color development.

EXAMPLE 6

Example 4 was repeated using 0.12 g of the red azo polymeric composition of Example 3 to produce a bright red transparent film having good color development.

EXAMPLE 7

A mixture of a blue anthraquinone compound (3.46 g, 0.005 mole) containing two acidic 1(H)-1,2,4-triazol-3-ylthio groups and having the following structure

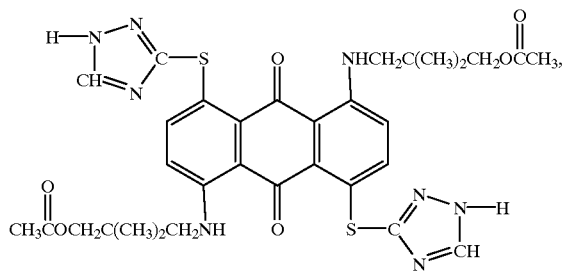

1,2-ethanediol, dimethanesulfonate (1.09 g, 0.005 mole) DMF (30 mL) and potassium carbonate (1.5 g) was heated with stirring at about 95° C. for 2.0 hours and then drowned into methanol (100 mL). The blue polydye was collected by filtration and washed with methanol. The methanol-wet cake was reslurried in water (400 mL) and the stirred mixture was acidified by addition of acetic acid and heated to about 60° C. The final polymeric product was collected by filtration, washed with water and dried in air (yield—1.5 g). Absorption maxima were observed at 594,636 nm in a solution of DMF in the visible light absorption spectrum. By GPC, the polydye has a weight average molecular weight (Mw) of 3,769, a number average molecular weight (Mn) of 2,119 and a polydispersity of 1.78.

EXAMPLE 7a

A mixture of 1,5-bis[(3-acetoxy-2,2-dimethylpropyl) amino-4,8-dibromoanthraquinone (6.50 g, 0.01 mole) (product of Example 2—Invention Report Docket No. 70524), 3-mercapto-1(H)-1,2,4-triazole (3.03 g, 0.03 mole), potassium carbonate (4.15 g, 0.03 mole), cupric chloride dihydrate (0.65 g) and DMF (100 mL) was heated 14 hours at about 100–105° C. The reaction mixture was drowned into a mixture of water (400 mL) and 10% aqueous solution of hydrochloric acid (200 mL). The blue product was collected by filtration, washed with hot water and dried in air (yield—6.58 g). FDMS supported the desired structure of the starting anthraquinone compound for Example 7.

EXAMPLE 8

A mixture of blue anthraquinone compound (2.48 g, 0.0033 mole) having the following structure

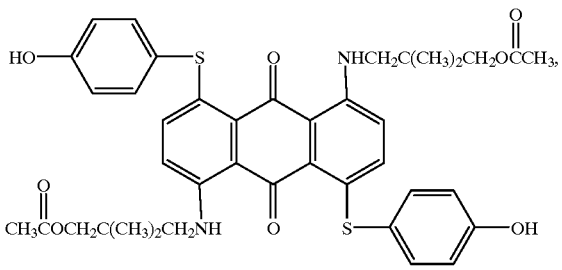

1,2-ethanediol, dimethanesulfonate (0.73 g, 0.0033 mole), potassium carbonate (0.5 g) and DMF (30.0 mL) was heated at about 95° C. for 3.0 hours. The reaction mixture was drowned into methanol (150 mL) with stirring and the blue polydye product was collected by filtration and washed with methanol. The methanol-wet cake was reslurried in water (200 mL) and the mixture acidified with acetic acid. Collecting the blue solid by filtration, washing with hot water and air drying gave 1.21 g of polydye product, which has absorption maxima at 606,652 nm in DMF in the visible absorption spectrum, a weight average molecular weight of 4,453, a number average molecular weight of 2,721 and a polydispersity of 1.6.

EXAMPLE 8a

A mixture of 1,5-bis [(3-acetoxy-2,2-dimethylpropyl) amino]-4,8-dibromoanthraquinone (19.56 g, 0.03 mole), p-hydroxybenzenethiol (17.64 g, 0.14 mole), potassium carbonate (19.32 g, 0.14 mole), cupric chloride dihydrate (1.0 g) and DMF (150 mL) was heated and stirred at 90–95° C. for 7.0 hours and then at 120° C. for about 2.0 additional hours. TLC (50:50 THF:cyclohexane) showed mostly the desired blue product, but still a small amount of violet half-reacted product was present. The reaction mixture was drowned into methanol (500 mL) and the mixture allowed to cool. After crystallization, the blue solid was collected by filtration, washed with methanol, washed with hot water and then dried in air (yield—17.6 g). FDMS supported the desired structure of the starting anthraquinone compound for Example 8. In the visible light absorption spectrum in DMF, a maximum absorbance ($\lambda$max) was observed at 652 nm (extinction coefficient $\epsilon$ of 24,638).

EXAMPLE 9

A mixture of 1,4-bis-(2,6-dimethyl-4-hydroxyanilino) anthraquinone (4.78 g, 0.01 mole) (Synthesis Example 1 of U.S. Pat. No. 3,918,976), 1,2-ethanediol, dimethanesulfonate (2.18 g, 0.01 mole), potassium carbonate (3.0 g) and DMF (60 mL) was heated at 90–95° C. with stirring for 4.0 hours. After drowning the reaction mixture into methanol (300 mL), the product was collected by filtration and washed with methanol until filtrate was essentially colorless. The methanol-wet cake was reslurried in 100 mL water and acidified by adding acetic acid with stirring. After heating to about 50° C., the product was collected by filtration, washed with hot water and dried in air (yield—1.2 g). By GPC, the blue polydye had a weight average molecular weight (Mw) of 2,764, a number average molecular weight (Mn) of 1,607 and a polydispersity of 1.72. In DMF, the visible light absorption maxima were at 586,630 nm.

EXAMPLE 10

A mixture of an anthraquinone diacidic compound (1.52 g, 0.002 mole) having the following structure

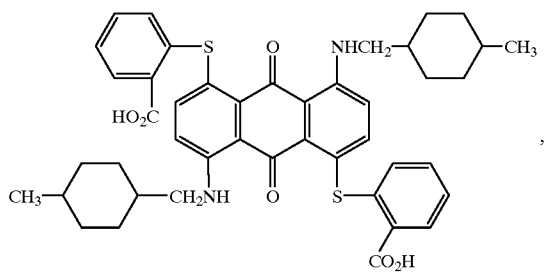

1,2-ethanediol, dimethanesulfonate (0.44 g, 0.002 mole), potassium carbonate (0.5 g) and DMF (8.0 mL) was heated at about 95° C. with occasional stirring for 20 hours. The reaction mixture was downed into methanol (50 mL) and the product was collected by filtration, washed with methanol, water plus acetic acid, hot water and then dried in air (yield—1.05 g). The blue polydye had a weight average molecular weight (Mw) of 3,586, a number average molecular weight (Mn) of 1,867 and a polydispersity value of 1.92. In the visible light absorption spectrum, maxima of absorbance occurred at wavelengths of 605 and 647 nm in DMF.

EXAMPLE 10a

A mixture of 1,5-bis-(4-methylcyclohexanemethylamino)-4,8-dibromoanthraquinone (20.0 g, 0.0324 mole), thiosalicyclic acid (11.55 g, 0.075 mole), potassium carbonate (10.35 g, 0.075 m), cupric chloride dihydrate (1.0 g) and DMF (175 mL) was heated at about 95° C. for 4.0 hours and then drowned into acetone (400 mL). The solid which crystallized was collected by filtration, washed with acetone until the filtrate was no longer red. The dipotassium salt of the diacidic anthraquinone compound was dissolved by adding to water (500 mL) and stirring. The blue product which was precipitated by acidification with acetic acid was collected by filtration, washed with hot water and then dried in air (yield—21.5 g). FDMS indicated the structure to be consistent with that given above in Example 10 for the starting diacidic anthraquinone compound.

EXAMPLE 10b

A solution of 1,5-bis-(4-methylcyclohexanemethylamino) anthraquinone (65.0 g, 0.142 mole) dissolved in DMF (1.0 L) by stirring at about 55° C. was treated with a solution of N-bromosuccinimide (50.5 g, 0.284 mole) in DMF (200 mL). After addition was completed, the bromination reaction was completed by heating at 55–60° C. for 2.0 hours. Water (1.0 L) was added to precipitate the red product which was collected by filtration, washed with water and dried in air. After being reslurried in hot methanol and cooling, the product was collected by filtration, washed with a little methanol and air dried (yield—84.0 g). FDMS indicated the structure to be that of the starting, dibrominated anthraquinone compound of Example 10a.

EXAMPLE 10c

A mixture of 1,5-dichloroanthraquinone (48.0 g, 0.17 mole), 4-methyl-1-aminomethylcyclohexane (88.9 g, 0.70 mole), 2-ethoxyethanol (400 mL) was stirred and heated at reflux for 35.0 hours and the reaction mixture allowed to cool. The red product was precipitated by the addition of methanol and was the collected by filtration, washed with methanol and dried in air (yield—66.0 g). FDMS indicated the product to be the starting anthraquinone compound for Example 10b.

EXAMPLE 11

A mixture of diacidic anthraquinone compound (0.69 g, 0.001 m) having the following structure

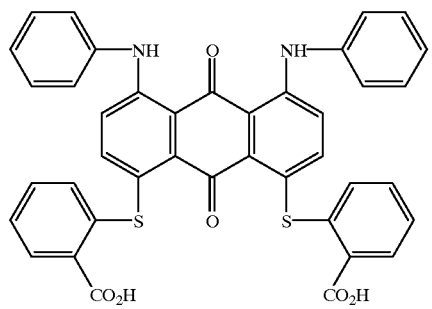

1,6-hexanediol, dimethanesulfonate (0.27 g, 0.001 mole), potassium carbonate (0.3 g) and DMF (5.0 mL) was heated with occasional stirring for 2.5 hours at about 95° C. The reaction mixture was drowned into methanol (100 mL) and the product collected by filtration, washed with methanol, water containing a little acetic acid and then finally with hot water and air dried (yield—0.45 g). The blue polydye had an absorption maximum at 610 nm in DMF, a weight average molecular weight of 3,311 a number average molecular weight of 1,272 and a polydispersity value of 2.63.

EXAMPLE 11a

A mixture of 1,8-di-(2-carboxyphenylthio)-4,5-dinitroanthraquinone (4.00 g, 0.0066 mole), aniline (2.5 g) and nitrobenzene (30.0 mL) was heated at reflux with stirring for 5.0 hours. The reaction mixture was drowned into hexane and the hexane decanted. The product was washed again by adding hexane, stirring and decanting. The crude product was slurried in acetone and heated to reflux and the blue product collected by filtration, washed with water and air dried (yield—0.75 g). FDMS indicated the product to be mostly 1,8-dianilino-4,5-di-(2-carboxyphenylthio)anthraquinone, the starting diacidic, anthraquinone compound for Example 11.

EXAMPLE 11b

The potassium salt of thiosalicyclic acid (4.75 g, 0.03 mole) was made by addition to DMF (75 mL) and heating in the presence of potassium carbonate (8.70 g, 0.06 mole) for 2.0 hours at about 95° C. The cooled mixture was added to a solution of 1,8-dichloro-4,5-dinitroanthraquinone (5.51 g, 0.015 mole) dissolved in DMF (150 mL) at about 0–5° C. with stirring. The reaction mixture was allowed to warm to about 25° C. with stirring continued for 2.0 hours and then poured into water. The product was obtained in essentially quantitatively yield by slowly acidifying with 10% hydrochloric acid and was then collected by filtration, washed with water and dried in air. FDMS indicated the product to be mostly the starting anthraquinone compound used in Example 11a.

EXAMPLE 12

A mixture of the diacidic anthraquinone compound (0.85 g. 0.0015 m) having the following structure

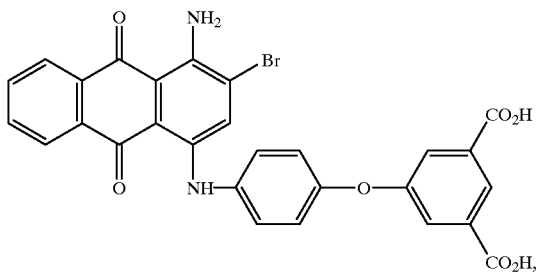

1,6-hexanediol, dimethanesulfonate (0.41 g, 0.0015 m), potassium carbonate (0.5 g) and DMF (5.0 mL) was heated at about 95° C. for 2.0 hours with occasional stirring. The reaction mixture was drowned into methanol (100 mL) and the blue polydye was collected by filtration, washed with methanol, water containing a little acetic acid and finally hot water and then dried in air (yield—0.62 g). GPC analysis indicated a weight average molecular weight of 20,020, a number average molecular weight of 2,313 and a polydispersity of 8.66. An absorption maximum was observed at 591 nm in the visible light absorption spectrum in DMF.

EXAMPLE 12a

The anthraquinone diester compound (4.00 g) having the following structure

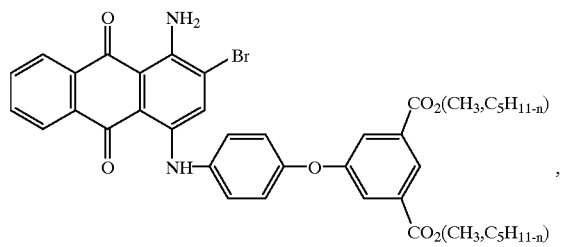

50% aqueous sodium hydroxide (2.40 g) and 2-ethoxyethanol (60 mL) were combined and heated with stirring at about 95° C. for 0.5 hour. Hydrolysis of ester groups appeared to be complete by TLC (50:50 THF:cyclohexane). The reaction mixture was drowned into water (600 mL) and the blue solution acidified using acetic acid. The blue solid was collected by filtration washed with water and dried in air (yield—3.80 g). FDMS indicated the structure to be mostly that of the starting diacidic anthraquinone compound in Example 12 plus a small amount of a violet compound probably produced by displacement of the bromine atom with the 2-(ethoxy)ethoxy group.

EXAMPLE 12b

A mixture of 1-amino-2,4-dibromoanthrquinone (7.62 g, 0.02 mole), dimethyl 5(4-aminophenoxy)isophthalate (9.03 g, 0.03 mole), 1-pentanol (100 mL), potassium acetate 4.0 g), and cupric acetate (0.2 g) was heated at reflux for 4.0 hours and until all of the starting material had been used up as indicated by TLC analysis (20:80 THF:cyclohexane). Several blue components presumed to be a mixture of ester products produced by transesterification were observed. The reaction mixture was drowned into methanol (100 mL) and the product was collected by filtration, washed thoroughly with methanol to remove a red by-product and then washed with water and dried in air (yield—7.81 g). FDMS indicated ions corresponding to the dimethylester, monopentyl ester and dipentylester of the product—the structure of the starting material for Example 12a.

EXAMPLE 12c

A mixture of dimethyl 5-(4-nitrophenoxy)isophthalate (30.0 g, 0.09 mole), isopropanol alcohol (350 mL) and ethanol wet Raney nickel catalyst (5.0 g) was hydrogenated at 90° C. for 4.0 hours at 1500 psi hydrogen pressure in an autoclave. Isopropanol (100 mL) was added to the reaction mixture from the autoclave and the solid product dissolved by heating. The Raney nickel was removed by hot filtration and the filtrate allowed to cool. The off-white solid was collected by filtration and dried in air (yield—17.8 g). FDMS indicated the product to be dimethyl 5-(4-aminophenoxy)isophthalate used in Example 12b.

EXAMPLE 12d

A mixture of 1-chloro-4-nitrobenzene (47.1 g, 0.30 mole), dimethyl 5-hydroxyisophthalate (63.0 g, 0.30 mole), anhydrous potassium carbonate (41.4 g), potassium iodide (0.2 g) and DMF (200 mL) was heated at 120–125° C. for 1.5 hours, under a slow nitrogen sweep allowing some distillate to be removed (about 75 mL) via a Dean-Stark trap. Additional DMF (50 mL) was added back to the reaction mixture and heating continued for an additional 1.5 hours while an additional amount of distillate (25 mL) was allowed to collect in the Dean-Stark trap. The reaction mixture was allowed to cool to about 45° C. A heavy slurry of pale yellow product resulted which was diluted further by the addition of an ice-water mixture (350 g) with good stirring. Filtration followed by washing with water and drying in air gave the pale yellow dimethyl 5-(4-nitrophenoxy)isophthalate (90.7 g) (structure supported by FDMS) which was used in Example 12c.

EXAMPLE 13

A mixture of the diacidic anthraquinone compound (1.26 g, 0.002 mole) having the following structure

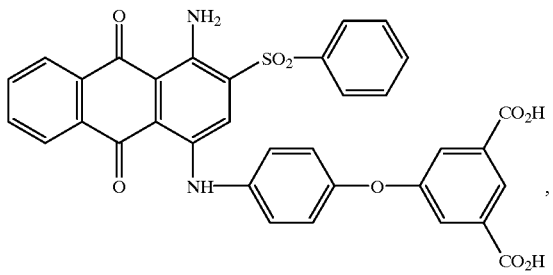

1,6-hexandiol, dimethanesulfonate (0.58 g, 0.002 mole), potassium carbonate (0.5 g) and DMF (6.0 mL) was heated at 90–95° C. for 2.0 hours with occasional stirring. The reaction mixture was drowned into methanol (100 mL) and the dark blue-green polydye was collected by filtration, washed with methanol, water containing a little acetic acid and finally with water and then dried in air (yield 1.13 g). GPC analysis indicated a weight average molecular weight of 14,776, a number average molecular weight of 2,514 and a polydispersity of 5.88. An absorption maximum was observed at 620 nm in the visible light absorption spectrum in DMF.

EXAMPLE 13a

A portion (1.72 g, 0.003 mole) of the bromoanthraquinone product of Example 12a, benzenesulfinic acid, Na salt (0.98 g, 0.006 mole), potassium carbonate (1.38 g) and DMF (25 mL) were mixed and the reaction mixture heated with stirring at 90–95° C. for 1.0 hour. A bathochromic shift in color was observed as the 2-bromo substituent was replaced by the 2-phenylsulfonyl group on the anthraquinone nucleus. The greenish-blue solution was drowned into acetone (100 mL) and the solid material was collected by filtration and washed with acetone until the filtrate was pale blue. The acetone-wet solid was added with stirring to water (200 mL) and the mixture acidified with acetic acid. After being heated to about 75° C., the reaction mixture was filtered and the dark blue solid was washed with hot water and dried in air (yield—1.50 g). FDMS indicated the structure to be that of the starting diacidic anthraquinone compound used in Example 13.

EXAMPLE 14

A mixture of the diacidic anthraquinone compound (1.45 g, 0.003 mole) having the structure

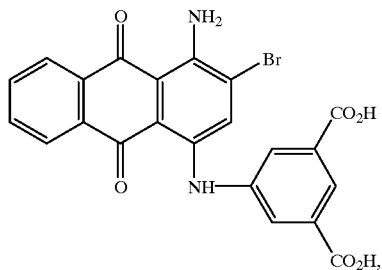

1,6-hexanediol, dimethanesulfonate (0.82 g, 0.003 mole), potassium carbonate (0.5 g) and DMF (8.0 mL) was heated at about 95° C. for 2.0 hours. The reaction mixture was drowned into methanol (100 mL) and the blue polydye was collected by filtration and washed with methanol, water containing a little acetic acid and finally hot water and dried in air (yield—1.10 g). GPC analysis indicated a weight average molecular weight of 3,727, a number average weight of 1,031 and a polydispersity of 3.61. Absorption maxima were observed at 623 nm and 585 nm in the visible light absorption spectrum in DMF.

EXAMPLE 15

A mixture of the diacidic anthraquinone compound (1.50 g, 0.003 mole) having the following structure

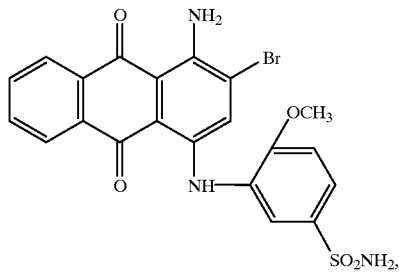

1,6-hexanediol, dimethanesulfonate (0.82 g, 0.003 mole), potassium carbonate (0.5 g) and DMF (8.0 mL) was heated with occasional stirring at about 95° C. for 2.0 hours. The reaction mixture was then drowned into methanol (100 mL) and the blue polydye was collected by filtration, washed with methanol, water containing a little acetic acid, and hot water and then dried in air (yield—0.90 g). An absorption maximum at 591 nm was observed in the visible light absorption spectrum in DMF.

EXAMPLE 15a

To DMF (40 mL) was added 1-amino-2-Br-4-(5-chlorosulfonyl-2-methoxyanilino) anthraquinone (4.0 g) with stirring. When solution appeared to be complete, conc. ammonium hydroxide (4.0 g) was added and stirring was continued at ambient temperature for 30 minutes. TLC using 50:50 THF:cyclohexane indicated complete reaction of the sulfonyl chloride compound to produce the desired sulfonamide. The reaction mixture was drowned into water and the blue product was collected by filtration, washed with water and air dried (yield—3.8 g). FDMS indicated the structure to be that of the starting compound for Example 15.

EXAMPLE 15b

To chlorosulfonic acid (100 mL) was added 1-amino-4-o-anisidino-2-bromoanthraquinone (10.0 g, 0.0236 mole) portionwise with good stirring at 25–30° C. After addition was completed, the reaction mixture was stirred at room temperature for 1.0 hour. The reaction mixture was added in a fine stream to cold isopropanol (800 mL) with stirring. The blue product was collected by vacuum filtration on a sintered glass funnel, washed with isopropanol and dried in air (yield—10.3 g) and used without further purification in Example 15a.

EXAMPLE 16

A mixture of the diacidic anthraquinone compound (0.58 g, 0.001 m) having the following structure

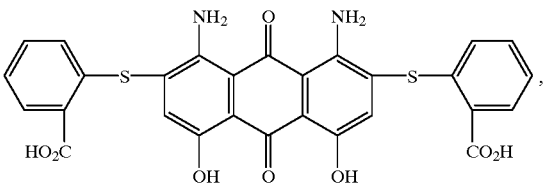

1,2-ethanediol, dimethanesulfonate (0.22 g, 0.001 m), potassium carbonate (0.3 g) and DMF (5.0 mL) was heated at 95° C. for 2.5 hours. The reaction mixture was drowned into methanol (100 mL) and the greenish-blue polydye was collected by filtration, washed with methanol, water containing a little acetic acid and water and then air dried (yield—0.33 g). GPC analysis indicated a weight average molecular weight of 4,144 a number average molecular weight of 1,643 and a polydispersity of 2.52. An absorption maximum at 629 nm was observed in the visible light absorption spectrum in DMF.

EXAMPLE 16a

A mixture of 1,8-diamino-2,7-dibromo-4,5-dihydroxyanthraquinone (2.19 g, 0.005 mole), thiosalicyclic acid (1.60 g, 0.104 mole), potassium carbonate (1.5 g) and DMF (25.0 mL) was heated at 95–100° C. for 6.0 hours. A bathochromic shift in color occurred as the two bromine atoms were replaced by the 2-carboxyphenylthio groups. The reaction mixture was drowned into methanol and the solid product was collected by filtration and washed with methanol. The product was dissolved in water (100 mL) and the diacidic anthraquinone which precipitated by addition of acetic acid was collected by filtration, washed with water and dried in air (yield—0.86 g). FDMS indicated the product to be that used as starting material for Example 16.

EXAMPLE 17

The anthraquinone disulfonyl chloride compound (3.50 g, 0.005 mole) having the following structure

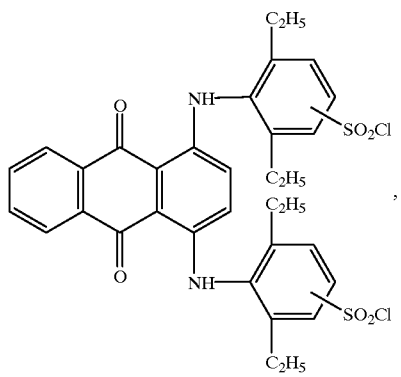

(prepared according to the procedure of U.S. Pat. No. 5,453,482, Example 2), m-aminobenzoic acid (1.37 g, 0.10 mole), potassium carbonate (2.80 g) and DMF (30 mL) were mixed and the reaction mixture heated at 90–95° C. for 30 minutes. TLC (50:50 THF:cyclohexane) indicated complete reaction of the disulfonyl chloride to produce the disulfonamide derivative. To the reaction mixture were added 1,6-hexanediol, dimethanesulfonate (1.38 g, 0.005 m), potassium carbonate (1.38 g) and heating and stirring were continued for 2.0 hours at 90–95° C. The reaction mixture was drowned into water and acidified with acetic acid. The bright blue polydye was collected by filtration, washed with water and then air dried (yield—2.07 g) and is believed to have the following repeat unit:

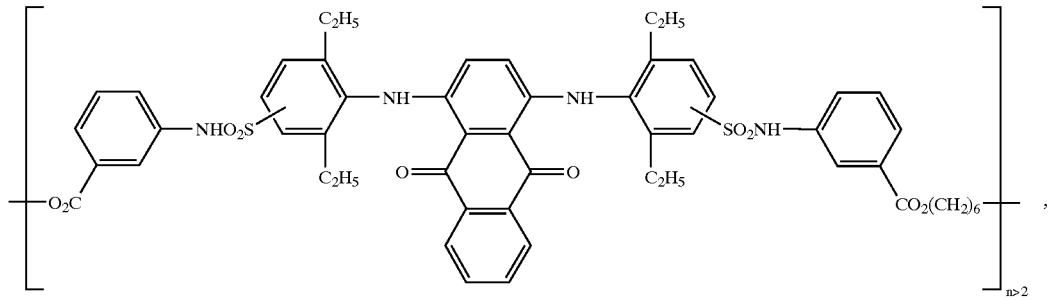

GPC analysis indicated a weight average molecular weight of 5,252, a number average molecular weight of 2,179 and a polydispersity of 2.41. Absorption maxima at 583 nm and 628 nm were observed in the visible light absorption spectrum in DMF.

EXAMPLE 18

A mixture of the diacidic anthraquinone compound (4.21 g, 0.01 mole) having the following structure

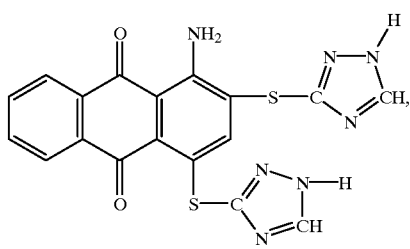

1,2-ethanediol, dimethanesulfonate (2.18 g, 0.01 mole), potassium carbonate (2.68 g, 0.02 mole) and DMF (50 mL) was heated and stirred at 90–95° C. for 1.5 hours. The reaction mixture was drowned into water (400 mL) and acidified with stirring and by adding acetic acid. After being heated to about 50° C., the mixture was filtered and the red polydye washed well with water and dried in air (yield—4.47 g). GPC analysis showed the polydye to have a weight average molecular weight of 1,603, a number average molecular weight of 922 and a polydispersity of 1.74. An absorption maximum at 524 nm was observed in the visible light absorption spectrum in DMF.

EXAMPLE 18a

A mixture of 1-amino-2,4-dibromoanthraquinone (11.43 g, 0.03 mole), 3-mercapto-1(H)-1,2,4-triazole (9.09 g, 0.09 mole), potassium carbonate (11.52 g, 0.09 mole) and DMF (150 mL) was heated at about 95° C. with stirring for 1.0 hour. The reaction mixture was drowned into water (500 mL) with stirring and acidified with acetic acid and the red product collected by filtration, washed with water and dried in air (yield—12.64 g). FDMS indicated the product to be the diacidic anthraquinone compound used in Example 18.

EXAMPLE 19

A mixture of 1,5-bis-(4-hydroxyphenylthio) anthraquinone (4.56 g, 0.01 mole), 1,2-ethanediol, dimethanesulfonate (2.18 g, 0.01 mole), potassium carbonate (3.0 g) and DMF (50 mL) was heated and stirred at about 95° C. for 2.0 hours. The reaction mixture was drowned into methanol (100 mL) and the yellow polydye was collected by filtration and washed with methanol. The methanol-wet cake was reslurried in water (500 mL) and acidified and the polydye then collected by filtration, washed with water and dried in air (yield—4.25 g). GPC analysis indicated the polydye to have a weight average molecular weight of 1,901, a number average molecular weight of 1,588 and a polydispersity of 1.20. An absorption maximum at 461 nm was observed in the visible light absorption spectrum in DMF.

EXAMPLE 19a

A mixture of 1,5-dichloroanthraquinone (5.54 g, 0.02 mole), 4-hydroxybenzenethiol (6.30 g, 0.05 mole), potassium carbonate (6.90 g, 0.05 mole) and DMF (100 mL) was heated at about 95° C. for 5.0 hours. The reaction mixture was drowned into water (400 mL) and the yellow product was collected by filtration, washed with water and dried in air (yield—9.0 g). The solid was added to acetic acid (150 mL) and the mixture heated to boiling. After being allowed to cool, the yellow solid was collected by filtration, washed with acetic acid and dried in air (yield—6.75 g). FDMS confirmed that the product was the 1,5-bis(4-hydroxyphenylthio)anthraquinone used in Example 19.

EXAMPLE 20

A mixture of 1,4-bis-(2-carboxyphenylthio) anthraquinone (1.53 g, 0.003 m), 1,2-ethanediol, dimethanesulfonate (0.66 g, 0.003 mole), potassium carbonate (0.75 g) and DMF (8.0 mL) was heated at about 95° C. with occasional stirring for 2.0 hours. The reaction mixture was then drowned into methanol (100 mL) and the dark orange polydye was collected by filtration, washed with water containing some acetic acid then with hot water and dried in air (yield—0.50 g). GPC analysis indicated a weight average molecular weight of 8,686, a number average molecular weight of 1,356 and a polydispersity of 6.41.

EXAMPLE 20a

A mixture of 1,4-dichloroanthraquinone (2.77 g, 0.01 mole), thiosalicyclic acid (3.85 g, 0.025 m), potassium carbonate (3.45 g, 0.025 m), cupric chloride dihydrate (0.1 g) and DMF (50 mL) was heated at 95–100° C. with stirring for 4.0 hours. The reaction mixture was drowned into acetone and the solid was collected by filtration and washed with acetone. The resulting potassium salt of the product was dissolved by stirring in water (200 mL). The red solution was neutralized to give the orange product which was collect by filtration, washed with water and dried in air (yield—4.58 g). FDMS indicated the structure to be that of the starting material for Example 20. An absorption maximum at 501 nm was observed in the visible light absorption spectrum.

EXAMPLE 21

A mixture of 1,8-bis-(2-carboxyphenylthio)-4,5-bis-(p-tolylthio)anthraquinone (1.51 g, 0.002 mole), 1,4-butanediol, dimethanesulfonate (0.49 g, 0.002 mole), potassium carbonate (0.60 g and DMF (8.0 mL) was heated at 90–95° C. with occasional stirring for 2.5 hours. The reaction mixture was drowned into methanol (100 mL) and the red polydye was collected by filtration, washed with methanol, water containing acetic acid, hot water and then dried in air (yield—1.1 g). GPC analysis indicated a weight average molecular weight of 2,157, a number average molecular weight of 1,111 and a polydispersity of 1.94. An absorption maximum was observed at 529 nm in the visible light absorption spectrum in DMF.

EXAMPLE 21a

A mixture of thiosalicyclic acid (4.75 g, 0.03 mole), potassium carbonate (8.70 g, 0.06 mole) and DMF (75 mL) was heated at about 100° C. for 1.0 hour and the reaction mixture, which was allowed to cool, was added at 0–5° C. to a solution of 1,8-dichloro-4,5-dinitroanthraquinone (5.51 g. 0.015 mole) dissolved in DMF (150 mL) with good stirring. Cooling was removed and the temperature of the reaction mixture allowed to come to ambient temperature and the mixture was stirred for about 3.0 hours. A solution of p-thiocresol (3.73 g, 0.03 mole) dissolved in DMF (80 mL) was added to the reaction mixture with stirring and the temperature raised to about 100° C. and held for 2.0 hours. After allowing to cool, the reacting mixture was drowned into water (300 mL) and the mixture gradually acidified by the addition of 10% aqueous hydrochloric acid. The red solid product was collected by filtration, washed with water and dried in air (yield—11.28 g). FDMS analysis indicated that the product consisted mostly of the starting material for Example 21.

EXAMPLE 22

A mixture of 1,5-bis(2-carboxyphenylthio)anthraquinone (1.54 g, 0.003 mole), 1,5-bis(2-carboxyhenylthio)-4,8-bis(isobutylamino)anthraquinone (1.31 g, 0.002 mole) (product of Example 2a), 1,2-ethandiol, dimethanesulfonate (1.09 g, 0.005 mole), potassium carbonate (1.0 g) and DMF (10 mL) was heated at 90–95° C. with occasional stirring for 2.0 hours. The reaction mixture was drowned into methanol (100 mL) and the green polydye was washed with methanol, water containing acetic acid, hot water and then dried in air (yield—1.30 g). GPC analysis indicated a weight average molecular weight of 1,839, a number average molecular weight of 1,040 and a polydispersity of 1.77. Absorption maxima were observed in the visible light absorption spectrum in DMF at 448, 603, and 645 nm.

EXAMPLE 23

A mixture of 1,5-bis(2-carboxyphenylthio)anthraquinone (1.28 g, 0.0025 mole), 1,4-cyclohexanedimethanol, dimethanesulfonate (1.75 g, 0.0025 mole), potassium carbonate (0.82 g) and DMF (7.5 mL) was heated at about 95° C. with occasional stirring for 3.0 hours. The reaction mixture was drowned into methanol (100 mL) and the yellow polydye was collected by filtration, washed with methanol, water containing acetic acid, hot water and then dried in air (yield—0.31 g). GPC analysis indicated a weight average molecular weight of 1,158, a number average molecular weight of 1,008 and a polydispersity of 1.15.

EXAMPLE 24

Example 23 was repeated except that the disulfonate used was 1,3-propanediol, 2,2-dimethyl, dimethanesulfonate (0.65 g, 0.0025 mole) to give the yellow polydye (yield—0.76 g) which had a weight average molecular weight of 1,056, a number average molecular weight of 979 and a polydispersity of 1.08 by GPC analysis.

EXAMPLE 25

Example 23 was repeated except that 1,6-hexanediol, dimethanesulfonate (0.68 g, 0.0025 mole) was used as the disulfonate to give the yellow polydye (yield—1.16 g) which had a weight average molecular weight of 1,827, a number average molecular weight of 961 and a polydispersity of 1.90 by GPC analysis.

EXAMPLE 26

Example 23 was repeated except that 1,2-ethanediol, bis(4-methylbenzenesulfonate (0.82 g, 0.0025 mole) was used as the disulfonate to yield the yellow polydye (yield—0.41 g) which had a weight average molecular weight of 2,442, a number average molecular weight of 1,885 and a polydispersity of 1.29 by GPC analysis.

EXAMPLE 27

A mixture of the acidic anthraquinone compound (2.02 g, 0.0027 mole) having the structure

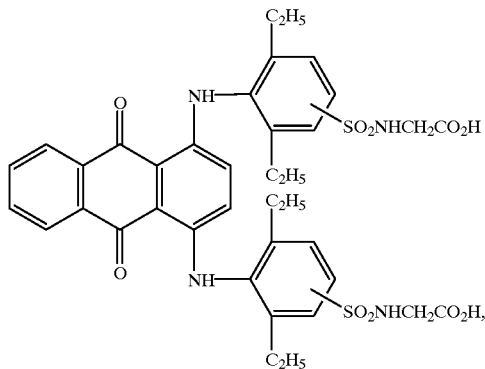

the acidic UV light absorbing compound (0.29 g, 9×10⁻⁴ mole) having the structure

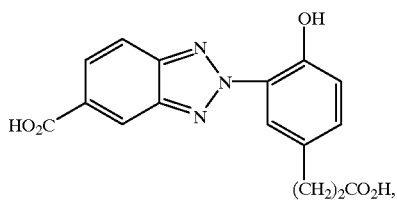

1,2-ethanediol, dimethanesulfonate (0.78 g, 0.0036 mole), potassium carbonate (1.0 g) and DMF (25 mL) was heated and stirred at 90–95° C. for 2.0 hours. The cooled reaction mixture was drowned into water (200 mL) and made slightly acidic by the addition of acetic acid with stirring. The polymeric product was collected by filtration, washed well with water and dried in air (yield—2.00 g). GPC analysis indicated a weight average molecular average of 5,642, a number average molecular weight of 1,720 and a polydispersity of 3.28.

EXAMPLE 28

A mixture of the diacidic anthraquinone compound (1.27 g, 0.002 mole) having the structure

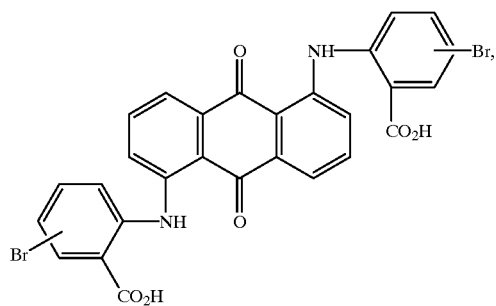

1,2-ethanediol, dimethanesulfonate (0.44 g, 0.002 mole), potassium carbonate (0.75 g) and DMF (8.0 mL) was heated at 90–95° C. with occasional stirring for 2.0 hours. The reaction mixture was drowned into methanol (100 mL) and the dark red polydye was collected by filtration, washed with methanol, water containing acetic acid, hot water and then dried in air (yield—1.23 g). GPC analysis indicated a weight average molecular weight of 1,545, a number average molecular weight of 1,213 and a polydispersity of 1.27.

EXAMPLE 28a

To a mixture of 1,5-bis(2-carboxyanilino)anthraquinone (9.57 g, 0.02 mole) in DMF (250 mL) was added portionwise N-bromosuccinimide (7.12 g, 0.04 mole) with stirring at room temperature. The reaction mixture was then heated at about 60° C. for 1.5 hours and allowed to cool. Water was added dropwise to precipitate the product, which was collected by filtration, washed with water and dried in air (yield—11.17 g). FDMS indicated the structure of the product to be that of the starting anthraquinone compound in Example 28.

EXAMPLE 29

A mixture of the diacidic anthraquinone compound (4.06 g, 0.01 mole) having the structure

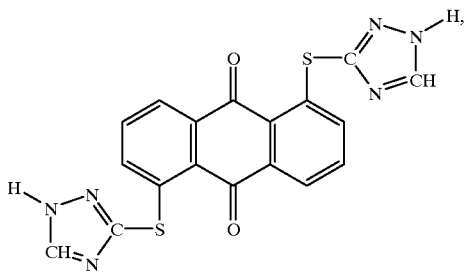

1,2-ethanediol, dimethanesulfonate (2.18 g, 0.01 mole), potassium carbonate (2.76 g) and DMF (150 mL) was heated at about 100° C. for 3.0 hours. The reaction mixture was drowned into water, acidified with acetic acid and the yellow polydye was collected by filtration, washed with water and dried in air. GPC analysis indicated a weight average molecular weight of 5,333, a number average molecular weight of 2,441, and a polydispersity of 2.18.

EXAMPLE 29a

A mixture of 1,5-dichloroanthraquinone (6.93 g, 0.025 mole), 3-mercapto-1(H)-1,2,4-triazole (5.56 g, 0.055 mole), potassium carbonate (6.91 g, 0.05 mole) and DMF (100 mL) was heated and stirred at about 95° C. for 5.0 hours. The mixture was drowned into water and the yellow product was collected by filtration, washed with water and air dried. The cake was reslurried in hot isopropanol and the product collected by filtration, washed with isopropanol and dried in air (yield 8.62 g). FDMS indicated the product to be 1,5-bis[1(H)-1,2,4-triazol-3-ylthio]anthraquinone used as the diacidic anthraquinone starting material in Example 29.

EXAMPLE 30

A mixture of diacidic anthraquinone compound (1.01 g, 0.0025 mole) having the structure

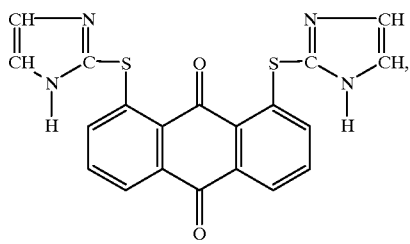

1,2-ethanediol, dimethanesulfonate (0.55 g, 0.0025 mole), potassium carbonate (0.75 g) and DMF (10 mL) was heated at about 95° C. for 3.0 hours. The reaction mixture was then drowned into methanol (100 mL) and the yellow polydye was collected by filtration, water containing acetic acid, hot water and then air dried (yield—0.35 g). GPC analysis indicated a weight average molecular weight of 2,478, a number average molecular weight of 742 and a polydispersity of 3.34. An absorption maximum was observed in the visible light absorption spectrum at 425 nm in DMF.

EXAMPLE 30a

A mixture of 1,8-dichloroanthraquinone (6.93 g, 0.025 mole), 2-mercaptoimidazole (5.01 g, 0.05 mole), potassium carbonate (6.91 g) and DMF (60 mL) was heated and stirred at about 95° C. for 8.0 hours. The reaction mixture was drowned into water and acidified using acetic acid. The yellow product was collected by filtration, washed with water and dried in air. FDMS indicated the product to be the 1,8-bis(imidazol-2ylthio) anthraquinone diacidic compound used as the starting material in Example 30.

EXAMPLE 31

A mixture of 1,5-bis[1(H)-1,2,4-triazol-3ylthio] anthraquinone (1.80 g, 0.00443 mole) (product of Example 29a), 1,4-dibromobutane (0.96 g, 0.00444 mole), tributylamine (1.64 g, 0.00885 mole), and N-methyl-2-pyrrolidinone (30 mL) was heated at 8.0 hours at about 130° C. with stirring. The reaction mixture was drowned into acetone (150 mL) and the yellow polydye was collected by filtration, washed with acetone until filtrate was essentially clear and dried in air. GPC analysis indicated a weight average molecular weight of 5,022, a number average molecular weight of 3,220 and a polydispersity of 1.56.

EXAMPLE 32

A mixture of the diacidic anthraquinone compound (1.63 g, 0.003 mole) having the structure

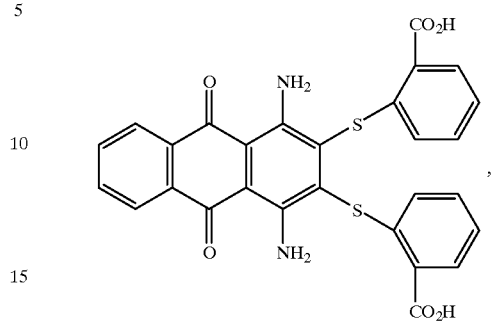

1,6-hexanediol, dimethanesulfonate (0.82 g, 0.003 mole), potassium carbonate (0.5 g) and DMP (8.0 mL) was heated at about 95° C. with occasional stirring for 2.0 hours. The mixture was drowned into methanol (100 mL) and the dark blue polydye was collected by filtration, washed with methanol, water containing acetic acid, hot water and dried in air (yield—0.92 g). Absorption maxima at 602 and 644 nm were observed in the visible light absorption spectrum in DMF. GPC analysis indicated a number average molecular weight of 1,860.

Example 32a

A mixture of 1,4-diamino-2,3-dichloroanthraquinone (12.24 g, 0.04 mole), thiosalicylic acid (15.4 g, 0.10 mole), potassium carbonate (13.8 g, 0.10 mole) and DMF (150 mL) was heated at about 95° C. with stirring for 2.0 hours. A bathochromic shift in color from violet to blue was observed as the reaction progressed. The reaction mixture was drowned into acetone (500 mL) and the solid product was collected by filtration and washed well with acetone. The acetone-wet cake was added to water (600 mL) and the mixture acidified with acetic acid to precipitate the free acid compound, which was collected by filtration, washed with water and dried in air (yield—21.4 g). FDMS indicated the product to be the 1,4-diamino-2,3-bis(2-carboxyphenylthio) anthraquinone used in Example 32.

EXAMPLE 33

A mixture of 1,5-bis(2-carboxyphenylthio) anthraquinone (1.02 g, 0.002 mole), terephthalic acid (1.00 g, 0.006 mole), potassium carbonate (1.38 g) 1,2-ethanediol, dimethanesulfonate (1.74 g, 0.008 mole) and DMF (10 mL) was heated at about 95° C. with occasional stirring for 2.0 hours. The mixture was then drowned into methanol (100 mL) and the yellow polydye was collected by filtration, washed with methanol, water containing acetic acid, hot water and dried in air (yield—1.88 g). GPC analysis indicated a weight average molecular weight of 794, a number average molecular weight of 713 and a polydispersity of 1.11.

EXAMPLE 34

Example 33 was repeated using 1,5-bis(2-carboxyphenylthio) anthraquinone (1.02 g, 0.002 mole) and terephthalic acid (0.33 g, 0.002 mole), 1,2-ethanediol, dimethanesulfonate (0.87 g, 0.004 mole) and potassium carbonate (0.87 g) to yield the yellow polydye (0.90 g). GPC analysis indicated a weight average molecular weight of 875, a number average molecular weight of 811, and a polydispersity of 1.08.

EXAMPLE 35

A mixture of the diacidic anthraquinone compound (2.00 g, 0.00285 mole) having the following structure (Preparation 5 of IR Docket 70351):

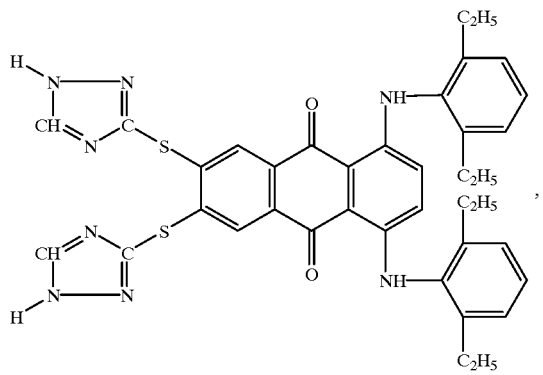

1,2-ethanediol, dimethanesulfonate (0.63 g, 0.00289 mole), potassium carbonate (0.80 g) and DMF (25 mL) was heated at 95° C. for 4.0 hours with stirring. The reaction mixture was drowned into methanol (100 mL) and the greenish-blue polydye was collected by filtration, washed with methanol, water containing acetic acid, hot water and dried in air (yield—1.01 g). GPC indicated a weight average molecular weight of 6,720, a number average molecular weight of 2,211 and a polydispersity of 3.04. Absorption maxima were observed at 599 and 647 nm in the visible absorption spectrum in DMF.

EXAMPLE 36

A mixture of the diacidic anthraquinone compound (0.41 g, 0.508 mmole) having the following structure (Preparation 4 in IR Docket 70351):

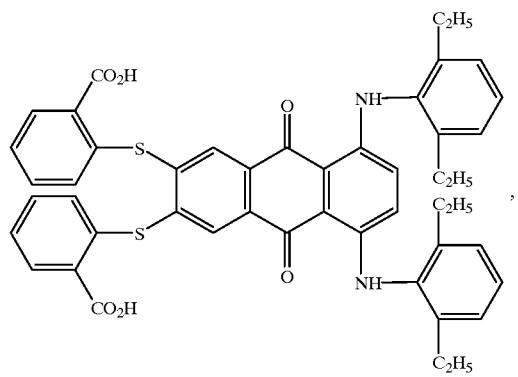

1,2-ethanediol, dimethanesulfonate (0.11 g, 0.504 mmole), potassium carbonate (0.14 g) and DMF (5.0 mL) was heated with occasional stirring or about 95° C. for 3.0 hours. The reaction mixture was drowned into methanol (50 mL) and the greenish-blue polydye was collected by filtration, washed with methanol, water containing acetic acid, hot water and dried in air (yield 0.15 g). Absorption maxima were observed at 599 and 645 nm in the visible light absorption spectrum in DMF.

EXAMPLES 37–66

Colored EASTAR® copolyester 6763 film was produced by melt blending the polydyes of Examples 7–36 and extruding according to the following procedure to produce Examples 37–66 (Table 1).

EASTAR® PETG polyester 6763, a poly(ethylene-1,4-cyclohexanedimethylene) terephthalate (Eastman Chemical Company) (300 g of previously dried pellets) was dry blended with the anthraquinone polydye composition (0.12 g). The blend was extruded with a C. W. Brabender ¾ in. extruder, equipped with a mixing screw, at 250° C. into a water bath and the extrudate pelletized.

The pellets were redried at 70° C. for 17 hrs. at a pressure of about 1–5 torr. A portion (1.40 g) of the dried pellets was pressed into a 18–20 mil film at 250° C. using a 2-inch diameter circular mold in a Pasadena Hydraulic, Inc. press using 12,000 pounds ram force (4 inch ram). The transparent films contained about 300 ppm of the polydyes and each showed excellent color development to produce the colors indicated in Table 1.

EXAMPLE 67

A mixture of 1,4-bis(2-carboxyphenythio)anthraquinone (15.4 g, 0.03 mole) (prepared as in Example 20a), 1,5-bis(2-carboxyphenylthio)-4,8-bis(isobutylamino)anthraquinone (6.55 g, 0.01 mole) (Example 2a), 1,2-ethanediol, dimethanesulfonate (8.72 g, 0.04 mole), potassium carbonate (8.0 g) and DMF (100 mL) was stirred and heated at about 95° C. for 2.0 hours with occasional stirring. The reaction mixture was drowned into methanol (500 mL) and the black polydye was collected by filtration, washed with water containing acetic acid, hot water and dried in air (yield—9.5 g). GPC analysis indicated a weight average molecular weight of 7,512, a number average molecular weight of 1,700 and a polydispersity of 4.42.

EXAMPLE 68

EASTAR® PETG copolyester 6763 (291 g of previously dried pellets) was dry blended with the black polydye of Example 67 (9.0 g) and the blend extruded and a portion of the resulting pellets was pressed into a black film containing approximately 3.0% by weight of polydye by using the procedure described in Example 4.

EXAMPLE 69

A mixture of the diacidic azo compound (3.20 g, 0.005 mole) having the structure

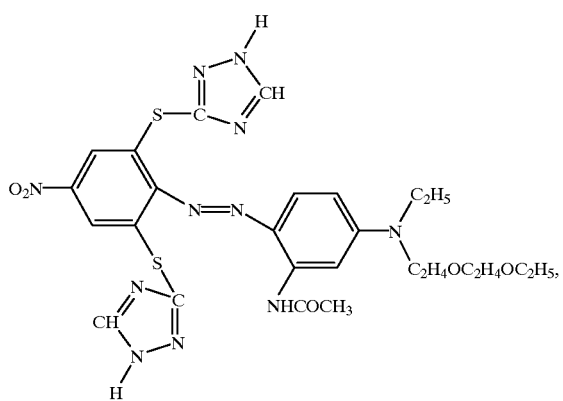

1,2-ethanediol, dimethanesulfonate (1.09 g, 0.005 mole), potassium carbonate (1.5 g) and DMF (25 mL) was heated and stirred at about 95° C. for 3.0 hours. The reaction mixture was drowned into methanol and the violet polydye was collected by filtration, washed with methanol, water containing acetic acid, hot water and dried in air (yield—1.60 g). GPC analysis indicated a weight average molecular weight (Mw) of 6,403, a number average molecular weight (Mn) of 3,700 and a polydispersity (Mw/Mn) of 1.73.

In the visible light absorption spectrum in DMF an absorption maximum was observed at 556 nm.

EXAMPLE 69a

A mixture of the dibromoazobenzene dye (6.01 g, 0.010 mole) having the structure

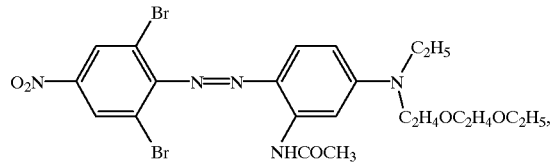

3-mercapto-1(H)1,2,4-triazole (2.2 g, 0.022 mole), potassium carbonate (3.45 g, 0.025 mole) and DMF (100 mL) was stirred and heated at about 95° C. for 2.0 hours. TLC (75 parts THF: 25 parts cyclohexane) showed incomplete reaction. An additional quantity (1.01 g, 0.01 m) 3-mercapto-1 (H)-1,2,4-triazole was added and heating and stirring were continued for 2.0 additional hours. TLC indicated essentially complete reaction to produce the violet product. The reaction mixture was drowned into water (400 mL) and the mixture was acidified by addition of acetic acid, heated to about 40° C. and filtered. The product was washed with warm water and dried in air (yield—5.60 g). FDMS indicated the product to have the structure of the diacidic azobenzene compound used in Example 69.

EXAMPLE 70

A mixture of the diacidic azo compound (1.59 g, 0.0025 mole) having the structure

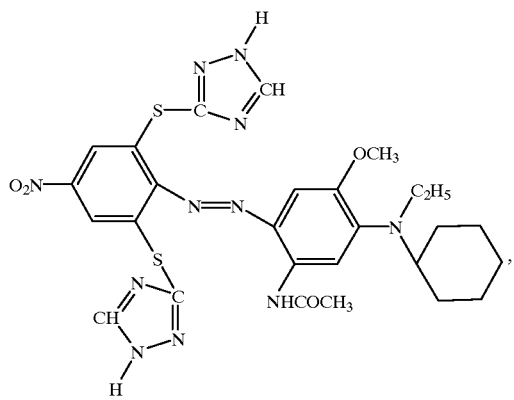

1,2-ethanediol, dimethanesulfonate (0.55 g, 0.0025 mole), potassium carbonate (0.5 g) and DMF (8.0 mL) was heated at 95° C. with occasional stirring for 3.0 hours. The reaction mixture was drowned into methanol (100 mL) and the blue polydye product was collected by filtration, washed with methanol, water containing acetic acid, hot water and dried in air (yield—1.06 g). GPC analysis indicated a Mw of 5,497, a Mn of 2,648 and a Mw/Mn of 2.08. An absorption maximum was observed at 605 nm in DMF in the visible light absorption spectrum.

EXAMPLE 70a

A mixture of the dibromo azobenzene dye (2.38 g, 0.004 mole) having the structure

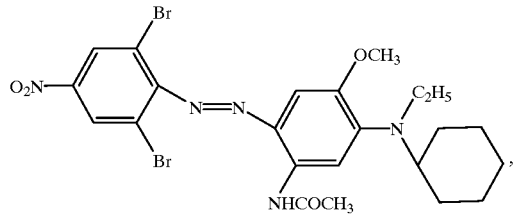

3-mercapto-1(H)-1,2,4-triazole (1.21 g, 0.012 mole), potassium carbonate (1.65 g, 0.012 mole) and DMF (25 mL) was heated and stirred for 1.0 hour. TLC (50 parts THF:50 parts cyclohexane) showed complete reaction to produce the product. The reaction mixture was drowned into water (100 mL) and the mixture acidified with acetic acid. The dark blue product was collected by filtration, washed with water and dried in air (yield—2.55 g). FDMS indicated the product to have the structure of the diacidic azobenzene compound used in Example 70.

EXAMPLE 71

A mixture of the diacidic disazo compound (1.59 g, 0.005 mole) having the structure

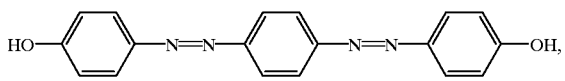

1,2-ethanediol, dimethanesulfonate (1.09 g. 0.005 mole), potassium carbonate (1.5 g), DMF (10 mL) was heated and stirred at about 95° C. for 3.0 hours. The reaction mixture was drowned into methanol (100 mL) and the dark brown polydye was collected by filtration, washed with methanol, water containing acetic acid, hot water and then dried in air (yield—0.66 g). GPC analysis indicated a Mw of 4,926, a Mw of 1,574 and a Mw/Mn of 3.13.

EXAMPLE 72

A mixture of the diacidic azo compound (1.88 g, 0.005 mole) having the structure

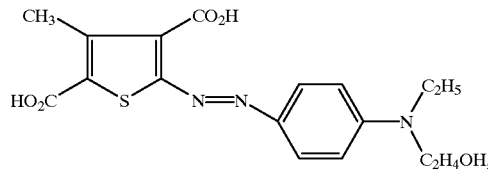

1,2-ethanediol, dimethanesulfonate (1.09 g, 0.005 mole), potassium carbonate (1.5 g) and DMF (20 mL) was heated at about 95° C. with stirring for 3.0 hours. The reaction mixture was drowned in methanol (100 mL) and the red polydye was collected by filtration, washed with methanol, water containing acetic acid, hot water and dried in air (yield—1.35 g). GPC analysis indicated a Mw of 6,888, a Mn of 2,127 and a Mw/Mn of 3.24. An absorption maximum was observed at 527 nm in the visible light absorption spectrum in DMF.

EXAMPLE 72a

To a stirred mixture of the azo compound (4.05 g, 0.01 mole) [4-(3',5'-dicarbomethoxy-4'-methylthiophene-2-ylazo)-N-ethyl-N(2-hydroxyethyl)aniline] and 2-ethoxyethanol (50 mL) at room temperature was added aqueous 50% NaOH solution(3.75 g). After being heated at about 95° C. for 1.0 hour, the reaction product was drowned into acetone (300 mL). The disodium salt of the diacidic azo dye was collected by filtration washed with acetone and then quickly dissolved in water (200 mL). Acidification with acetic acid precipitated the free diacid dye, which was collected by filtration, washed with water and dried in air (yield—2.35 g). FDMS indicated the product to have the structure of the diacidic azo compound used in Example 72.

EXAMPLE 73

A mixture of the diacidic azobenzene compound (1.19 g, 0.003 mole) having the structure

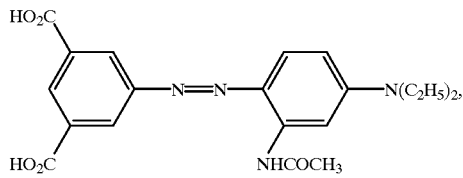

1,2-ethanediol, dimethanesulfonate (0.66 g, 0.003 mole), potassium carbonate (0.75 g), and DMF (8.0 mL) was stirred occasionally and heated at about 95° C. for 2.0 hours. The reaction mixture was drowned into methanol (100 mL) and the orange polydye was collected by filtration, washed with methanol, water containing acetic acid, hot water and dried in air (yield—0.65 g). GPC analysis showed a Mw of 3,015, a Mn of 2,128 and a Mw/Mn of 1.42. An absorption maximum was observed in the visible light absorption at 479 nm in DMF.

EXAMPLE 73a

To a mixture of 3-acetamido-4-(3',5'-dicarbomethoxyphenylazo)-N,N-diethylaniline (1.7 g, 0.004 mole) in 2-ethoxyethanol (20 mL) was added aqueous 50% NaOH (1.6 g). The reaction mixture was heated with stirring of 95° C. for 10 minutes and then drowned into water (100 mL). The solution was acidified with acetic acid to precipitate the diacid dye which was collected by filtration, washed with water and dried in air (yield—1.6 g). FDMS indicated the structure to be that of the starting diacid azobenzene compound in Example 73.

EXAMPLE 74

A mixture of the diacidic azobenzene compound (1.10 g, 0.003 mole) having the structure

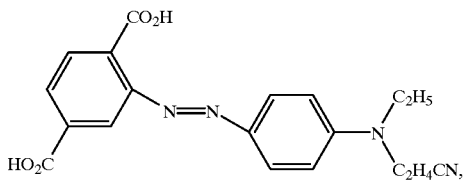

1,6-hexanediol, dimethanesulfonate (0.82 g, 0.003 mole), potassium carbonate (0.45 g) and DMF (8.0 mL) was heated at 95° C. with occasional stirring for 2.0 hours. The reaction mixture was drowned into methanol (100 mL). A slightly sticky yellow product resulted. The methanol was removed by decantation and the product dissolved in DMF (10 mL) by heating and stirring. Water (100 mL) was added and the mixture acidified by addition of acetic acid. The solid yellow polydye was collected by filtration, washed with water and dried in air (yield—0.47 g). GPC analysis indicated a Mw of 9,314, a Mn of 3,208 and a Mw/Mn of 2.90. An absorption maximum at 428 nm was observed in the visible light absorption spectrum in DMF.

EXAMPLE 74a

To a mixture of 4-(2',5'-dicarbomethoxyphenylazo)-N-(2-cyanoethyl)-N-ethylaniline (1.97 g, 0.005 mole) in 2-ethoxyethanol (20 mL) was added aqueous 50% NaOH (1.90 g). The reaction solution was heated at 95° C. for 15 minutes and then drowned into water (200 mL). The solution was acidified and the yellow dye which precipitated was collected by filtration, washed with water and dried in air (yield—1.75 g). FDMS indicated the structure to be that of the starting diacid azobenzene dye of Example 74.

EXAMPLE 75

A mixture of diacidic azo compound (38.6 g, 0.10 mole) having the structure

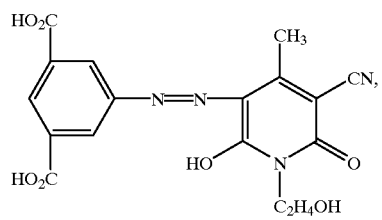

1,6-hexanediol, dimethanesulfonate (27.4 g, 0.10 mole), potassium carbonate (27.6 g, 0.20 mole), and DMF (350 mL) was heated at 95–100° C. for 2.0 hours. The reaction mixture was drowned into a solution of acetic acid (70.0 mL) in water (1700 mL) with good stirring. After stirring for about 15 minutes, the yellow polydye was collected by filtration, washed with hot water and dried in air (yield—42.6 g). An absorption maximum at 422 nm was observed in the visible light absorption spectrum in DMF.

EXAMPLE 75a

To a mixture of the diester dye (41.4 g, 0.10 mole) [3-cyano-5-(3',5'-dicarbomethoxyphenylazo)-6-hydroxy-N-(2-hydroxyethyl)-4-methyl-2-pyridone] in 2-ethoxyethanol (400 mL) was added aqueous 50% NaOH (40.0 g) and the reaction mixture was heated at 75–80° C. for about 30 minutes. Acetone (200 mL) was added to the slightly cooled reaction mixture. The yellow solid was collected by filtration, washed with acetone and then reslurried in warm water (750 mL). After acidification using conc. HCl (20 mL), the yellow diacid dye was collected by filtration, washed with hot water and dried in air (yield—36.0 g). FDMS indicated the structure to be that of the starting diacid azo compound of Example 75.

EXAMPLE 76

A mixture of the diacidic azo compound (2.03 g, 0.005 mole) having the structure

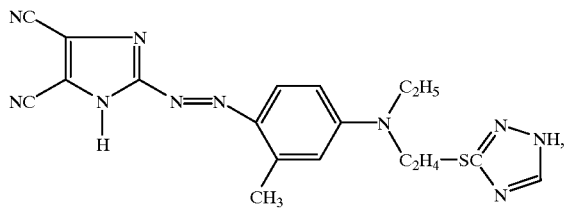

1,2-ethanediol, dimethanesulfonate (1.09 g, 0.005 mole), potassium carbonate (1.5 g) and DMF (20 mL) was heated at about 95° C. with occasional stirring for 5.0 hours. The reaction mixture was drowned into methanol. Acetic acid (1.0 mL) was added and the polydye was collected by filtration and washed with water and dried in air. GPC analysis indicated a Mw of 9,876, a Mn of 3,917 and a polydispersity of 2.52. An absorption maximum at 506 nm was observed in the visible light absorption spectrum in DMF.

EXAMPLE 77

A mixture of the diacidic azo compound (0.60 g, 0.00155 mole) having the structure

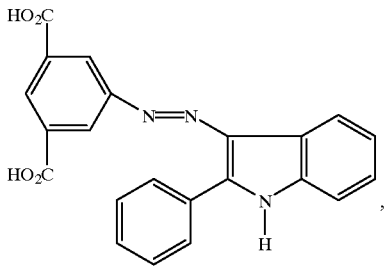

1,2-ethanediol, dimethanesulfonate (0.34 g, 0.00155 mole), potassium carbonate (0.3 g) and DMF (4.0 mL) was heated at about 95° C. for 4.0 hours. The reaction mixture was drowned into methanol (20 mL) and the yellow polydye was collected by filtration, washed with methanol, water containing acetic acid, water and then air dried (yield—0.5 g). GPC analysis showed a Mw of 4,566, a Mn of 2,474 and a Mw/Mn of 1.84. In the visible light absorption spectrum in DMF an absorption maximum was observed at 420 nm.

EXAMPLE 77a

To a mixture of 3-(3',5'-dicarboxymethoxyphenylazo)-2-phenylindole (1.0 g, 0.00242 mole) in 2-ethoxyethanol (10 mL) was added aqueous 50% NaOH (0.75 g) and the hydrolysis reaction carried out by heating at about 95° C. for 30 minutes. The reaction mixture was drowned into water (100 mL) and the solution treated with acetic acid to precipitate the product which was collected by filtration, washed with water and dried in air (yield—0.85 g). FDMS indicated the structure to be that of the starting diacidic azo compound in Example 77.

EXAMPLE 78

A mixture of the diacidic azo compound (0.99 g, 0.002 mole) having the structure

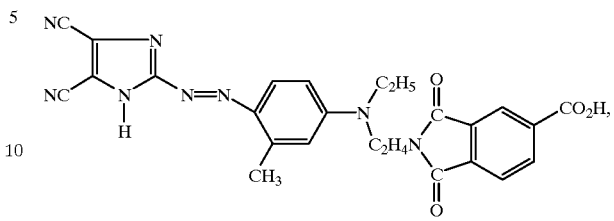

1,2-ethanediol, dimethanesulfonate (0.42 g, 0.002 mole), potassium carbonate (0.5 g) and DMF (7.0 mL) was heated at about 95° C. for 3.0 hours. The reaction mixture was drowned into methanol (50 mL) and the scarlet polydye was collected by filtration, washed with methanol, water containing acetic acid, hot water and then dried in air (yield—0.18 g). GPC analysis indicated a Mw of 8,246, a Mn of 2,619 and a polydispersity of 3.15.

EXAMPLE 79

A mixture of the diacidic azo dye (2.50 g, 0.00733 mole) having the following structure

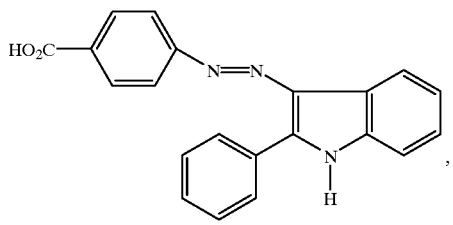

1,2-ethanediol, dimethanesulfonate (1.60 g, 0.00733 mole), potassium carbonate (2.07 g) and DMF (25 mL) was heated at 95° C. for 3.0 hours. The reaction mixture was drowned into methanol and a small amount of acetic acid added. The yellow polydye was collected by filtration, washed with a little methanol, water containing acetic acid, hot water and dried in air. GPC analysis indicated a Mw of 1,949, a Mn of 1,569 and a Mw/Mn of 1.24. An absorption maximum was observed at 411 nm the visible light absorption spectrum.

EXAMPLE 80

A mixture of the diacidic azo compound (1.22 g, 0.0025 mole) having the structure

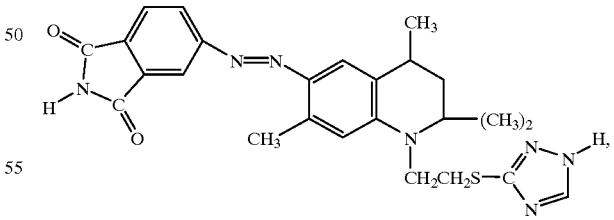

1,2-ethanediol, dimethanesulfonate (0.55 g, 0.0025 mole), potassium carbonate (0.75 g) and DMF (8.0 mL) was heated and stirred at about 95° C. for 3 hours with occasional stirring. The reaction mixture was drowned into methanol (50 mL) and the polydye was collected by filtration washed with methanol, water containing acetic acid, hot water and then dried in air (yield—0.68 g). GPC analysis indicated a Mw of 2,259, a Mn of 1,571 and a Mw/Mn of 1.44. An absorption maximum was observed at 503 nm in DMF in the visible light absorption spectrum.

EXAMPLE 81

A mixture of the diacidic azo compound (1.25 g, 0.003 mole) having the structure

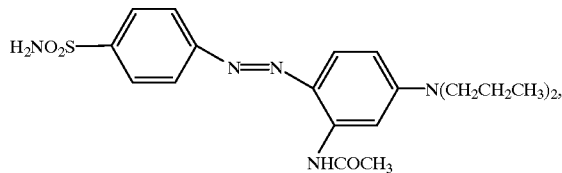

1,2-ethanediol, dimethanesulfonate (0.65 g, 0.003 mole), potassium carbonate (1.0 g) and DMF (10 mL) was heated at about 95° C. for 3.0 hours with occasional stirring. The reaction mixture was drowned into methanol (25 mL) and the orange polydye was collected by filtration, washed with methanol, water containing acetic acid, hot water and dried in air (yield—0.75 g). GPC analysis indicated a Mw of 2,014, a Mn of 1,520 and a Mw/Mn of 1.32. An absorption maximum was observed at 493 nm in the visible light absorption spectrum in DMF.

EXAMPLE 82

A mixture of the diacidic azo compound (1.11 g, 0.0025 mole) having the structure

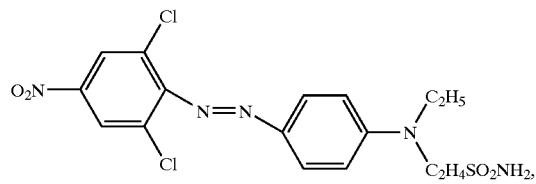

1,2-ethanediol, dimethanesulfonate (0.55 g, 0.0025 mole), potassium carbonate (0.80 g and DMF (8.0 mL) was heated at about 95° C. for 2.5 hours. The reaction mixture was drowned into methanol (100 mL) and the brown polydye was collected by filtration, washed with methanol, water containing acetic acid, hot water and dried in air (yield—0.30 g). GPC analysis indicated a Mw of 2,301, a Mn of 1,345 a Mw/Mn of 1.71. In the visible light absorption spectrum in DMF a maximum absorption was observed at 434 nm.

EXAMPLE 83

A mixture of the diacidic azo compound (2.40 g, 0.005 mole) having the structure

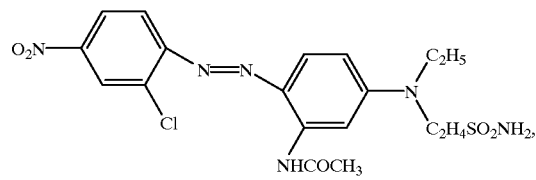

1,2-ethanediol, dimethanesulfonate (1.09 g, 0.005 mole), potassium carbonate (1.5 g) and DMF (25 mL) was heated at about 95° C. for 3.0 hours with occasional stirring. The reaction mixture was drowned into methanol (200 mL) and the dark red polydye was collected by filtration, washed with methanol, water containing acetic acid, hot water and then dried in air (yield—1.80 g). GPC analysis indicated Mw of 2,914, a Mn of 809 and a Mw/Mn of 3.60. An absorption maximum at 528 nm was observed in the visible light absorption spectrum in DMF.

EXAMPLE 84

A mixture of the diacidic azo compound (1.07 g, 0.002 mole) having the structure

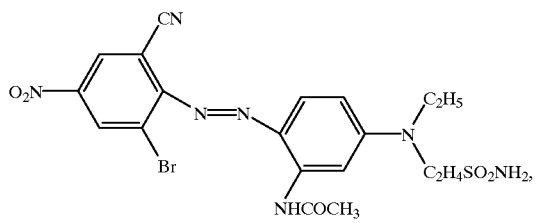

1,2-ethanediol, dimethanesulfonate (0.44 g, 0.002 mole), potassium carbonate (0.5 g) and DMF (10 mL) was heated at 95° C. with occasional stirring for 5 hours. The reaction mixture was drowned into methanol (50 mL) and the reddish-blue polydye was collected by filtration, washed with methanol, water containing acetic acid, hot water and dried in air (yield—0.83 g). GPC analysis indicated a Mw of 7,038, a Mn of 832 and a Mw/Mn at 8.44. An absorption maximum was observed at 574 nm in the visible light absorption spectrum in DMF.

EXAMPLE 85

Displacement of Bromine in Polydye of Example 84 with Cyano Group

A mixture of a portion (0.5 g) of the polydye of Example 84, sodium dicyanocuprate (0.2 g) and DMF (8.0 mL) was heated at about 95° C. with occasional stirring for 3.0 hours. The reaction mixture, the color of which changed from reddish-blue to neutral-blue as the displacement reaction occurred, was then drowned into methanol and the polydye was collected by filtration, washed with methanol and dried in air. GPC analysis indicated a Mw of 9,427, a Mw of 1,117 and a Mw/Mn of 8.44. An absorption maximum at 590 nm was observed in DMF in the visible light absorption spectrum.

EXAMPLE 86

A mixture of diacidic azo compound (1.53 g, 0.0025 mole) having the structure

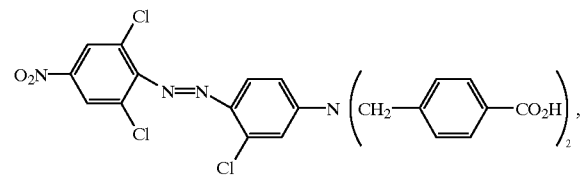

1,6-hexanediol, dimethanesulfonate (0.69 g, 0.0025 mole), $K_2CO_3$ (0.8 g) and DMF (8.0 mL) was heated at about 95° C. with occasional stirring for 2.0 hours. The reaction mixture was drowned into methanol (100 mL) and the brown polydye was collected by filtration, washed with methanol, water containing acetic acid, hot water and then dried in air (yield—0.62 g). GPC analysis indicated a Mw of 4,795, a Mn of 2,051 and a Mw/Mn of 2.33. An absorption maximum at 434 nm in DMF was observed in the visible light absorption spectrum.

EXAMPLE 86a

To conc. H$_2$SO$_4$ (33.0 mL) was added 2,6-dichloro-4-nitroaniline (6.21 g, 0.03 mole) with stirring. The solution was cooled to 0–5° C. and stirred while a nitrosyl sulfuric acid mixture, prepared by adding sodium nitrite (2.19 g) to conc. H$_2$SO$_4$ (15 mL) portionwise with stirring and allowing the temperature to rise, was added below 5° C. with stirring. The diazotization reaction mixture was stirred at 0–5° C. for 2.0 hours. An aliquot of the diazonium salt solution (0.01 mole) was added to a chilled solution of the diacid coupler (3.95 g, 0.01 mole) (N,N-bis(4-carboxyphenylmethyl)-3-chloroaniline) dissolved in 1:5 (1 part propionic acid:5 parts acetic acid) (120 mL) containing some conc. HCl (5.0 mL) with stirring at 0–5° C. The coupling reaction mixture was neutralized by the addition of ammonium acetate with stirring and allowed to stand with occasional stirring at below 5° C. for about 1.0 hour. Water was added to precipitate the solid dye, which was collected by filtration, washed with water and dried in air (yield—4.0 g). The crude dye was reslurried in hot methanol and the mixture allowed to cool. The final dye was collected by filtration, washed with methanol and dried in air. An absorption maximum was observed at 431 nm in DMF. The diacid dye was used as the starting material in Example 86.

EXAMPLE 86b

A mixture of m-chloroaniline (2.56 g, 0.02 mole), methyl 4-(bromomethyl)benzoate (10.08 g, 0.044 mole), sodium carbonate (4.66 g) and sodium iodide (0.2 g) and 2-ethoxyethanol (50 mL) was heated under nitrogen at about 90° C. for 3.0 hours with stirring The reaction mixture was drowned into water and the product was extracted into methylene chloride. Methylene chloride was removed to leave an oily product (11.0 g), which was added to 2-ethoxyethanol (100 mL). To the solution was added aqueous 50% NaOH solution (7.50 g) and the reaction mixture was warmed. At about 30° C., white solids began to precipitate and at about 50° C. the reaction mixture become very thick. When the temperature had reached 70° C., water (20 mL) was added to dissolve the salts of the diacidic product. After stirring at 70° C. for 1.5 hours the reaction mixture was clarified by filtering through Celite filter aid and the filtrate acidified by the addition of 10% aqueous HCl to pH of about 4.0. The white solid was collected by filtration, washed with water and dried in air (yield—7.20 g). FDMS indicated the product to have the structure of the coupler used in Example 86a.

EXAMPLE 87

A mixture of the diacidic azo compound (1.64 g, 0.003 mole) having the structure

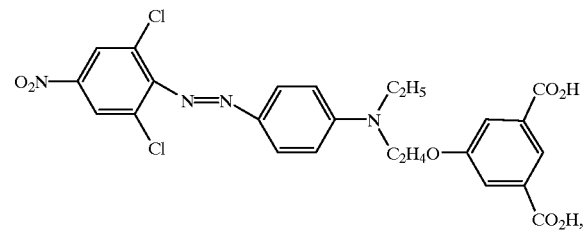

1,6-hexanediol, dimethanesulfonate (0.82 g, 0.003 mole), potassium carbonate (0.5 g) and DMF (8.0 mL) was heated at about 95° C. for 25 hours with occasional stirring. The reaction mixture was drowned into methanol (150 mL) and the polydye was collected by filtration, washed with methanol, water containing acetic acid, hot water and dried in air (yield—1.5 g). GPC analysis indicated a Mw of 2,741, a Mn of 1,367 and a Mw/Mn of 2.00. An absorption maximum at 441 nm was observed in the visible light absorption spectrum in DMF.

EXAMPLE 87a

An aliquot (0.01 mole) of the diazonium salt from 2,6-dichloro-4-nitroaniline prepared in Example 86a was added to a chilled solution of the coupler (3.29 g, 0.01 mole) having the formula

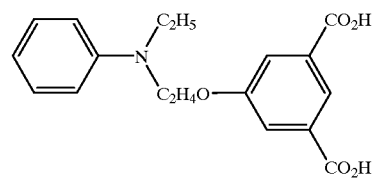

dissolved in 1:5 acid (100 mL) with stirring at 0–5° C. Ammonium acetate was added with stirring until the coupling mixture was neutral to Congo Red Test paper. After allowing to stand for 1.0 hour, water was added to the coupling mixture to precipitate the dye, which was collected by filtration, washed with water and dried in air (yield—4.27 g). An absorption maximum was observed at 460 nm in the visible light absorption spectrum in DMF.

EXAMPLE 87b

A mixture of N-(2-chloroethyl)-N-ethylaniline (46.0 g, 0.25 mole), dimethyl 5-hydroxyisophthalate (52.5 g, 0.25 mole), potassium carbonate (69.08), a trace of pulverized potassium iodide and DMF (350 mL) was heated at 125–30° C. for 3.5 hours with stirring. The reaction mixture was allowed to cool and drowned in water/ice mixture (1.0 L). The product separated as a brown oil and the aqueous layer was removed by decantation. To the oily product was added 2-ethoxyethanol (175 mL) and aqueous 50% NaOH (50.0 g) and the hydrolysis reaction mixture was heated at 60–65° C. for about 20 minutes. Acetone was added to the reaction mixture and the white solid was collected by filtration, washed with acetone and dried in air (yield—99.0 g). The disodium salt was dissolved in water (250 mL) by stirring. Acidification with conc. HCl to a pH of about 3.0 gave a slightly sticky product which solidified in a few minutes. The pale yellow granular solid was collected by filtration, washed with water and dried in air (yield—58.0 g). FDMS indicated the structure to be that of the coupler used in Example 87a.

EXAMPLE 88

A mixture of the diacid azo compound (0.70 g, 0.0013 mole) having the structure

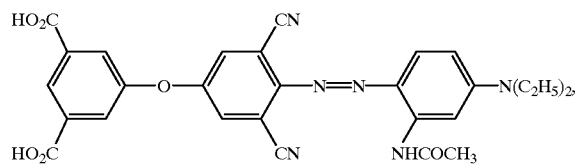

1,6-hexanediol, dimethanesulfonate (0.36 g, 0.0013 mole), potassium carbonate (0.35 g) and DMF (5.0 mL) was heated at about 95° C. with occasional stirring for 2.0 hours. The reaction mixture was drowned into methanol (50 mL) and the polydye was collected by filtration, washed with methanol, water containing acetic acid, hot water and dried in air (yield—0.55 g). GPC indicated a Mw of 7,353, a Mn of 2,431 and a Mw/Mn of 3.02. An absorption maximum at 537 nm was observed in the visible light absorption spectrum in DMF.

EXAMPLE 88a

To a mixture of the diester dye (1.75 g, 0.0013 mole) having the structure

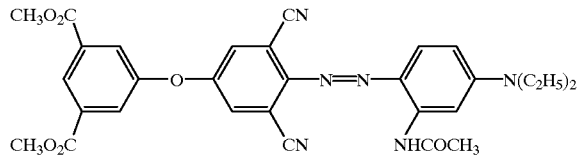

and 2-ethoxyethanol (20 mL) was added aqueous 50% NaOH solution (1.2 g) and the hydrolysis mixture was heated at about 10 minutes at about 95° C. The reaction mixture was drowned into acetone and the solid material collected by filtration. The acetone-wet material was dissolved by stirring in water (200 mL) and the diacid dye precipitated by adding acetic acid. The product was collected by filtration washed with water and dried in air (yield—1.35 g). FDMS showed the product to be mostly

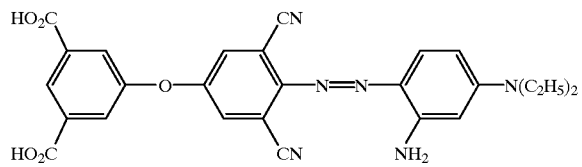

indicating hydrolysis of the acetamido group in addition to the ester group. All of the product was added to acetic acid (8.0 mL) and acetic anhydride (1.0 mL). The reaction mixture was heated at 95° C. for 30 minutes with occasional stirring. A bathochromic shift in color from red to magenta was observed as the amine group was acetylated. The reaction mixture was allowed to cool, whereupon a solid dark red product crystallized, and then was drowned into methanol (40 mL). The product was collected by filtration, washed with water and dried in air (yield—0.90 g). FDMS indicated the structure to be that of the diacidic azo dye in Example 88.

EXAMPLE 88b

A mixture of the dibromo azo dye (3.00 g, 0.0044 mole) having the structure

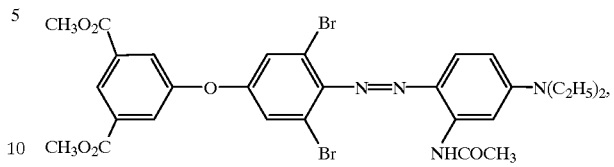

sodium dicyanocuprate (0.69 g, 0.005 mole) and DMF (30 mL) was heated at 95° C. for 1.0 hour. The reaction mixture was drowned into methanol (150 mL) and the dye was collected by filtration, washed with methanol and dried in air (yield—1.91 g). FDMS indicated the structure to be that of the dicyano dye used in Example 88a.

EXAMPLE 88c

To conc. $H_2SO_4$ (7.5 mL) was added dry $NaNO_2$ (1.08 g) portionwise with stirring and the temperature allowed to rise. The nitrosyl sulfuric acid mixture was cooled and 1:5 acid (15 mL) was added at less than 10° C. with stirring. To this mixture was added at 0–5° C. with stirring dimethyl 5-(4'-amino, 2',6'-dibromophenoxy)isophthalate (6.86 g, 0.015 mole), followed by an additional 15 mL of 1:5 acid. The diazotization reaction mixture was stirred at 0–5° C. for 2.0 hours and then an aliquot (0.0075 mole) was added to a solution of 3-acetamido-N,N-diethylaniline (1.54 g, 0.0075 mole) dissolved in 1:5 acid (75 mL) at 0–5° C. Ammonium acetate was added with stirring to the coupling mixture until neutral to Congo Red test paper. Coupling was allowed to continue at 0–5° C. for 1.0 hour and the dye then precipitated by addition of water, collected by filtration, washed with water and dried in air. FDMS indicated the structure to be that of the starting dibromo azo dye in Example 88b. An absorption maximum at 546 nm was observed in the visible light absorption spectrum in DMF.

EXAMPLE 88d

A mixture of the dimethyl 5-(4'-aminophenoxy) isophthalate (15.0 g, 0.05 mole) (Example 12c), anhydrous sodium acetate (9.6 g) and acetic acid (85 mL) was treated with stirring with bromine (17.4 g, 0.11 mole) allowing the temperature to rise. The reaction mixture was heated at 70–80° C. for 1.5 hours, allowed to cool, and then drowned into ice water (350 mL). The product was collected by filtration, washed with water and dried in air (yield—21.9 g). FDMS indicated the structure to be that of the amine compound diazotized in Example 88c.

EXAMPLE 89

A mixture of the diacidic azo compound (1.39 g, 0.0025 mole) having the structure

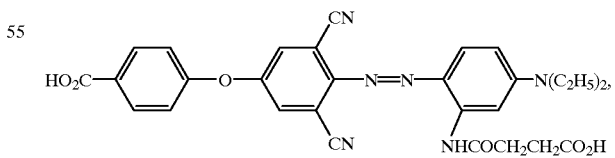

1,6-hexanediol, dimethanesulfonate (0.68 g, 0.0025 mole), potassium carbonate (1.0 g) and DMF (8.0 mL) was heated at 95° C. for 2.5 hrs with occasional stirring. The reaction mixture was drowned into methanol (100 mL) and the red polydye was collected by filtration, washed with water containing acetic acid, hot water and dried in air (0.85 g).

GPC analysis indicated a Mw of 2,772, a Mn of 1,306 and a Mw/Mn of 2.12. An absorption maximum was observed at 538 nm in the visible light absorption spectrum in DMF.

EXAMPLE 90

A mixture of the diacidic azo compound (1.23 g, 0.004 mole) having the formula

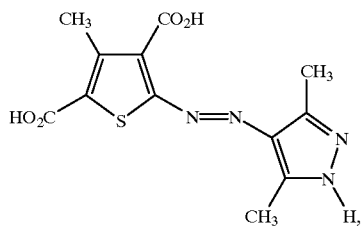

1,2-hexanediol, dimethanesulfonate (1.1 g, 0.004 mole), potassium carbonate (0.55 g) and DMF (8.0 mL) was heated at 95° C. for 1 hour. The reaction mixture was drowned into water (250 mL) containing acetic acid (5.0 mL). The yellow polydye was collected by filtration, washed with water and dried in air (yield—1.21 g). GPC analysis indicated a Mw of 1,726, a Mn of 1,079 and a Mw/Mn of 1.6. An absorption maximum at 400 nm was observed in the visible light absorption spectrum in DMF.

EXAMPLE 91

A mixture of the diacidic azo compound (1.71 g, 0.003 mole) having the formula

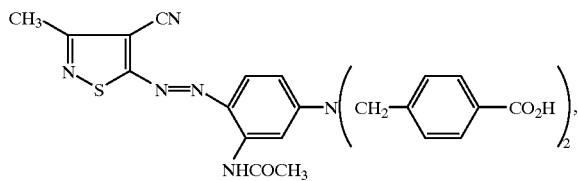

1,6-hexanediol, dimethanesulfonate (0.82 g, 0.003 mole), potassium carbonate (0.85 g) and DMF (8.0 mL) was heated with occasional stirring at 95° C. for 2.0 hours. The reaction mixture was drowned into methanol (100 ml) and the red polydye was collected by filtration, washed with methanol, water containing acetic acid, hot water and dried in air (yield—1.5 g). GPC indicated a Mw of 2,090, a Mn of 1,235 and a Mw/Mn of 1.69. An absorption maximum was observed at 545 nm in the visible light absorption spectrum in DMF.

EXAMPLE 91a

To conc. $H_2SO_4$(5.0 mL) was added dry $NaNO_2$ (0.72 g) portionwise with stirring, allowing the temperature to rise. The nitrosyl sulfuric acid solution was stirred and cooled and 1:5 acid (10 ml was added below about 15° C., followed by 5-amino-4-cyano-3-methylisothiazole (1.39 g, 0.01 mole) and 1:5 acid (10 ml) both added at 0–5° C. After being stirred at 0–5° C. for 2.0 hours an aliquot (0.005 mole) of the diazonium solution was added to a stirred solution of 3-acetamido-N,N-bis-(4-carboxyphenylmethyl)aniline (2.09 g, 0.005 mole) dissolved in 1:5 acid (30 ml) at 0–5° C. Ammonium acetate was added to neutralize the coupling mixture until neutral to Congo Red test paper. Water was added to the coupling mixture to precipitate the red dye, which was collected by filtration and dried in air (yield—2.67 g). The product was reslurried in hot methanol, allowed to cool and the solid collected by filtration, washed with methanol and dried in air (yield—2.10 g). FDMS indicated the structure to be that of the diacid azo compound used as a starting material for Example 91.

EXAMPLE 91b

To a slurry of the diester compound (12.00 g, 0.0269 mole) having the structure

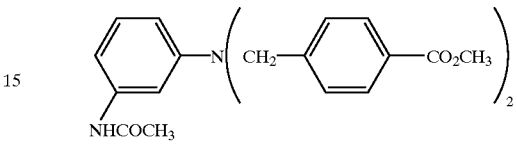

in water (150 ml) was added aqueous 50% NaOH solution (10.80 g) and 2-ethoxyethanol (20 ml). The reaction mixture was heated at about 70–80° C. for 2.0 hours and allowed to cool. The cloudy reaction mixture was clarified by filtering through Celite filter aid and the filtrate was drowned into ice/water mixture (150 g). Conc. HCl was added dropwise with stirring to bring the pH to about 2.5. The tan solid was collected by filtration, washed with water and dried at 40° C. under nitrogen (yield—10.04 g). FDMS indicated the product to have the structure of the coupler used in Example 91a.

EXAMPLE 92

A mixture of the diacidic azo compound (0.83 g, 0.002 mole) having the structure

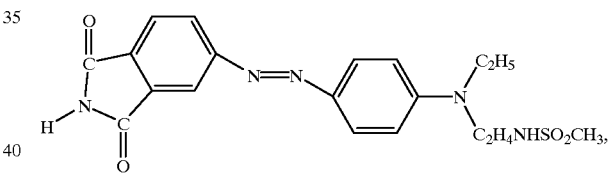

1,2-ethanediol, dimethanesulfonate (0.44 g, 0.002 mole), potassium carbonate (0.5 g) and DMF (7.5 ml) was heated at about 95° C. for 3.0 hours. The polydye was isolated by drowning the reaction mixture into water and acidifying with acetic acid, followed by filtering, washing with water and drying in air. GPC analysis indicated a Mw of 2,379, a Mn of 1,363 a Mw/Mn of 1.74. An absorption maximum was observed in DMF in the visible absorption spectrum at 480 nm.

EXAMPLE 93

A mixture of the diacidic azo compound (1.26 g, 0.003 mole) having the structure

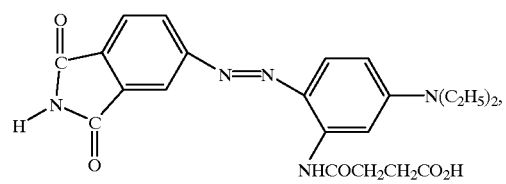

1,6-hexanediol, dimethanesulfonate (0.82 g, 0.003 mole), potassium carbonate (0.50 g) and DMF (8.0 mL) was heated at about 95° C. for 1.5 hours. The reaction mixture was drowned into methanol (100 mL) and acetic acid (1.0 mL) was added The initially sticky polydye solidified after standing for about 1.0 hour and was collected by filtration, washed with methanol, water containing acetic acid, hot water and dried in air (yield—0.60 g). GPC analysis indicated a Mw of 2,667, a Mn of 1,695 and a Mw/Mn of 1.57. An absorption maximum at 508 nm was observed in the visible light absorption spectrum in DMF.

EXAMPLES 93a

A mixture of the diacidic azo compound (3.62 g, 0.005 m) having the structure

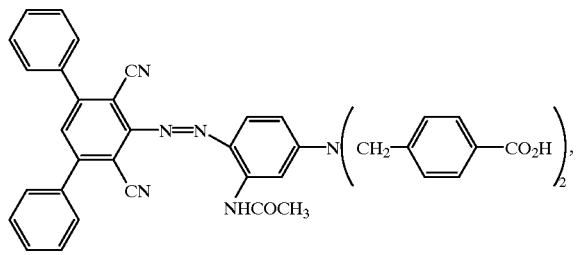

1,2-ethanediol, dimethanesulfonate (1.10 g, 0.005 m), potassium carbonate (1.50 g) and DMF (30 mL) was heated at about 95° C. with stirring for 2.0 hours. The reaction mixture was drowned into methanol (100 mL) and the red polydye was collected by vacuum filtration and washed with methanol, water containing acetic acid, hot water and dried in air (yield—3.08 grams). GPC analysis indicated a Mw of 7,176, a Mn of 3,533 and a Mw/Mn of 2.02. An absorption maximum was observed in the visible light absorption spectrum at 525 nm.

EXAMPLE 93b

To conc. $H_2SO_4$ (5.0 mL) was added dry $NaNO_2$ (0.72 g) portionwise with stirring, allowing the temperature to rise. The nitrosyl sulfuric acid solution was stirred and cooled and 1:5 acid (1 part propionic:5 parts acetic acid) (10 mL) was added below about 15° C., followed by 2,6-dicyano-3, 5-diphenylaniline (2.95 g, 0.01 m) and 1:5 acid (10 mL) both added at 0–5° C. After being stirred for 2.0 hours at 0–5° C., the diazonium solution was added to a stirred solution of 3-acetamido-N,N-bis (4-carboxyphenylmethyl)aniline (4.18 g, 0.01 m) dissolved in a mixture of 1:5 acid (75 mL) plus 15% aqueous sulfuric acid (15 mL) at 0–5° C. Ammonium acetate was added portionwise until the coupling mixture was neutral to Congo Red test paper. After about 1.0 hour, water was added to the coupling mixture and the resulting slurry heated to about 60° C. The red product was collected by filtration, washed well with hot water and dried in air (yield—5.43 g). FDMS analysis indicated the structure to be that of the starting material for Example 93–1.

EXAMPLE 93c

A mixture of the diacidic azo compound (1.80 g, 0.003 m) having the structure

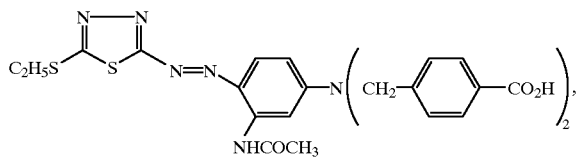

1,2-ethanediol, dimethanesulfonate (0.66 g, 0.003 m), potassium carbonate (1.0 g) and DMF (8 mL) was heated at about 95° C. with occasional stirring. The polydye was isolated by drowning the reaction mixture into methanol (100 mL) followed by filtration and washing with methanol, water containing acetic acid, water and was then dried in air (yield—0.52 g). GPC analysis using NMP (N-methyl-2-pyrrolidinone) solvent indicated a Mw of 5,413, a Mn of 2,196 and a Mw/Mn of 2.46. An absorbance maximum at 517 nm was observed in the visible absorption maximum in DMF.

EXAMPLE 93d

A sample of 2-amino-5-ethylthio-1,3,4-thiadiazole (1.61 g, 0.01 m) was diazotized and coupled with 3-acetamido-N,N-bis(4-carboxyphenylmethyl)aniline (4.18 g, 0.01 m) and the red product isolated using the procedure described above in Example 93–1a. FDMS indicated the structure of the azo compound to be that of the starting material for Example 93–2.

EXAMPLES 94–118

Colored EASTAR® PETG 6763 film was produced by melt blending the polydyes of Examples 69–93 and extruding according to the following procedures to produce Examples 94–118 (Table 2).

EASTAR® PETG polyester 6763, a poly(ethylene-cyclohexanedimethylene) terephthalate (Eastman Chemical Company) (300 g of previously dried pellets) was dry blended with the azo dye composition (0.12 g) and the blend extruded and finally a 18–20 mil thick film prepare as described above for Examples 37–66.

EXAMPLE 119

A mixture of the diacidic anthrapyridone compound (0.93 g, 0.002 mole) having the structure

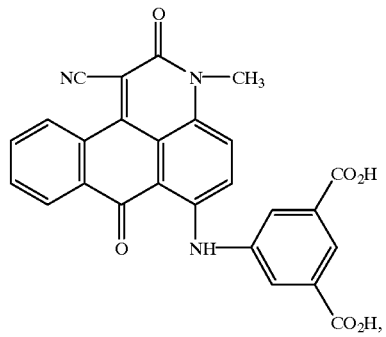

1,2-ethanediol, dimethanesulfonate (0.44 g, 0.002 mole) potassium carbonate (0.5 g) and DMF (0.5 mL) was heated at about 95° C. for 3.0 hours with occasional stirring. The reaction mixture was drowned into methanol (100 mL) and the violet polydye was collected by filtration, washed with methanol, water containing acetic acid, water and dried in air (yield—1.09 g). A number average molecular weight of 1,228 was obtained by GPC analysis. Absorption maxima at 544 and 583 nm were observed in the visible light absorption spectrum in DMF.

EXAMPLE 119a

To a mixture of 1-cyano-6-(3',5'-dicarbomethoxyphenylamino)-3-methyl-3H-dibenz[f,ij]isoquinoline-2,7-dione (2.00 g, 0.00405 mole) stirred in 2-ethoxyethanol (50 mL) was added aqueous 50% NaOH solution (2.47 g). The reaction mixture was heated at 90–95° C. for 50 minutes and then was drowned into water. The mixture was acidified by addition of acetic acid and the solid product was collected by filtration, washed with water and dried in air (yield—1.78 g). FDMS indicated the product to be the diacidic anthrapyridone compound reacted in Example 119.

EXAMPLE 119b

A mixture of 6-bromo-1-cyano-3-methyl-3H-dibenz[f,ij]isoquinoline-2,7-dione (11.0 g, 0.03 mole), dimethyl 5-aminoisophthalate (25.1 g, 0.12 mole), cupric acetate (3.6 g), potassium carbonate (3.0 g) and DMF (90 mL) was heated and stirred under nitrogen to about 135–40° C. The reaction mixture became very thick and turned violet. Additional DMF (40 mL) was added and heating was continued at 135–40° C. for 2.0 hours. The reaction mixture was allowed to cool to about 60° C. and poured on a coarse fritted glass funnel for vacuum filtration. The product was washed with DMF and water and the water-wet cake was reslurried in boiling acetone (250 mL). After cooling, the product was collected by filtration, washed with acetone and dried in air (yield—10.8 g). FDMS indicated the product to be the diester anthrapyridone compound used in Example 119a.

EXAMPLE 120

A mixture of the diacidic nitroarylamine compound (2.50 g, 0.0057 mole) having the structure

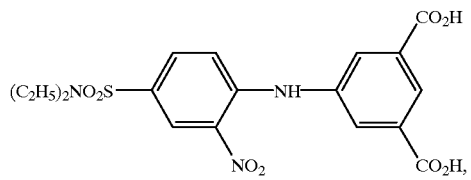

1,2-ethanediol, dimethanesulfonate (1.25 g, 0.0057 mole), potassium carbonate (1.6 g) and DMF (15 mL) was heated at 95° C. for 2.5 hours. The reaction mixture was drowned into methanol (200 mL) and the yellow polydye was collected by filtration, washed containing acetic acid, water and dried at 40° C. (yield—0.77 g). An absorption maximum was observed at 412 nm in the visible absorption spectrum in DMF.

EXAMPLE 121

A mixture of the diacidic nitroarylamine compound (4.40 g, 0.015 mole) having the structure

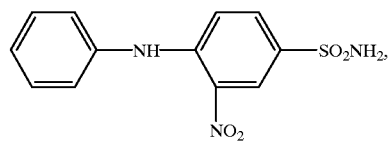

1,2-ethanediol, dimethanesulfonate (3.27 g, 0.015 mole), potassium carbonate (2.0 g) and DMF 40 mL) was heated at 90–95° C. with stirring for 4.0 hours. The reaction mixture was drowned into methanol (200 mL) and the yellow polydye was collected by filtration, washed with methanol, water containing acetic acid, water and dried in air (yield—1.80 g). GPC analysis indicated a Mw of 1,585, a Mn of 1,024, a Mw/Mn of 1.54. An absorption maximum at 416 nm was observed in the visible light absorption spectrum in DMF.

EXAMPLES 122–124

Colored polyester film was produced by melt blending and extruding EASTAR® PETG polyester 6763 (Eastman Chemical Company) (300 g previously dried pellets) which had dry blended with the polydyes of Examples 119, 120, 121 to produce Examples 122–124, respectively, according to the procedure used to produce Examples 37–66. The film of Example 122 was violet and those of Examples 123 and 124 were bright yellow.

EXAMPLE 125

A mixture of the benzotriazole UV light absorbing compound (3.27 g, 0.01 mole) having the structure

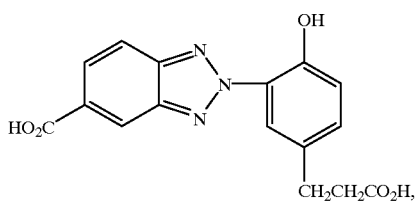

1,2-ethanediol, dimethanesulfonate (2.18 g, 0.01 mole), potassium carbonate (2.76 g) and DMF (25 mL) was heated at about 95° C. for 6.0 hours. The reaction mixture was drowned into methanol (200 mL) and a little acetic acid added. The polymeric UV light absorbing compound was collected by filtration, washed with water containing a little acetic acid, hot water and then dried in air (yield—2.88 g). GPC analysis indicated a Mw of 7,561, a Mn of 2,632 and a Mw/Mn of 2.87. An absorption maximum was observed at 350 nm in the UV light absorption spectrum in methylene chloride.

EXAMPLE 126

A benzylidene type UV light fluorescent compound (1.0 g, 0.0028 mole) having the structure

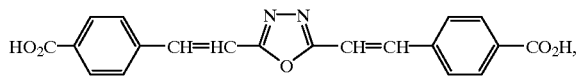

1,6-hexenediol, dimethanesulfonate (0.0028 mole), potassium carbonate (0.97 g) and DMF (10 mL) were mixed and the reaction mixture was heated at for 3.0 hours at about 120–130° C. The reaction mixture was drowned into methanol (100 mL) and the polymer was collected by filtration, washed with methanol, water containing acetic acid, hot water and dried in air (yield—0.69 g). GPC indicated a Mw of 50,717, a Mn of 16,044 and a MW/Mn of 3.16.

EXAMPLE 127

EASTAPAK® PET 7352, a poly(ethyleneterephthalate) (Eastman Chemical Company) (400 g of previously dried pellets) was dry blended with the polymeric UV light fluorescent material of Example 126 (0.16 g). The blend was extruded with a C. W. Brabender ¾ inch extruder, equipped with a mixing screw, at 285° C. into a water bath and the extrudate pelletized. The pellets which contained about 400 ppm of the UV light absorber showed a strong blue white fluorescence under UV light.

EXAMPLE 128

Example 127 was repeated except that 8 mg of the UV light fluorescent material of Example 126 was added to the EASTAPAK® PET 7352. The resulting pellets showed a strong blue-white fluorescence under UV light and appeared very white in sunlight.

EXAMPLE 129

A mixture of Pc—Al—O—O—$C_6H_3$-3,5-di$CO_2$H (Pc=phthalocyanine) (1.74 g, 0.0024 mole), 1,6-hexanediol, dimethanesulfonate (0.66 g, 0.0024 mole), potassium carbonate (0.83 g) and DMF (10 mL) was heated and stirred at about 125° C. for 1 hour and then at about 140° C. for 1 hour. The reaction mixture was drowned into methanol (50 mL) and the polymeric product was collected by filtration, washed with methanol, water containing acetic acid, hot water and dried in air (yield—1.48 g).

EXAMPLE 130

EASTAPAK® PET 7352, a poly(ethyleneterephthalate) (Eastman Chemical Company) (400 g of previously dried pellets) was dry blended with the polymeric phthalocyanine compound of Example 129 (0.12 g). The blend was extruded with a C. W. Brabender ¾ inch extruder, equipped with a mixing screw, at 285° C. into a water bath and the extrudate pelletized. The cyan pellets were redried at 70° C. for about 17 hrs at a pressure of about 1–5 torr. A portion of the dried pellets (1.40 g) was pressed into a film at 285° C. using a 2-inch diameter circular mold in a Pasadena Hydraulic, Inc. press using 12,000 pounds ram force (4-inch ram). A transparent cyan film was produced by quenching in water and had an absorption maximum at 684 nm in the light absorption spectrum.

EXAMPLE 131

Example 130 was repeated except that 4 mg of the polymeric phthalocyanine compound of Example 129 was added to the PET. The final film contained about 10 ppm and had a light absorption maximum at 685 nm.

EXAMPLE 132

EASTAPAK® PET 7352, a poly(ethyleneterephthalate) (Eastman Chemical Company) (400 g of dried pellets) was dry blended with the polydye of Example 18 (0.6 g). The blend was extruded with a C. W. Brabender ¾ inch extruder, equipped with a mixing screw, at 285° C. into a water bath and the extrudate pelletized. Good color production resulted with no evidence of color loss by sublimation to give dark red pellets containing about 0.15% by weight of the polydye.

EXAMPLE 133

Example 132 was repeated using 0.6 g of the polydye of Example 75 as the colorant to give yellow pellets having about 0.15% by weight of the polydye. No loss of color by sublimation was observed.

EXAMPLES 134–182

The diacidic azo compounds of Formula VI in Table 3 are reacted with essentially equimolar amounts of 1,2-ethanediol, dimethanesulfonate in DMF in the presence of potassium carbonate to yield the polydyes of Examples 134–182 in Table 3.

EXAMPLES 183–193

The diacidic diazo compounds of Formula VII in Table 4 are reacted with essentially equimolar amounts of 1,4-butanediol, dimethanesulfonate in DMF in the presence of potassium carbonate to yield the polydyes of Examples 183–193 in Table 4.

EXAMPLES 194–202

The diacidic bisazo compounds of Formula VIIa in Table 5 are reacted with essentially equimolar amounts of 1,3-propanediol, dimethanesulfonate in DMF in the presence of sodium carbonate to yield the polydyes of Examples 194–202 in Table 5.

EXAMPLES 203–211

The diacidic benzylidene (methine) compounds in Table 6 are reacted with essentially equimolar amounts of 1,4-cyclohexanedimethanol, dimethanesulfonate in DMF in the presence of sodium carbonate to yield the polydyes of Examples 203–211 in Table 6.

EXAMPLES 212–220

The diacidic 3-aryl-2,5-dioxypyrroline compounds of Formula X in Table 7 are reacted with essentially equimolar amounts of diethylene glycol, dimethanesulfonate in DMF in the presence of potassium carbonate to yield the polydyes of Examples 212–220 in Table 7.

EXAMPLES 221–230

The diacidic 3-aryl-5-dicyanomethylene-2-oxypyrroline compounds of Formula XI in Table 8 are reacted with essentially equimolar amounts of triethylene glycol, dimethanesulfonate to yield the polydyes of Examples 221–230 in Table 8.

EXAMPLES 231–239

The diacidic azo-methine compounds of Formula XIII in Table 9 are reacted with essentially equimolar amounts of 1,4-butanediol, dimethanesulfonate in DMF in the presence of potassium carbonate to yield the polydyes of Examples 231–239 in Table 9.

EXAMPLES 240–269

The diacidic anthraquinone compounds of Formula XIV in Table 10 are reacted with essentially equimolar amounts of 2,2,4,4-tetramehtyl-1,3-cyclobutanediol, dimethanesulfonate in N,N-dimethylacetamide in the presence of potassium carbonate to yield the polydyes of Examples 240–269 in Table 10.

EXAMPLES 270–326

The diacidic anthraquinone compounds of Formula XV in Table 11 are reacted with essentially equimolar amounts of 1,2-ethanediol, dimethanesulfonate in DMF in the presence of potassium carbonate to yield the polydyes of Examples 270–326 in Table 11.

EXAMPLES 327–344

The diacidic anthraquinone compounds of Formula XVI in Table 12 are reacted with essentially equimolar amounts of 1,6-hexanediol, dimethanesulfonate in N-methyl-2-pyrrolidinone in the presence of sodium carbonate to yield the polydyes of Examples 327–344 in Table 12.

EXAMPLES 345–361

The diacidic anthrapyridine compounds of Formula XVIII in Table 13 are reacted with essentially equimolar amounts of 1,4-butanediol, di-p-toluenesulfonate in the presence of DMF to yield the polydyes of Examples 345–361 in Table 13.

EXAMPLES 362–381

The diacidic anthraquinone compounds of Formula XIX in Table 14 are reacted with 2,2-dimethyl-1,3-propanediol, dimethanesulfonate in essentially equimolar amounts in DMF in the presence of potassium carbonate to yield the polydyes of Examples 362–381 in Table 14.

EXAMPLES 382–396

The diacidic anthraquinone compounds of Formula XIXc of Table 15 are reacted with essentially equimolar amounts of 1,2-ethanediol, dimethanesulfonate in DMF in the presence of potassium carbonate to yield the polydyes of Examples 382–396 in Table 15.

EXAMPLES 397–414

The diacidic anthraquinone compounds of Formula XIXd in Table 16 are reacted with essentially equimolar amounts of 1,6-hexanediol, dimethanesulfonate in DMF in the presence of potassium carbonate to yield the polydyes of Examples 397–414 in Table 16.

EXAMPLES 415–435

The diacidic anthraquinone compounds of Formula XIXe in Table 17 are reacted in essentially equimolar amounts with ethylene glycol, dimethanesulfonate in DMF in the presence of potassium carbonate to yield the polydyes of Examples 414–435 in Table 17.

EXAMPLES 436–449

The diacidic anthraquinone compounds of Formula XIXf in Table 18 are reacted in essentially equimolar amounts with 1,4-cyclohexanedimethanol, dimethanesulfonate in DMF in the presence of potassium carbonate to yield the polydyes of Examples 436–449 in Table 18.

EXAMPLES 450–455

The diacidic anthrapyridine compounds of Table 19 are reacted with essentially equimolar amounts of 1,6-hexanediol, di-p-toluenesulfonate in DMF in the presence of potassium carbonate to yield the polydyes of Examples 450–455 in Table 19.

EXAMPLES 456–465

The diacidic nitroarylamine compounds of Table 20 are reacted with 1,4-butanediol, dimethanesulfonate in essentially equimolar amounts in DMF in the presence of potassium carbonate to yield the polydyes of Examples 456–465 in Table 20.

EXAMPLES 466–505

The miscellaneous diacidic compounds of Table 21 are reacted with essentially equimolar amounts of the disulfonate compounds of Table 21 in DMF in the presence of potassium carbonate to yield the polydyes of Examples 466–505 in Table 21.

EXAMPLES 506–522

The diacidic UV light absorbing compounds of Table 22 are reacted with essentially equimolar amounts of the disulfonate compounds of Table 22 in DMF in the presence of potassium carbonate to yield the polymeric UV absorbers of Examples 506–522 in Table 22.

EXAMPLES 523–536

The diacidic infrared light absorbing compounds of Table 23 are reacted with essentially equimolar amounts of the disulfonate compounds of Table 23 in DMF in the presence of potassium carbonate to yield the polymeric infrared light absorbing compounds of Examples 523–536 in Table 23.

TABLE 1

Anthraquinone Polydyes in EASTAR ® PETG (300 ppm)

| Example No. | Polydye Melt Blended and Extruded With EASTAR ® PETG | Color of Film |
| --- | --- | --- |
| 37 | Polydye of Example 7 | Blue |
| 38 | Polydye of Example 8 | Blue |
| 39 | Polydye of Example 9 | Blue |
| 40 | Polydye of Example 10 | Blue |
| 41 | Polydye of Example 11 | Blue |
| 42 | Polydye of Example 12 | Blue |
| 43 | Polydye of Example 13 | Greenish-blue |
| 44 | Polydye of Example 14 | Reddish-blue |
| 45 | Polydye of Example 15 | Blue |
| 46 | Polydye of Example 16 | Green |
| 47 | Polydye of Example 17 | Bright blue |
| 48 | Polydye of Example 18 | Bluish-red |
| 49 | Polydye of Example 19 | Yellow |
| 50 | Polydye of Example 20 | Orange |
| 51 | Polydye of Example 21 | Red |
| 52 | Polydye of Example 22 | Green |
| 53 | Polydye of Example 23 | Yellow |
| 54 | Polydye of Example 24 | Yellow |
| 55 | Polydye of Example 25 | Yellow |
| 56 | Polydye of Example 26 | Yellow |
| 57 | Polydye of Example 27 | Blue |
| 58 | Polydye of Example 28 | Red |
| 59 | Polydye of Example 29 | Greenish-yellow |
| 60 | Polydye of Example 30 | Yellow |
| 61 | Polydye of Example 31 | Greenish-yellow |
| 62 | Polydye of Example 32 | Blue |
| 63 | Polydye of Example 33 | Yellow |
| 64 | Polydye of Example 34 | Yellow |
| 65 | Polydye of Example 35 | Greenish-blue |
| 66 | Polydye of Example 36 | Greenish-blue |

TABLE 2

Azo Polydyes in EASTAR ® PETG 6763 (300 ppm)

| Example No. | Polydye Melt Blended and Extruded With EASTAR ® PETG | Color of Film |
| --- | --- | --- |
| 94 | Polydye of Example 69 | Violet |
| 95 | Polydye of Example 70 | Blue |
| 96 | Polydye of Example 71 | Yellow-brown |
| 97 | Polydye of Example 72 | Red |
| 98 | Polydye of Example 73 | Orange |
| 99 | Polydye of Example 74 | Yellow |
| 100 | Polydye of Example 75 | Greenish-yellow |
| 101 | Polydye of Example 76 | Scarlet |
| 102 | Polydye of Example 77 | Yellow |
| 103 | Polydye of Example 78 | Scarlet |
| 104 | Polydye of Example 79 | Yellow |
| 105 | Polydye of Example 80 | Red |
| 106 | Polydye of Example 81 | Orange |
| 107 | Polydye of Example 82 | Reddish-brown |
| 108 | Polydye of Example 83 | Red |
| 109 | Polydye of Example 84 | Reddish-blue |
| 110 | Polydye of Example 85 | Blue |
| 111 | Polydye of Example 86 | Brown |
| 112 | Polydye of Example 87 | Reddish-brown |
| 113 | Polydye of Example 88 | Magenta |
| 114 | Polydye of Example 89 | Magenta |
| 115 | Polydye of Example 90 | Yellow |
| 116 | Polydye of Example 91 | Red |
| 117 | Polydye of Example 92 | Orange |
| 118 | Polydye of Example 93 | Scarlet |

TABLE 3

Polydyes From Diacidic Compounds of Formula VI

$$R_4\text{—}N\text{=}N\text{—}Z$$

| Example No. | $R_6$ | Z | Color |
| --- | --- | --- | --- |
| 134 | [structure: benzene with HO$_2$C, two CN, CH$_3$] | [structure with C$_2$H$_5$, NHCOCH$_3$, CH$_2$CH$_2$S-tetrazole] | violet |
| 135 | [structure: two benzene rings linked by O, with HO$_2$C groups, CN, CH$_3$] | [structure: benzene with CH$_3$, NHC$_2$H$_5$, NHCOCH$_3$] | red |
| 136 | [structure: two benzene rings linked by S, with HO$_2$C groups, CN, CH$_3$] | [structure: benzene with N(C$_3$H$_{7-n}$)$_2$, NHCOCH$_3$] | magenta |
| 137 | [structure: two benzene rings linked by O$_2$S, with HO$_2$C groups, CN, CH$_3$] | [tetrahydroquinoline structure with CH$_3$, CH$_3$CNH, (CH$_2$)$_2$, C$_2$H$_5$] | violet |

TABLE 3-continued

Polydyes From Diacidic Compounds of Formula VI
$R_4$—N=N—Z

| Example No. | $R_6$ | Z | Color |
|---|---|---|---|
| 138 | | | scarlet |
| 139 | | | red |
| 140 | | | violet |
| 141 | | | blue |
| 142 | | | orange |
| 143 | | | scarlet |
| 144 | | | magenta |

TABLE 3-continued

Polydyes From Diacidic Compounds of Formula VI $R_4$—N=N—Z

| Example No. | $R_6$ | Z | Color |
|---|---|---|---|
| 145 | (3-methyl-4-cyano-5-methylisothiazole) | phenyl-NHCOCH$_3$ with N(C$_8$H$_4$S—triazole-NH)$_2$ | magenta |
| 146 | 2-methyl-4-methylsulfonyl-6-cyanophenyl (CH$_3$SO$_2$, CH$_3$, CN) | phenyl-NHCOCH$_3$ with N(CH$_2$CH$_2$O—C$_6$H$_4$—CO$_2$H)$_2$ | bluish-red |
| 147 | 2-methyl-3-methylsulfonyl-4-cyano-6-methylsulfonylphenyl (CH$_3$SO$_2$, CN, SO$_2$CH$_3$) | 3,5-dicarboxyphenyl-O-CH$_2$-C(=O)-NH-tetrahydronaphthyl(CH$_3$, (CH$_3$)$_3$, C$_4$H$_{9\text{-}n}$) | violet |
| 148 | 2-methyl-3,5-dicyano-4-carboxyphenyl (HO$_2$C, CH$_3$, CN, CN) | 2-methoxy-5-N(C$_2$H$_5$)$_2$-phenyl-NHCOCH$_2$S—triazole | blue |
| 149 | thiophene (CH$_3$, CO$_2$H, HO$_2$C, CH$_3$) | methyl-phenyl-NHCOCH$_3$ with N(CH$_2$—C$_6$H$_5$)$_2$ | red |
| 150 | thiophene (CH$_3$, CN, HO$_2$C, CH$_3$) | methyl-phenyl-NHCOCH$_3$ with N(C$_2$H$_5$)(CH$_2$CH$_2$-phthalimide-CO$_2$H) | violet |
| 151 | thiophene (CH$_3$, CO$_2$H, NC, CH$_3$) | methyl-phenyl-NHCOCH$_3$ with N(C$_2$H$_5$)(CH$_2$CH$_2$S—C$_6$H$_4$—CO$_2$H) | violet |

TABLE 3-continued
Polydyes From Diacidic Compounds of Formula VI
R₄—N═N—Z
| Example No. | R₆ | Z | Color |
|---|---|---|---|
| 152 | 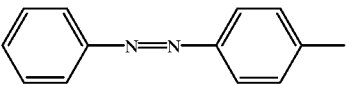 | 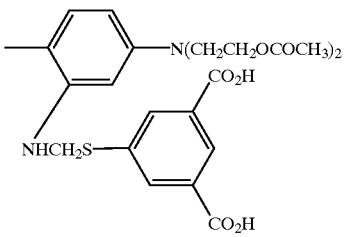 | orange |
| 153 | 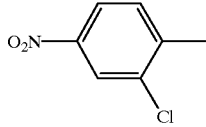 | 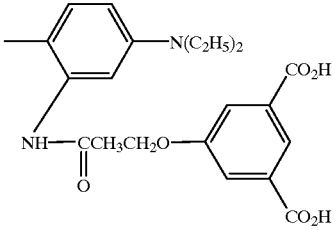 | red |
| 154 | 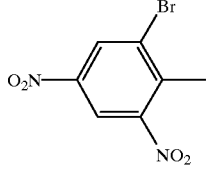 | 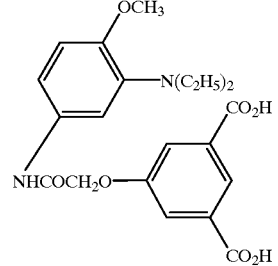 | navy blue |
| 155 | 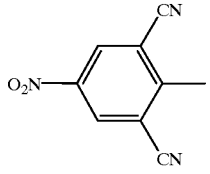 | 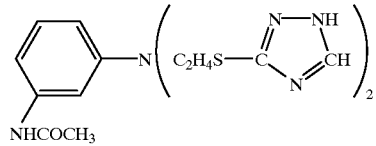 | blue |
| 156 | 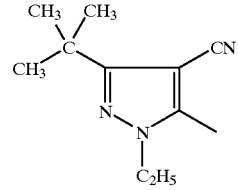 | 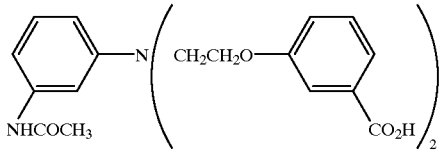 | red |
| 157 | 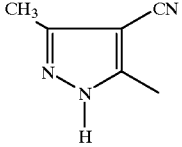 | 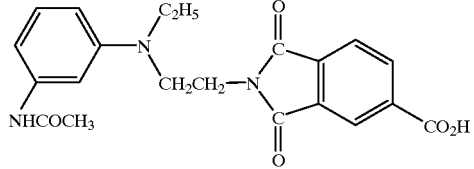 | orange |

TABLE 3-continued

Polydyes From Diacidic Compounds of Formula VI
$R_4$—N=N—Z

| Example No. | $R_6$ | Z | Color |
|---|---|---|---|
| 158 | 4,5-dicyano-2-methylimidazol-1-yl | 3-(NHCO$_2$C$_2$H$_5$)phenyl-N(C$_2$H$_5$)-CH$_2$CH$_2$OCH$_2$CH$_2$S-(1H-1,2,4-triazol-3-yl) | red |
| 159 | 5-nitro-3-methyl-2,1-benzisothiazol-3-yl | 3-(NHCOCH$_3$)phenyl-N(CH$_2$-C$_6$H$_4$-CO$_2$H)$_2$ | blue |
| 160 | 3-chloro-4-cyano-5-methyl-2-(α-cyano-α-ethoxycarbonylmethylene)thien-2-yl | 3-(NHCOCH$_3$)phenyl-N(C$_2$H$_5$)-C$_2$H$_4$O-(3,5-dicarboxyphenyl) | blue |
| 161 | 2,3-dicyano-4-methylpyridin-5-yl | 3-(NHSO$_2$CH$_3$)phenyl-N(CH$_2$CH$_2$S-3-carboxyphenyl)$_2$ | red |
| 162 | 2-ethylthio-5-methyl-1,3,4-thiadiazol-5-yl | 4-methyl-3-(cyclohexyl-NH)phenyl-NHCOCH$_2$O-(3,5-dicarboxyphenyl) | red |
| 163 | 4-chloro-2-methylbenzothiazol-2-yl | 4-methyl-3-(sec-butylamino)phenyl-NHCOCH$_2$O-(3,5-dicarboxyphenyl) | red |

TABLE 3-continued

Polydyes From Diacidic Compounds of Formula VI
R₄—N=N—Z

| Example No. | R₆ | Z | Color |
|---|---|---|---|
| 164 | 6-methyl-benzisothiazol-3(2H)-one 1,1-dioxide (saccharin-like, methylated) | 3-[N(C₂H₅)₂]-phenyl with NHCOCH₂CH₂CO₂H substituent | orange |
| 165 | 5-methylbenzene-1,3-dicarboxylic acid (HO₂C, HO₂C, CH₃) | 1,2-dimethyl-3-phenyl-1H-indole (N-CH₃) | yellow |
| 166 | 5-methylbenzene-1,3-dicarboxylic acid | 5-methyl-6-phenylimidazo[2,1-b]thiazole | yellow |
| 167 | 5-methylbenzene-1,3-dicarboxylic acid | 5-methyl-4-phenyl-2-[N(C₂H₅)₂]-thiazole | orange |
| 168 | 4-methylbenzenesulfonamide (H₂NO₂S—C₆H₄—CH₃) | 4-[N(C₂H₄CN)₂]-phenyl | yellow |
| 169 | 2-methyl-5-nitro-benzonitrile (O₂N, CN, CH₃) | N-ethyl-N-(3-sulfamoylbenzyl)aniline | red |
| 170 | 2-methyl-3-(methylsulfonyl)-5-nitro (O₂N, SO₂CH₃, CH₃) | N-ethyl-N-(2-sulfamoylethyl)-3-methylaniline | red |
| 171 | 3,5-dibromo-4-methylbenzenesulfonamide (H₂NO₂S, Br, Br, CH₃) | N-ethyl-N-(2-cyanoethyl)aniline | orange |

TABLE 3-continued

Polydyes From Diacidic Compounds of Formula VI
R₄—N=N—Z

| Example No. | R₆ | Z | Color |
|---|---|---|---|
| 172 | 3-cyano-2-methyl-5-nitrothiophene | 3-[N(CH₂CH₂CO₂H)₂]-(NHCONHC₂H₅)-phenyl | blue |
| 173 | 5-[(3,5-methylisothiazol-4-yl)methylthio]isophthalic acid | 4-methyl-3-cyano-2,6-bis(diethylamino)pyridine | red |
| 174 | 4-methylbenzoic acid | 1-(4-carboxybenzyl)-3-cyano-6-hydroxy-4,5-dimethylpyridin-2(1H)-one | yellow |
| 175 | 5-(4-methylphenoxy)isophthalic acid | 2-methyl-3-hydroxy-N-phenylbut-2-enamide | yellow |
| 176 | isophthalic acid | 4-methoxyphenyl | yellow |
| 177 | isophthalic acid | 2-methoxy-1-methylnaphthyl | yellow |
| 178 | isophthalic acid | 1-ethyl-2,5,6-trimethylindoline | orange |

TABLE 3-continued

Polydyes From Diacidic Compounds of Formula VI
R₄—N=N—Z

| Example No. | R₆ | Z | Color |
|---|---|---|---|
| 179 | 2-methyl-1,4-benzenedicarboxylic acid (CO₂H, HO₂C) | 4-methylphenyl-N(CH₂CH₂)₂SO₂ (thiomorpholine-1,1-dioxide on tolyl) | yellow |
| 180 | 2-methyl-1,4-benzenedicarboxylic acid (CO₂H, HO₂C) | 4,4-dimethylcyclohexane-1,3-dione substituent | yellow |
| 181 | 2-methyl-1,4-benzenedicarboxylic acid (CO₂H, HO₂C) | 1-ethyl-2,2,4,6,7-pentamethyl-1,2-dihydroquinoline | orange |
| 182 | 4-methyl-3-nitrobenzoic acid (HO₂C, NO₂) | 3-[N(CH₂CH₂OC₂H₅)₂]-phenyl with NHCOCH₂CH₃CO₂H | red |

TABLE 4

Polydyes From Diacidic Compounds of Formula VII
R₆—N=N—R₇—N=N—Z

| Example No. | R₆ | R₇ | Z | Color |
|---|---|---|---|---|
| 183 | 5-methyl-1,3-benzenedicarboxylic acid (HO₂C, HO₂C) | 2,4-dimethylphenyl (CH₃) | 4-methyl-3-(NHCOCH₂)-phenyl-N(C₂H₅)₂ | red |
| 184 | 2-methyl-1,4-benzenedicarboxylic acid (CO₂H, CO₂H) | 4-methoxy-2,5-dimethylphenyl (OCH₃, CH₃, CH₃) | 4-methyl-3-(NHCOCH₃)-phenyl-N(C₂H₅)(C₂H₄N-succinimide) | red |

TABLE 4-continued
Polydyes From Diacidic Compounds of Formula VII
$R_6-N=N-R_7-N=N-Z$
| Example No. | $R_6$ | $R_7$ | Z | Color |
|---|---|---|---|---|
| 185 | 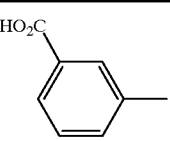 | 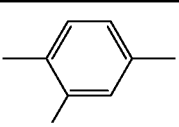 | 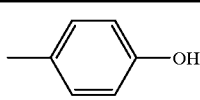 | reddish yellow |
| 186 | 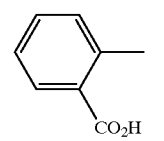 | 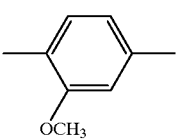 | 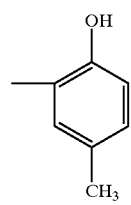 | reddish yellow |
| 187 | 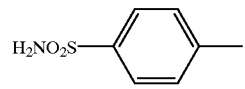 |  | 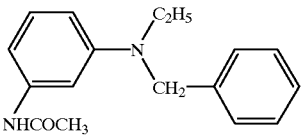 | red |
| 188 | 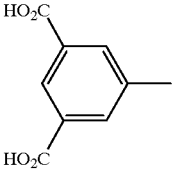 | 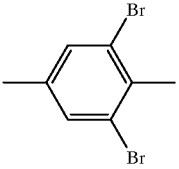 | 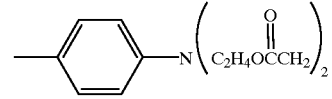 | yellow brown |
| 189 | 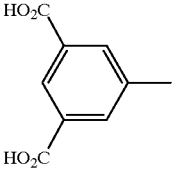 | 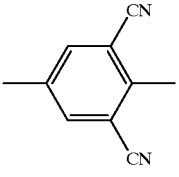 | 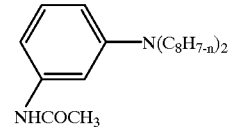 | blue |
| 190 | 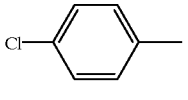 | 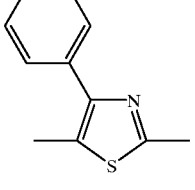 | 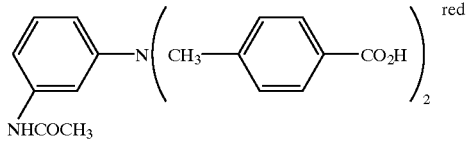 | red |
| 191 | 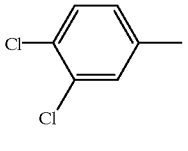 | 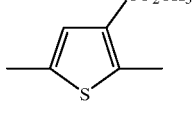 | 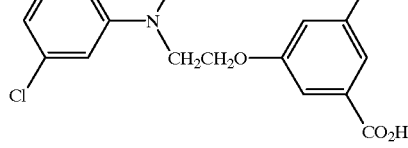 | red |
| 192 | 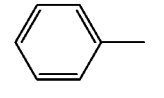 |  | 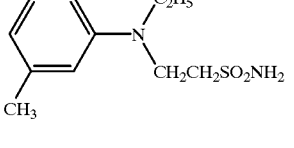 | reddish orange |

TABLE 4-continued

Polydyes From Diacidic Compounds of Formula VII
$R_6$—N=N—$R_7$—N=N—Z

| Example No. | $R_6$ | $R_7$ | Z | Color |
|---|---|---|---|---|
| 193 | HO₂C-C₆H₄- | 1,4-naphthyl | 3-(NHCOCH₃)-C₆H₄-N(CH₂C₆H₅)(CH₂C₆H₄-CO₂H) | red |

TABLE 5

Polydyes From Diacidic Compounds of Formula VIIa
$R_6$—N=N—$Y_1$—N=N—$R_6$

| Example No. | $R_6$ | $Y_1$ | Color |
|---|---|---|---|
| 194 | 5-bromo-6-methyl-phthalimide | (3,4-dimethylphenyl)(C₂H₅)N-CH₂CH₂SO₂C₂H₅-N(C₂H₅)(3,4-dimethylphenyl) | red |
| 195 | 4,5-dicyano-2-methylimidazole | (4-methylphenyl)(CH₃)N-(CH₂)₄-N(CH₃)(4-methylphenyl) | orange |
| 196 | 3,5-dimethyl-4-cyanopyrazole | (3,4-dimethylphenyl)N(C₂H₅)(C₂H₄O)-OC-C₆H₄-CO-(OC₂H₄)N(C₂H₅)(3,4-dimethylphenyl) | orange |
| 197 | 3-chloro-4-methyl-benzoic acid | bis-tetrahydroquinoline diester with (CH₂)₄ diacid | orange |
| 198 | 2-methyl-4-carboxy-1,5-dicyanobenzene | (4-methyl-3-NHCOCH₃-phenyl)N(C₂H₅)-(CH₂)₄-N(C₂H₅)(4-methyl-3-NHCOCH₃-phenyl) | violet |

TABLE 5-continued

Polydyes From Diacidic Compounds of Formula VIIa
$R_6-N=N-Y_1-N=N-R_6$

| Example No. | $R_6$ | $Y_1$ | Color |
|---|---|---|---|
| 199 | (3-methyl-5-methyl-isothiazole-4-carboxylic acid) | (bis(N-benzyl-N-(methyl-acetamidophenyl))-diethyleneglycol) | red |
| 200 | (4-cyano-3-methyl-5-methyl-thiophene-2-carboxylic acid) | (bis(benzoxazine-CH$_3$)-diester) | violet |
| 201 | (2-methylbenzoic acid) | (bis(pyridone-CN)-isophthalate diester) | yellow |
| 202 | (5-benzoyl-2-methyl-thiophene-3-carboxylic acid) | (bis(N-ethyl-3,4-dimethylanilino)-ethoxyphenyl ether) | blue |

TABLE 6

Polydyes From Diacidic Compounds of Formula VIII
$R_{11}-CH=D$

| Example No. | $R_{11}$ | D | Color |
|---|---|---|---|
| 203 | (3,4-dimethylanilino-bis(methylphenyl-CO$_2$H))$_2$ | =C(CN)$_2$ | yellow |
| 204 | (3,4-dimethylanilino-bis(ethoxyphenyl-CO$_2$H))$_2$ | =C(CN)(CO$_2$C$_2$H$_5$) | yellow |

TABLE 6-continued

Polydyes From Diacidic Compounds of Formula VIII $$R_{11}\text{—CH=D}$$

| Example No. | $R_{11}$ | D | Color |
|---|---|---|---|
| 205 | | | yellow |
| 206 | | | blue |
| 207 | | | yellow |
| 208 | | | red |
| 209 | | | red |
| 210 | | | yellow |
| 211 | | | yellow |

TABLE 7

Polydyes From Diacidic Compounds of Formula X

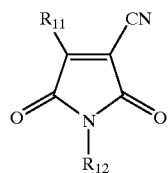

| Example No. | R₁₁ | R₁₂ | Color |
|---|---|---|---|
| 212 | —C₆H₄—N(—CH₂—C₆H₄—CO₂H·CH₃)₂ (tolyl) | C₂H₅ | red |
| 213 | 4-MeC₆H₄—N(CH₂CH₃)(CH₂—C₆H₄—CO₂H) | H | red |
| 214 | 4-Me,3-(NHCOCH₃)C₆H₃—N(C₂H₅)(CH₂CH₂CO₂H) | H | red |
| 215 | 4-Me,3-(H₃C)C₆H₃—N(C₂H₅)(C₂H₄SO₂NH₂) | CH₂C₆H₅ | red |
| 216 | 2,2,4,6,7-pentamethyl-1-(C₃H₄S-3,5-di-CO₂H-phenyl)-1,2,3,4-tetrahydroquinoline | CH₃ | violet |
| 217 | 3,6,7-trimethyl-4-(CH₂CH₂O-3,5-di-CO₂H-phenyl)-3,4-dihydro-2H-benzo[b][1,4]oxazine | CH₂CH₂OH | violet |

TABLE 7-continued
Polydyes From Diacidic Compounds of Formula X
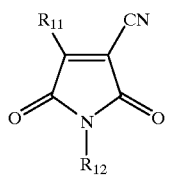
| Example No. | $R_{11}$ | $R_{12}$ | Color |
|---|---|---|---|
| 218 | ![structure] | $CH_3$—C6H4—$CO_2H$ | red |
| 219 | ![structure] | $CH_2CH_2CO_2H$ | red |
| 220 | ![structure] | H | red |
TABLE 8
Polydyes From Diacidic Compounds of Formula XI
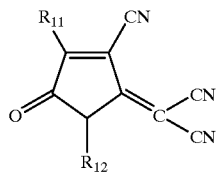
| Example No. | $R_{11}$ | $R_{12}$ | Color |
|---|---|---|---|
| 221 | ![structure] | H | blue |

TABLE 8-continued

Polydyes From Diacidic Compounds of Formula XI

[Structure: cyclopentene ring with R11, CN, =C(CN)2, O, and R12 substituents]

| Example No. | R11 | R12 | Color |
|---|---|---|---|
| 222 | [substituted benzo-indoline with HO2C, CH3 groups] | H | greenish blue |
| 223 | [bis(4-carboxybenzyl)-p-tolylamine structure] | CH2CN=CH2 | reddish blue |
| 224 | [3,4-dimethylphenyl-N(C2H5)(CH2CH2CO2H)] | CH2C6H11 | blue |
| 225 | [p-tolyl-N(phenyl)(CH2CH2CO2H)] | H | blue |
| 226 | [p-tolyl-N(CH3)-C6H4-CO2H] | H | blue |
| 227 | [2-amino-5-methyl-4-phenylthiophene-3-carboxylic acid] | H | blue |
| 228 | [6,7-dimethyl-2-methyl-1-(ethyl-phthalimide-CO2H)-tetrahydroquinoline] | H | blue |

TABLE 8-continued

Polydyes From Diacidic Compounds of Formula XI

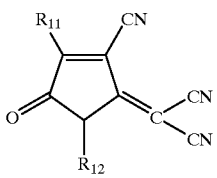

| Example No. | R₁₁ | R₁₂ | Color |
|---|---|---|---|
| 229 | (3-methylcarbazol-9-yl)CH₂-C₆H₄-CO₂H | H | blue |
| 230 | (6,7-dimethyl-3-methyl-2,3-dihydro-1,4-benzoxazin-4-yl)-CH₂CH₂O-(3,5-di(CO₂H)phenyl) | phenyl | blue |

TABLE 9

Polydyes From Diacidic Compounds of Formula XIII
D=HC—R₇—N=N—Z

| Example No. | D | R₇ | Z | Color |
|---|---|---|---|---|
| 231 | $C_2H_5O_2C$-C(CN)=C | 1,4-phenylene | 3-methyl-phenyl-N(CH₂-C₆H₄-CO₂H)₂ | red |
| 232 | $C_2H_5O_2C$-C(CN)=C | 2,5-dimethyl-4-phenyl-thiazol-4-yl | 3-NHCOCH₃-phenyl-N(CH₂-C₆H₄-CO₂H)₂ | blue |
| 233 | $CH_3SO_2$-C(CN)=C | 2,5-dimethyl-3,6-dicyanophenyl | 3-NHCOCH₃-phenyl-N(C₂H₄S-C(tetrazol-5-yl))₂ | blue |

TABLE 9-continued

Polydyes From Diacidic Compounds of Formula XIII

D=HC—R$_7$—N=N—Z

| Example No. | D | R$_7$ | Z | Color |
|---|---|---|---|---|
| 234 | 2-(benzoxazol-2-yl)acrylonitrile group | 3-chloro-4-cyano-2,5-dimethylthiophene | 3-(NHCOCH$_3$)-C$_6$H$_4$-N(C$_2$H$_4$S-C$_6$H$_4$-OH)$_2$ | blue |
| 235 | CH=C(CN)$_2$ | 4-chloro-2,5-dimethylthiazole | 3-methyl-N-ethyl-N-(C$_2$H$_4$O-3,5-(CO$_2$H)$_2$-C$_6$H$_3$)-aniline | blue |
| 236 | CH=C(CO$_2$C$_2$H$_5$)$_2$ | 3-chloro-4-cyano-2,5-dimethylthiophene | 4-methyl-3-(NHCOCH$_2$S-3,5-(CO$_2$H)$_2$-C$_6$H$_3$)-N,N-bis(CH$_2$CH$_2$OCOCH$_3$)-aniline | blue |
| 237 | NC—C(=CH)—CO$_2$-cyclohexyl | 3-ethoxy-4-cyano-2,5-dimethylthiophene | 4-methyl-3-(NHCOCH$_3$)-C$_6$H$_3$-NH-3,5-(CO$_2$H)$_2$-C$_6$H$_3$ | blue |
| 238 | NC—C(=CH)—C(O)NHC$_2$H$_5$ | 3-chloro-4-cyano-2,5-dimethylthiophene | 4-methyl-3-cyano-6-(N(CH$_3$)$_2$)-2-[N(CH$_3$)(C$_2$H$_4$O-3,5-(CO$_2$H)$_2$-C$_6$H$_3$)]-pyridine | blue |

TABLE 9-continued

Polydyes From Diacidic Compounds of Formula XIII
D=HC—R$_7$—N=N—Z

| Example No. | D | R$_7$ | Z | Color |
|---|---|---|---|---|
| 239 | 2-(1-methylbenzimidazol-2-yl)acrylonitrile group | 4-chloro-3-methoxycarbonyl-2,5-dimethylthiophene | 1-(2-sulfonylethyl)-2,7-dimethyl-1,2,3,4-tetrahydroquinoline linked to 3,5-dicarboxyphenyl | blue |

TABLE 10

Polydyes From Diacidic Anthraquinone Compounds of Formula XIV

| Example No. | Q | R$_{14}$ | Color |
|---|---|---|---|
| 240 | 5-S— | 1,4-diNHCH$_2$C(CH$_2$)$_2$CH$_2$OH | blue |
| 241 | 2-O— | 1-NH$_2$,4-OH | red |
| 242 | 2-S— | 1-NH$_2$,4-NHSO$_2$CH$_3$ | violet |
| 243 | 2-S— | 1-NH$_2$,4-NHSO$_2$C$_8$H$_5$ | violet |
| 244 | 2-SO$_2$— | 1-NH$_2$,4HC$_6$H$_5$ | blue |
| 245 | 2-SO$_2$— | 1-NH$_2$,4-NHC$_6$H$_4$-4-CH$_3$ | blue |
| 245 | 2-SO$_2$— | 1-NH$_2$,4-SC$_6$H$_5$ | violet |
| 247 | 2-S— | 1-NH$_2$,4-NHCOC$_6$H$_5$ | violet |
| 248 | 4-S— | 1-NH$_2$ | red |
| 249 | 4-S— | 1-NHC$_6$H$_{11}$ | violet |
| 250 | 4-S— | 1-NHC$_6$H$_5$ | violet |
| 251 | 4-NH— | 1-NH$_2$,2-OCH$_3$ | violet |
| 252 | 4-NH— | 1-NHC$_6$H$_5$ | green |
| 253 | 4-NH— | 1-NHC$_5$H$_3$-2,5-diC$_2$H$_5$ | blue |
| 254 | 4-NH— | 1-OH | violet |
| 255 | 2-S— | 1,4-di-OH | orange |
| 256 | 2-SO$_2$— | 1,4-di-OH | orange |
| 257 | 4-S— | 1-NHCH$_3$ | violet |
| 258 | 4-S— | 1-NHCH$_2$CH(C$_2$H$_6$)C$_4$H$_9$ | violet |
| 259 | 6(7)S— | 1,4-diNHC$_6$H$_3$- 2,6-diC$_2$H$_5$ | cyan |
| 260 | 6(7)S— | 1,4-diNHC$_6$H$_2$- 2,4,6-triCH$_3$ | cyan |
| 261 | 6(7)SO$_2$— | 1,4-diNHC$_5$H$_3$-2-CH$_3$,C$_2$H$_5$ | cyan |
| 262 | 4-NH— | 1,8-diOH,5-NO$_2$ | blue |
| 263 | 4-NH— | 1,8-diOH,5-NH$_2$ | blue |
| 264 | 4-NH— | 1,8-diOH,5-NHC$_6$H$_6$ | blue |
| 265 | 4-NH— | 1,5-diOH,8-NO$_2$ | blue |
| 266 | 4-NH— | 1-NH$_2$,2-CN | cyan |
| 267 | 4-NH— | 1-NH$_2$,2-5-C$_6$H$_5$ | blue |
| 268 | 4-NH— | 1-NH$_2$,2-S-(benzothiazol-2-yl) | blue |
| 269 | 4-NH— | 1-NH2, 2-SO$_2$-(3,4-dichlorophenyl) | blue |

TABLE 11

Polydyes From Diacidic Anthraquinone Compounds of Formula XV

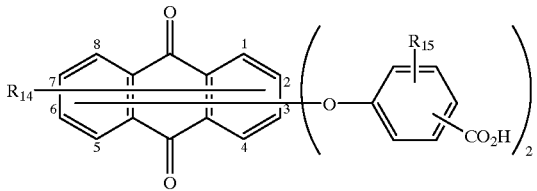

| Example No. | | $R_{14}$ | Color |
|---|---|---|---|
| 270 | 2,4-di-S—$C_6H_4$-3-$CO_2H$ | 1-$NH_2$ | red |
| 271 | 2,3-di-S—$C_6H_4$-4-$CO_2H$ | 1,4-di$NH_2$ | blue |
| 272 | 2,4-di-S—$C_4N_4$-2-$CO_2H$ | 1-$NHCH_3$ | violet |
| 273 | 2-$SO_2C_6H_4$-2-$CO_2H$,4-$NHC_4$-2-$CO_2H$ | 1-$NH_2$ | blue |
| 274 | 2-$OC_6H_4$-4-$CO_2H$,4-$NHC_6H_4$-2-$CO_2H$ | 1-$NH_2$ | violet |
| 275 | 2-$OC_6H_4$-3-$CO_2H$,4-S—$NHC_6H_4$-2-$CO_2H$ | 1-$NH_2$ | red |
| 276 | 2,4-di-S—$C_6H_4$-2-$CO_2H$ | 1-OH | orange |
| 277 | 4,5-di-S—$C_6H_4$-2-$CO_2H$ | 1,8-di$NHCH_3$ | blue |
| 278 | 4,5-di-S—$C_6H_4$-3-$CO_2H$ | 1,8-di$NHCH_2CH(CH_3)_2$ | blue |
| 279 | 4,5-di-S—$C_6H_4$-4-$CO_2H$ | 1,8-di$NH(CH_2)_7CH_3$ | blue |
| 280 | 4,5-di-S—$C_6H_4$-2-$CO_2H$ | 1,8-di$NHCH_2(C_2H_5)C_2H_9$ | blue |
| 281 | 4,5-di-S—$C_6H_4$-2-$CO_2H$ | 1,8-di$NHC_6H_4$-4-$CH_3$ | blue |
| 282 | 4,5-di-S—$C_6H_4$-2-$CO_2H$ | 1,8-di$NHC_6H_{11}$ | blue |
| 283 | 4,5-di-S—$C_6H_4$-2-$CO_2H$ | 1,8-di$NH(CH_2)_3OH$ | blue |
| 284 | 4,5-di-S—$C_6H_4$-2-$CO_2H$ | 1,8-di$NHCH_2C(CH_3)_2CH_2OH$ | blue |
| 285 | 4,5-di-S—$C_6H_4$-2-$CO_2H$ | 1,8-di$NHCH_2C_6H_5$ | blue |
| 286 | 4,5-di-S—$C_6H_4$-2-$CO_2H$ | 1,8-di$NHCH_2CH_2C_6H_5$ | blue |
| 287 | 4,5-di-S—$C_6H_4$-2-$CO_2H$ | 1,8-di$NHCH_2CH=CH_2$ | blue |
| 288 | 4,5-di-S—$C_6H_4$-2-$CO_2H$ | 1,8-di$NHCH_2C\equiv CH$ | blue |
| 289 | 4,5-di-S—$C_6H_4$-2-$CO_2H$ | 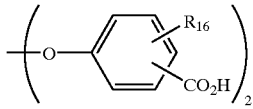 | blue |
| 290 | 4,8-di-S—$C_6H_4$-2-$CO_2H$ | 1,5-di$NHC_2H_5$ | blue |
| 291 | 4,8-di-S—$C_6H_4$-2-$CO_2H$ | 1,5-di$NHCH_2CH(CH_3)CN$ | blue |
| 292 | 4,8-di-S—$C_6H_4$-4-$CO_2H$ | 1,5-di$NHCH_2CH_2NHCOCH_3$ | blue |
| 293 | 4,8-di-S—$C_6H_4$-2-$CO_2H$ | 1,5-di$NH(CH_2)_3OC_2H_5$ | blue |
| 294 | 4,8-di-S—$C_6H_4$-2-$CO_2H$ | 1,5-di$NHCH_2C_5H_{10}$-4-$CH_3$ | blue |
| 295 | 4,8-di-S—$C_6H_4$-2-$CO_2H$ |  | blue |
| 296 | 4,8-di-S—$C_6H_4$-2-$CO_2H$ | 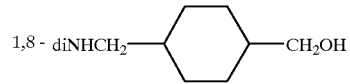 | blue |
| 297 | 4,8-di-S—$C_6H_4$-2-$CO_2H$ | 1,5-di$NH(CH_2)_3OC_6H_5$ | blue |
| 298 | 4,8-di-S—$C_6H_4$-2-$CO_2H$ | 1,5-di$NHCH(CH_3)(CH_2)_2C_6H_5$ | blue |
| 299 | 4,8-di-S—$C_6H_4$-2-$CO_2H$ | 1,5-di$NHCH(CH_2CH_3)_2$ | blue |
| 300 | 4,8-di-S—$C_6H_4$-2-$CO_2H$ | 1,5-di$SCH_2CH_2OH$ | red |
| 301 | 4,8-di-S—$C_6H_4$-2-$CO_2H$ | 1,5-di$SCH_2C_6$ | red |
| 302 | 4,8-di-S—$C_6H_4$-2-$CO_2H$ | 1,5-di$SC_6H_5$ | red |
| 303 | 4,8-di-S—$C_6H_4$-2-$CO_2H$ | 1,5-di$SC_6H_{11}$ | red |
| 304 | 4,8-di-S—$C_6H_4$-2-$CO_2H$ | 1,5-di$SC_6H_4$-4-$OCH_3$ | red |
| 305 | 4,5-di-S—$C_6H_4$-2-$CO_2H$ | 1,8-di$SC_6H_4$-4-Cl | red |
| 306 | 4,5-di-S—$C_6H_4$-2-$CO_2H$ | 1,8-di$SC_6H_4$-4-$CH_3$ | red |
| 307 | 4,5-di-S—$C_6H_4$-2-$CO_2H$ | 1,8-di$SC_6H_3$-3,4-diCl | red |
| 308 | 4,5-di-S—$C_6H_4$-2-$CO_2H$ | 1,8-di$SC_6H_4$-2-$NHCOCH_3$ | red |
| 309 | 4,5-di-S—$C_6H_4$-2-$CO_2H$ | 1,8-di$SC_6H_4$-4-$NHCOC_6H_5$ | red |
| 310 | 4,5-di-S—$C_6H_4$-2-$CO_2H$ | 1,8-di$SCH_2CH_2OCOCH_3$ | red |
| 311 | 4,8-di-S—$C_6H_4$-2-$CO_2H$ | 1,5-di$SC_6H_4$-4-$C(CH_5)_3$ | red |
| 312 | 4,8-di-S—$C_6H_4$-2-$CO_2H$ | 1,5-dibenzothiazol-2-ythio | red |
| 313 | 4,8-di-S—$C_6H_4$-2-$CO_2H$ | 1,5-dibenzoxazol-2-ytthio | red |

TABLE 11-continued

Polydyes From Diacidic Anthraquinone Compounds of Formula XV

| Example No. | $\left(-O-C_6H_3(R_{16})-CO_2H\right)_2$ | $R_{14}$ | Color |
|---|---|---|---|
| 314 | 4,8-di-S—C$_6$H$_4$-2-CO$_2$H | 1,5 - diS - C=N—N(CH$_3$)CH=N | red |
| 315 | 2,6-di-S—C$_6$H$_4$-2-CO$_2$H | 1,5-diNH$_{2,4,8\text{-diOH}}$ | blue |
| 316 | 2,6-di-O—C$_6$H$_4$-2-CO$_2$H | 1,4,5,8-tetra NH$_2$ | blue |
| 317 | 4.8-di-S—C$_6$H$_4$-2-CO$_2$H | 1,5-diNH$_2$,2,6-diBr | blue |
| 318 | 2,7-di-S—C$_6$H$_4$-2-CO$_2$H | 1,8-diNH$_2$,4,5-diNHCO$_2$CH$_3$ | blue |
| 319 | 2,7-di-SO$_2$—C$_6$H$_4$-2-CO$_2$H | 1,8-diNH$_2$,4,5-diOH | cyan |
| 320 | 4,5-di-S—C$_6$H$_4$-2-CO$_2$H | 1,8-diNHCOCH$_3$ | orange |
| 321 | 2,7-di-S—C$_6$H$_4$-2-CO$_2$H | 1,8-diNH$_2$,4,5-diNHC$_6$H$_5$ | cyari |
| 322 | 2,6-di-O—C$_6$H$_4$-2-CO$_2$H | 1,8-diNH$_2$,4,5-diNHC$_6$H$_{11}$ | blue |
| 323 | 2,8-di-SO$_2$-C$_6$H$_4$-4-CO$_2$H | 1,4,5,8-tetra NH$_2$ | cyan |
| 324 | 4,8-di-S—C$_6$H$_4$-2-CO$_2$H | 1,5 - NHCHCH$_2$SO$_2$CH$_2$CH | blue |
| 325 | 2,3-di-O—C$_6$H$_4$-4-CO$_2$H | 1,4-diNH$_2$ | violet |
| 326 | 2,3-di-SO$_2$—C$_6$H$_4$-2-CO$_2$H | 1,4-diNH$_2$ | blue |

TABLE 12

Polydyes From Diacidic Anthraquinone Compounds of Formula XVI

| Example No. | $-O-C_6H_3(R_{15})-SO_2NH_2$ | $R_{16}$ | Color |
|---|---|---|---|
| 327 | 2-O—C$_6$H$_4$—SO$_2$NH$_2$ | 1,4-diOH | orange |
| 328 | 2-O—C$_6$H$_4$—SO$_2$NH$_2$ | 1-di-NH$_2$ | violet |

TABLE 12-continued

Polydyes From Diacidic Anthraquinone Compounds of Formula XVI

[Anthraquinone structure with $R_{14}$ at position 7, positions labeled 1-8, with position 3 bearing -O-phenyl-$SO_2NH_2$ with $R_{15}$ substituent]

| Example No. | [-O-phenyl-$SO_2NH_2$ with $R_{15}$] | $R_{16}$ | Color |
|---|---|---|---|
| 329 | 2-O-phenyl-$SO_2NH_2$ (para) | 1-$NH_3$,4-OH | red |
| 330 | 2-O-phenyl-$SO_2NH_2$ (para) | 1-$NH_2$,4-$NHC_6H_5$ | violet |
| 331 | 2-S-phenyl-$SO_2NH_2$ (para) | 1-$NH_2$,4-$NHC_6H_4$-4-Cl | blue |
| 332 | 2-$SO_2$-phenyl-$SO_2NH_2$ (para) | 1-$NH_2$,4-$NHC_6H_4$-4-$OCH_3$ | blue |
| 333 | 2-O-phenyl-$SO_2NH_2$ (para) | 1-$NH_2$,4-$NHSO_2C_4H_{9-n}$ | red |
| 334 | 2-O-phenyl-$SO_2NH_2$ (para) | 1-$NH_2$,4-(benzoxazol-2-yl) | red |
| 335 | 4-NH-phenyl(2-$OCH_3$)-5-$SO_2NH_2$ | 1-$NH_2$,2-$SO_2$-$C_6H_5$ | blue-green |
| 336 | 4-NH-phenyl(2-$CH_3$)-5-$SO_2NH_2$ | 1-$NH_2$,2-Br | blue |

TABLE 12-continued

Polydyes From Diacidic Anthraquinone Compounds of Formula XVI

[Structure: anthraquinone core with positions 1-8 labeled, $R_{14}$ at position 7, $R_{15}$ on phenyl group attached via O at position 3, with $SO_2NH_2$ substituent; positions 1,4,5,8 carry C=O groups at 9,10]

| Example No. | [−O−C₆H₃(R₁₅)−SO₂NH₂ group] | $R_{16}$ | Color |
|---|---|---|---|
| 337 | 4-NH—C₆H₃(2-OCH₃)(SO₂NH₂) | 1-NH$_2$SO$_2$C$_6$H$_5$-3,4-diCl | blue |
| 338 | 4-NH—C₆H₃(2-OCH₃)(SO₂NH₂) | 1-NH$_2$,2-CN | cyan |
| 339 | 4-NH—C₆H₃(2-OC₄H₉-n)(SO₂NH₂) | 1-NH$_2$,2-NO$_3$ | cyan |
| 340 | 4-NH—C₆H₂(2-OCH₃)(3-SO₂NH₂)(5-OCH₃) | 1-NH$_2$,2-Br | blue |
| 341 | 4-NH—C₆H₂(2-OCH₃)(3-SO₂NH₂)(5-OCH₃) | 1-NH$_2$,2-SO$_2$N(C$_2$H$_5$)$_2$ | blue |
| 342 | 2-SO$_2$N(CH$_2$)—C$_6$H$_4$—SO$_2$NH$_2$ | 1-NH$_2$,4-NHC$_6$H$_4$-3-Cl | blue |

TABLE 12-continued
Polydyes From Diacidic Anthraquinone Compounds of Formula XVI

| Example No. | [ArO-C6H3(R15)-SO2NH2 group] | R16 | Color |
|---|---|---|---|
| 343 | 4-NH—C6H3(2-OCH3)(5-SO2NH2) | 1,8-diOH,5-NO2 | blue |
| 344 | 4-NH—C6H3(2-OCH3)(5-SO2NH2) | 1,5-diOH,8-NH2 | blue |

TABLE 13
Polydyes From Diacidic Anthrapyridone Compounds of Formula XVIII

| Example No. | R14 | R15 | R16 | Color |
|---|---|---|---|---|
| 345 | 6-NH—C6H3(3,5-di-CO2H) | H | $CO_2C_2H_5$ | $CH_3$ | red |

TABLE 13-continued
Polydyes From Diacidic Anthrapyridone Compounds of Formula XVIII
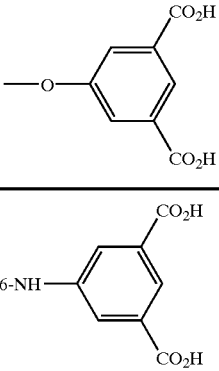
| Example No. | $R_{14}$ | $R_{15}$ | $R_{16}$ | Color |
|---|---|---|---|---|
| 346 | 6-NH—(3,5-di-CO₂H-phenyl) | CN | CH₂CH(CH₃)₂ | violet |
| 347 | 6-NH—(3,5-di-CO₂H-phenyl) | H | $C_4H_{9-n}$ | red |
| 348 | 6-NH—(3,5-di-CO₂H-phenyl) | Cl | $C_6H_{11}$ | red |
| 349 | 6-NH—(3,5-di-CO₂H-phenyl) | —S—(benzoxazol-2-yl) | CH₃ | red |
| 350 | 6-NH—(3,5-di-CO₂H-phenyl) | CN | $C_6H_5$ | violet |
| 351 | 6-NH—(3,5-di-CO₂H-phenyl) | (benzoxazol-2-yl) | CH₃ | violet |

TABLE 13-continued
Polydyes From Diacidic Anthrapyridone Compounds of Formula XVIII
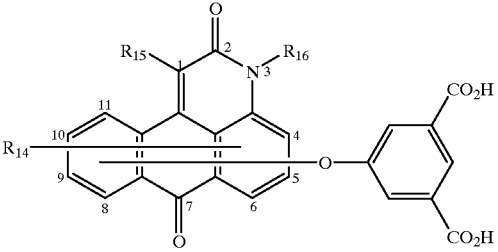
| Example No. | $R_{14}$ | $R_{15}$ | $R_{16}$ | Color |
| --- | --- | --- | --- | --- |
| 352 | 6-NH—(3,5-di-CO$_2$H-phenyl) | H | SO$_2$C$_6$H$_5$ | CH$_3$ | reddish blue |
| 353 | 6-NH—(3,5-di-CO$_2$H-phenyl) | 4-CH$_3$ | CO$_2$C$_2$H$_5$ | H | red |
| 354 | 6-S—(3,5-di-CO$_2$H-phenyl) | H | CO$_2$C$_2$H$_5$ | H | orange |
| 355 | 6-S—(3,5-di-CO$_2$H-phenyl) | H | CN | CH$_3$ | scarlet |
| 356 | 6-S—(3,5-di-CO$_2$H-phenyl) | 6-NHC$_6$H$_5$ | CN | CH$_3$ | violet |

TABLE 13-continued
Polydyes From Diacidic Anthrapyridone Compounds of Formula XVIII
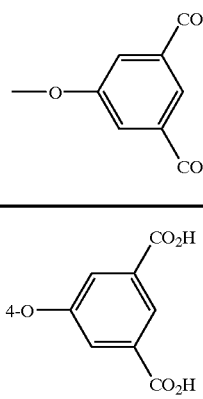
| Example No. | $R_{14}$ | $R_{15}$ | $R_{16}$ | Color |
|---|---|---|---|---|
| 357 | 4-O-[3,5-(CO$_2$H)$_2$C$_6$H$_3$] | 6-NHC$_6$H$_4$-4-CH$_3$ | CO$_2$C$_2$H$_5$ | CH$_3$ | red |
| 358 | 6-S-[3,5-(CO$_2$H)$_2$C$_6$H$_3$] | 6-NHC$_6$H$_5$ | H | CH$_3$ | red |
| 359 | 6-NH-[3,5-(CO$_2$H)$_2$C$_6$H$_3$] | H | COC$_6$H$_5$ | CH$_2$CH$_2$OC$_2$H$_5$ | red |
| 360 | 6-NH-[3,5-(CO$_2$H)$_2$C$_6$H$_3$] | H | CN | (CH$_2$)$_7$CH$_3$ | violet |
| 361 | 6-NH-[3,5-(CO$_2$H)$_2$C$_6$H$_3$] | 4-Br | CN | CH$_3$ | violet |

TABLE 14

Polydyes From Diacidic Anthraquinone Compounds of Formula XIX

| Example No. | $\left(\!-O-\!\!\!\overset{R_{14}'}{\underset{}{\bigcirc}}\!\!-OH\right)_{\!2}$ | $R_{14}$ | Color |
|---|---|---|---|
| 362 | 1,5-diNH—⟨⟩—OH | H | red |
| 363 | 1,5-diNH—⟨⟩(OH meta) | H | red |
| 364 | 1,8-diNH—⟨⟩(OH ortho) | H | red |
| 365 | 1,8-diNH—⟨⟩(CH₂, OH) | H | red |
| 366 | 2,3-diS—⟨⟩—OH | 1,4-diNH$_2$ | blue |
| 367 | 4,5-diS—⟨⟩—OH | 1,8-diNHCH$_2$CH(CH$_3$)$_2$ | blue |
| 368 | 4,8-diS—⟨⟩—OH | 1,5-diSC$_6$H$_5$ | red |
| 369 | 4,5-diS—⟨⟩—OH | 1,6-di—S—benzoxazolyl | red |

TABLE 14-continued

Polydyes From Diacidic Anthraquinone Compounds of Formula XIX

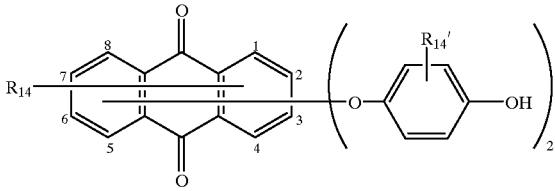

| Example No. | | $R_{14}$ | Color |
|---|---|---|---|
| 370 | 6,7-diS—⟨phenyl⟩—OH | 1,4-diNH—(2,6-diC$_2$H$_5$-phenyl) | cyan |
| 371 | 6,7-diSO$_2$—⟨phenyl⟩—OH | 1,4-diNH—(2,4,6-triCH$_3$-phenyl) | cyan |
| 372 | 2,3-diO—⟨phenyl⟩—OH | 1,4-diNH$_2$ | violet |
| 373 | 4,5-diNH—⟨phenyl⟩—OH | 1,8-diOH | blue |
| 374 | 4,5-diS—⟨phenyl⟩—OH | 1,8-diNHC$_6$H$_{11}$ | blue |
| 375 | 4,5-diS—⟨phenyl⟩—OH | 1,8-diNHCH$_2$—(cyclohexyl)—CH$_2$OH | blue |
| 376 | 4,5-diS—⟨phenyl⟩—OH | 1,8-diNHCH$_2$C(CH$_3$)$_2$CH$_2$OH | blue |
| 377 | 4,5-diS—⟨phenyl⟩—OH | 1,8-diNHCH$_2$CH(C$_2$H$_5$)C$_4$H$_{9-n}$ | blue |
| 378 | 4,5-diS—⟨phenyl⟩—OH | 1,4,5,8-tetra NH$_2$ | blue |

TABLE 14-continued

Polydyes From Diacidic Anthraquinone Compounds of Formula XIX

| Example No. | $\left(\begin{array}{c}\phantom{X}\\-O-\phantom{X}-OH\end{array}\right)_2$ with $R_{14}'$ | $R_{14}$ | Color |
|---|---|---|---|
| 379 | 4,5-diS—⟨phenyl⟩—OH | 1,8-diNH$_2$, 4,5-diOH | blue |
| 380 | 4,5-diS—⟨phenyl⟩—OH | 1,8-diNH$_2$, 4,5-diNHC$_6$h$_5$ | cyan |
| 381 | 1,5-diN(CH$_2$)SO$_2$—⟨phenyl⟩—OH | H | yellow |

TABLE 15

Polydyes From Diacidic Anthraquinone Compounds of Formula XIXc

| Example No. | $\left(-O-\phantom{X}-O-\phantom{X}-CO_2H\right)_2$ with $R_{14}'$ | $R_{14}$ | Color |
|---|---|---|---|
| 382 | 1,4-diNH—⟨phenyl⟩—O—⟨phenyl⟩—CO$_2$H | H | green |
| 383 | 1,4-diNH—⟨3,5-diBr-phenyl⟩—O—⟨phenyl⟩—CO$_2$H | H | blue |

TABLE 15-continued

Polydyes From Diacidic Anthraquinone Compounds of Formula XIXc

| Example No. | [R substituent structure] | $R_{14}$ | Color |
|---|---|---|---|
| 384 | 1,4-diNH—[3,5-di(C₂H₅)phenyl]—SO₂NH—C₆H₄—CO₂H | H | blue |
| 385 | 1,4-diNH—[2,4,6-tri(CH₃)phenyl]—SO₂NH—[3-CO₂H-phenyl] | H | blue |
| 386 | 1,4-diNH—[2,4-di(CH₃),3-Br-phenyl]—SO₂NH—C₆H₄—CO₂H | H | blue |
| 387 | 1,4-diNH—[3,5-di(C₂H₅),...-phenyl]—SO₂N(CH₃)—C₆H₄—CO₂H | H | blue |
| 388 | 2,4-diS—C₆H₄—SO₂NH—C₆H₄—CO₂H | 1-NH₂ | red |
| 389 | 2,4-diO—C₆H₄—SO₂NH—[2-CO₂H-phenyl] | 1,4-diNH₂ | violet |

TABLE 15-continued
Polydyes From Diacidic Anthraquinone Compounds of Formula XIXc
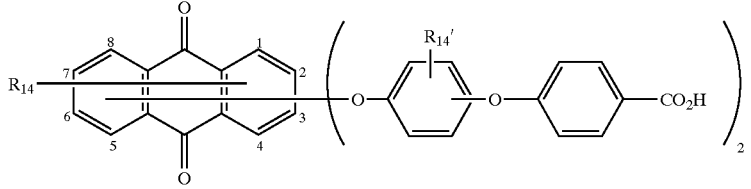
| Example No. | | $R_{14}$ | Color |
|---|---|---|---|
| 390 | 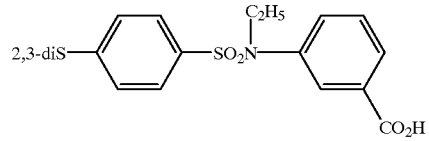 | 1,4-diNH$_2$ | blue |
| 391 | 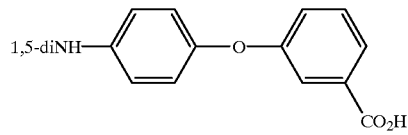 | H | red |
| 392 | 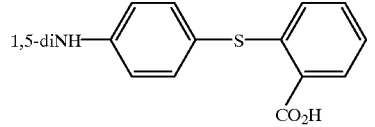 | H | red |
| 393 | 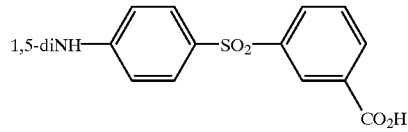 | H | red |
| 395 | 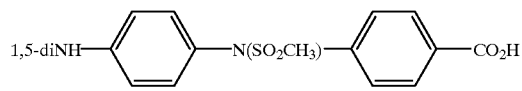 | H | red |
| 396 | 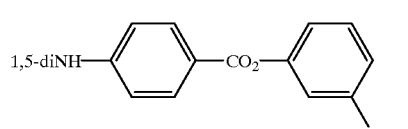 | H | red |

TABLE 16
Polydyes From Diacidic Anthraquinone Compounds of Formula XIXd
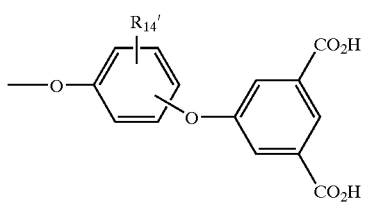
| Example No. | (structure) | $R_{14}$ | Color |
|---|---|---|---|
| 397 | 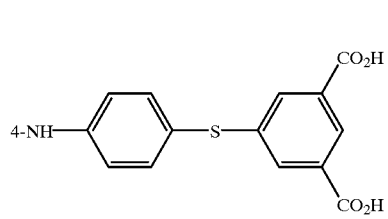 | H | red |
| 398 | 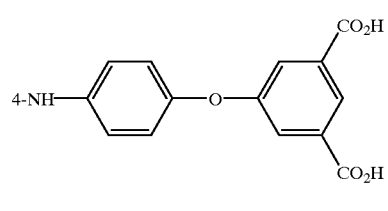 | 1-NHC$_4$H$_{9-n}$ | blue |
| 399 | 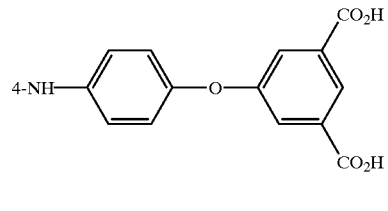 | 1-NH$_2$, 2-CN | cyan |
| 400 | 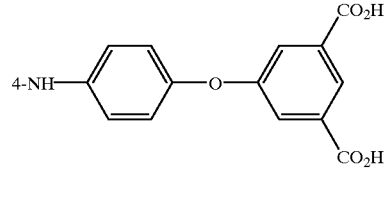 | 1-NH$_2$, 2-SO$_2$N(CH$_3$)C$_6$H$_5$ | blue |
| 401 | | 1-NH$_2$, 2-CF$_3$ | cyan |

TABLE 16-continued

Polydyes From Diacidic Anthraquinone Compounds of Formula XIXd

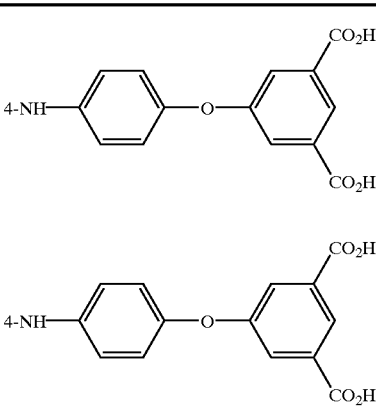

| Examle No. | | $R_{14}$ | Color |
|---|---|---|---|
| 402 | 4-NH—⟨phenyl⟩—O—⟨phenyl(CO$_2$H)$_2$⟩ | 1-NH$_2$2-S—⟨phenyl-Cl⟩ | blue |
| 403 | 4-NH—⟨phenyl⟩—O—⟨phenyl(CO$_2$H)$_2$⟩ | 1-NH$_2$-2-OCH$_2$CH$_2$OH | violet |
| 404 | 4-NH—⟨phenyl⟩—CONH—⟨phenyl(CO$_2$H)$_2$⟩ | 1-NH$_2$-2-Br | blue |
| 405 | 4-NH—⟨phenyl⟩—N(COCH$_3$)—⟨phenyl(CO$_2$H)$_2$⟩ | 1-NH$_2$, 2-SO$_2$C$_6$h$_5$ | blue |
| 406 | 4-NH—⟨phenyl(OCH$_3$)⟩—SO$_2$N(CH$_2$)—⟨phenyl(CO$_2$H)$_2$⟩ | 1-NH$_2$-2-Br | blue |

TABLE 16-continued

Polydyes From Diacidic Anthraquinone Compounds of Formula XIXd

| Examle No. | (structure) | $R_{14}$ | Color |
|---|---|---|---|
| 407 | 2-O—⟨C₆H₄⟩—SO₂N(CH₃)—⟨C₆H₃⟩(CO₂H)(CO₂H) | 1-NH₂-4-OH | red |
| 408 | 2-O—⟨C₆H₄⟩—SO₂N(CH₃)—⟨C₆H₃⟩(CO₂H)(CO₂H) | 1,4-diNH₂ | violet |
| 409 | 2-O—⟨C₆H₄⟩—SO₂N(CH₃)—⟨C₆H₃⟩(CO₂H)(CO₂H) | 1-NH₂, 4-NH—⟨C₆H₄⟩—OCH₃ | violet |
| 410 | 2-O—⟨C₆H₄⟩—SO₂N(CH₃)—⟨C₆H₃⟩(CO₂H)(CO₂H) | 1-NH₂, 4-NHSO₂—⟨C₆H₄⟩—CH₃ | red |
| 411 | 2-O—⟨C₆H₄⟩—SO₂N(CH₃)—⟨C₆H₃⟩(CO₂H)(CO₂H) | 1-NH₂, 4-S—(benzothiazol-2-yl) | red |

TABLE 16-continued
Polydyes From Diacidic Anthraquinone Compounds of Formula XIXd
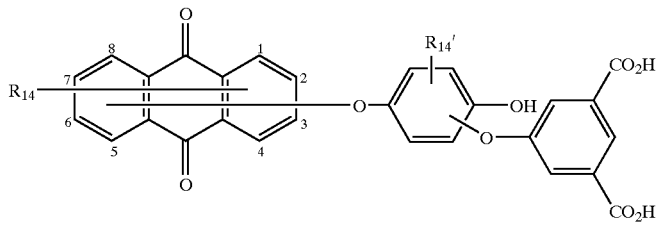
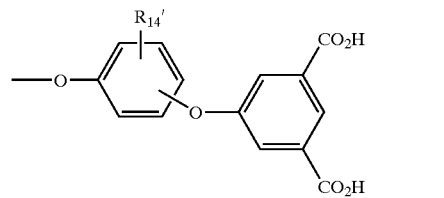
| Examle No. | | $R_{14}$ | Color |
|---|---|---|---|
| 412 | 2-S—⟨C6H4⟩—$SO_2N(C_2H_5)$—⟨benzene with 2 $CO_2H$⟩ | 1-$NH_2$, 4-$NHC_6H_5$ | blue |
| 413 | 2-$SO_2$—⟨C6H4⟩—$SO_2N(C_2H_5)$—⟨benzene with 2 $CO_2H$⟩ | 1-$NH_2$, 4-$NHC_6H_{11}$ | blue |
| 414 | 2-$SO_2NH$—⟨C6H4⟩—$SO_2N(CH_3)$—⟨benzene with 2 $CO_2H$⟩ | 1-$NH_2$, 4-$NHC_6H_5$ | blue |

TABLE 17

Polydyes From Diacidic Anthraquinone Compounds of Formula XIXe

[Structure: Anthraquinone with positions 1-8 labeled, with R14 substituent, and 3-position connected via -O-phenyl-R14'-O-phenyl-SO2NH2]

[Structure: -O-phenyl(R14')-O-phenyl-SO2NH2]

| Example No. | | R14 | Color |
|---|---|---|---|
| 415 | 1-NH—phenyl—SO2N(CH3)—phenyl—SO2NH2 | H | red |
| 416 | 4-NH—phenyl(OCH2)—SO2N(C4H9-n)—phenyl—SO2NH2 | 1-NHCH3 | blue |
| 417 | 4-NH—phenyl—O—phenyl—SO2NH2 | 1-OH | violet |
| 418 | 4-NH—phenyl—O—phenyl—SO2NH2 | 1-NH2-2-Br | blue |
| 419 | 4-NH—phenyl—O—phenyl—SO2NH2 | 1-NH2-2-OC6H5 | violet |
| 420 | 4-NH—phenyl—O—phenyl—SO2NH2 | 1-NH2-2-SO2CH3 | blue |
| 421 | 4-NH—phenyl—O—phenyl—SO2NH2 | 1-NH2-2-COC6H5 | blue |
| 422 | 4-NH—phenyl—O—phenyl—SO2NH2 | 1-NH2-2-CF3 | cyan |
| 423 | 4-NH—phenyl—O—phenyl—SO2NH2 | 1-NH2-2-CF3 | blue |

TABLE 17-continued

Polydyes From Diacidic Anthraquinone Compounds of Formula XIXe

[Structure: Anthraquinone with positions 1-8 labeled, $R_{14}$ at position 7, and at position 1 connected via O to a phenyl (with $R_{14}'$) -O- phenyl -SO$_2$NH$_2$]

| Example No. | [—O—phenyl($R_{14}'$)—O—phenyl—SO$_2$NH$_2$ variant] | $R_{14}$ | Color |
|---|---|---|---|
| 424 | 4-NH—phenyl—O—phenyl—SO$_2$NH$_2$ | 1-NH$_2$-2-SO$_2$N(CH$_3$)$_2$ | blue |
| 425 | 4-NH—phenyl—S—phenyl—SO$_2$NH$_2$ | 1-NHC$_6$H$_{11}$ | blue |
| 426 | 4-NH—phenyl—S—phenyl—SO$_2$NH$_2$ | 1-NHC$_6$H$_5$ | green |
| 427 | 2-O—phenyl—O—phenyl—SO$_2$NH$_2$ | 1-NH$_2$, 4-OH | red |
| 428 | 2-O—phenyl—O—phenyl—SO$_2$NH$_2$ | 1-NH$_2$, 4-NHSO$_2$CH$_3$ | red |
| 429 | 2-O—phenyl—O—phenyl—SO$_2$NH$_2$ | 1-NH$_2$, 4-NHCO$_2$C$_2$H$_5$ | red |
| 430 | 2-O—phenyl—O—phenyl—SO$_2$NH$_2$ | 1-NH$_2$-4-NHSO$_2$C$_6$H$_5$ | red |
| 431 | 2-O—phenyl—O—phenyl—SO$_2$NH$_2$ | 1-NH$_2$-4-NHCOC$_2$H$_5$ | red |
| 432 | 2-O—phenyl—O—phenyl—SO$_2$NH$_2$ | 1,4-diNH$_2$ | violet |
| 433 | 2-SO$_2$—phenyl—O—phenyl—SO$_2$NH$_2$ | 1-NH$_2$-4-NHC$_6$H$_5$ | blue |

TABLE 17-continued

Polydyes From Diacidic Anthraquinone Compounds of Formula XIXe

| Example No. | | $R_{14}$ | Color |
|---|---|---|---|
| 434 | 4-NH—⟨benzene⟩—O—⟨benzene⟩—$SO_2NH_2$ | 1,8-diOH, 5-$NO_2$ | blue |
| 435 | 4-NH—⟨benzene⟩—N($SO_2CH_3$)—⟨benzene⟩—$SO_2NH_2$ | 1-$NH_2$-2-$SO_2C_6H_5$ | blue |

TABLE 18

Polydyes From Diacidic Anthraquinones of Formula XIXf

| Example No. | | $R_{14}$ | Color |
|---|---|---|---|
| 436 | 1,4-diNH—⟨benzene with $CH_2$ and $C_2H_5$⟩—$SO_2NH$—⟨benzene⟩—OH | H | blue |
| 437 | 1,4-diNH—⟨benzene with $CH_3$, $CH_3$, Br⟩—$SO_2NH(CH_3)$—⟨benzene⟩—OH | H | blue |
| 438 | 1,4-diNH—⟨benzene⟩—O—⟨benzene⟩—OH | H | green |

TABLE 18-continued

Polydyes From Diacidic Anthraquinones of Formula XIXf

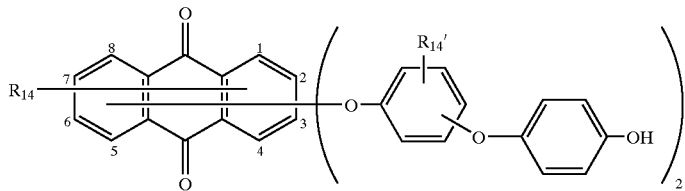

| Example No. | | $R_{14}$ | Color |
|---|---|---|---|
| 439 | 1,4-diNH—⟨phenyl⟩—S—⟨phenyl⟩—OH | H | green |
| 440 | 1,5-diNH—⟨phenyl⟩—SO$_2$—⟨phenyl⟩—OH | H | red |
| 441 | 1,8-diNH—⟨phenyl⟩—CONH—⟨phenyl⟩—OH | H | red |
| 442 | 2,3-diO—⟨phenyl⟩—O—⟨phenyl⟩—OH | 1,4-diNH$_2$ | violet |
| 443 | 2,3-diS—⟨phenyl⟩—O—⟨phenyl⟩—OH | 1,4-diNH$_2$ | blue |
| 444 | 1,5-diNH—⟨phenyl(OCH$_3$)⟩—SO$_2$NH—⟨phenyl⟩—OH | H | red |
| 445 | 1,5-diNH—⟨phenyl(OCH$_3$)⟩—SO$_2$NH—⟨phenyl⟩—OH | 4,8-diNH$_2$,3,7-diBr | blue |

TABLE 18-continued

Polydyes From Diacidic Anthraquinones of Formula XIXf

| Example No. | (structure) | R₁₄ | Color |
|---|---|---|---|
| 446 | 2,4-diS—⟨phenyl⟩—SO₂N(CH₃)—⟨phenyl⟩—OH | 1-NH₂ | red |
| 447 | 1,4-diNH—⟨2,6-diCH₃ phenyl⟩—O—⟨phenyl⟩—OH | 6,7-diCl | cyan |
| 448 | 1,4-diNH—⟨phenyl⟩—CONH—⟨3-CH₃ phenyl⟩—OH | H | blue |
| 449 | 1,4-diNH—⟨phenyl⟩—NHO₂S—⟨phenyl⟩—OH | H | blue |

TABLE 19

Polydyes From Diacidic Anthrapyridines

| Example No. | Anthrapyridines | Color |
|---|---|---|
| 450 | (anthrapyridine structure with piperidine, CN, and NH-phenyl-3,5-di-CO₂H substituents) | red |

TABLE 19-continued
Polydyes From Diacidic Anthrapyridines
| Example No. | Anthrapyridines | Color |
|---|---|---|
| 451 | 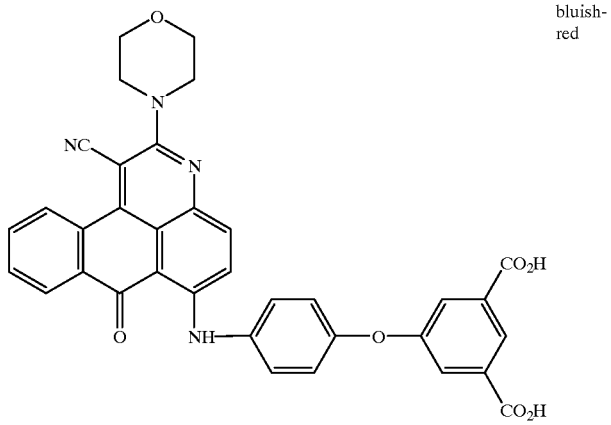 | bluish-red |
| 452 | 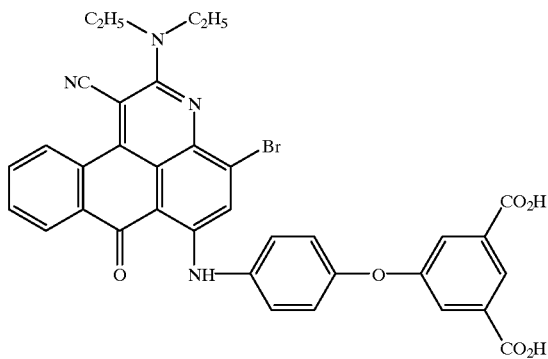 | red |
| 453 | 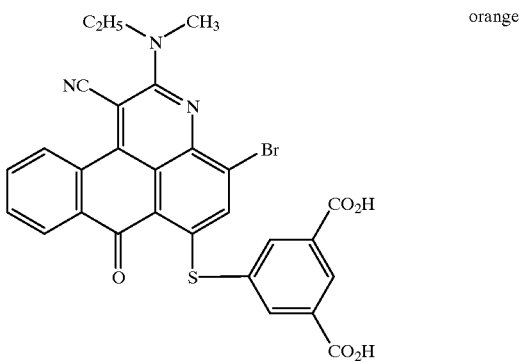 | orange |

TABLE 19-continued

Polydyes From Diacidic Anthrapyridines

| Example No. | Anthrapyridines | Color |
|---|---|---|
| 454 | | violet |
| 455 | | red |

TABLE 20

Polydyes From Diacidic Nitroarylamines

| Example No. | Nitroarylamine Compound | Color |
|---|---|---|
| 456 | | yellow |
| 457 | | yellow |
| 458 | | yellow |

TABLE 20-continued
Polydyes From Diacidic Nitroarylamines
| Example No. | Nitroarylamine Compound | Color |
|---|---|---|
| 459 | 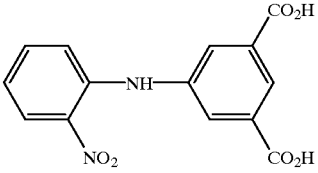 | yellow |
| 460 | 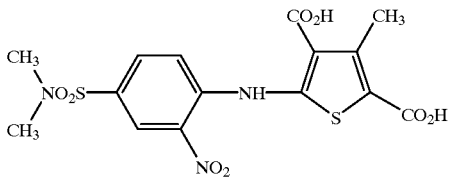 | yellow |
| 461 | 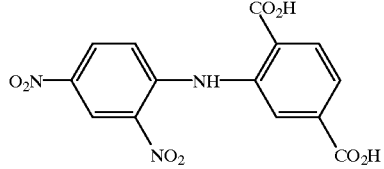 | yellow |
| 462 | 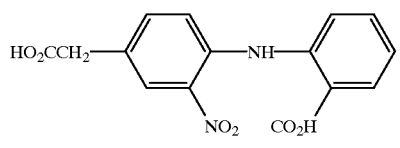 | yellow |
| 463 | 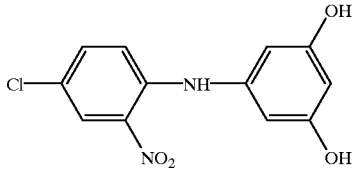 | yellow |
| 464 | 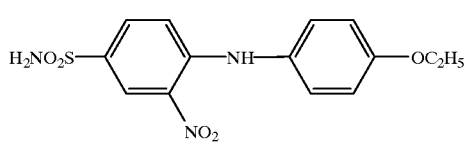 | yellow |
| 465 | 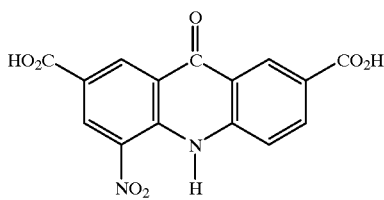 | yellow |

TABLE 21
Miscellaneous Polydyes
| Example No. | Diacidic Compound Reacted |
|---|---|
| 466 | 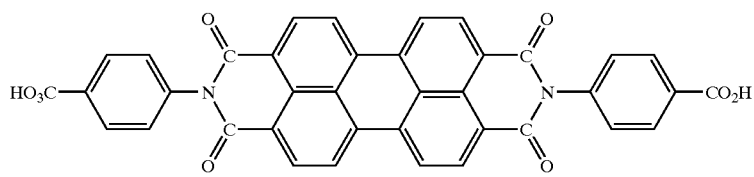 |
| 467 | 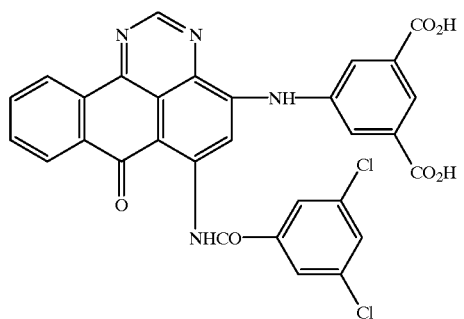 |
| 468 | 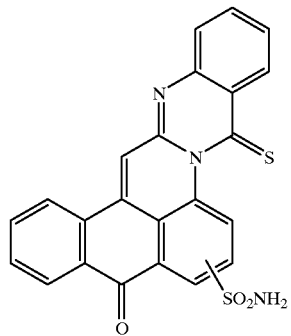 |
| 469 | 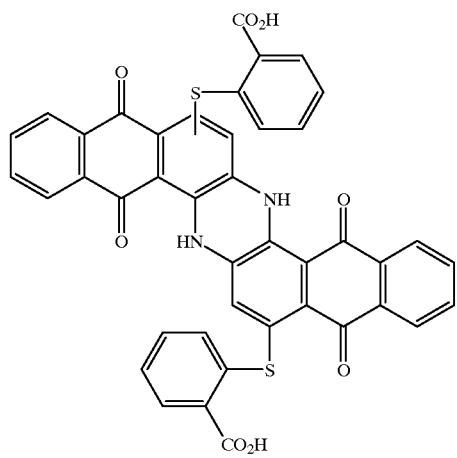 |

TABLE 21-continued
Miscellaneous Polydyes
470
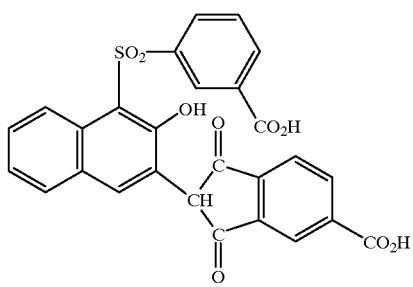
471
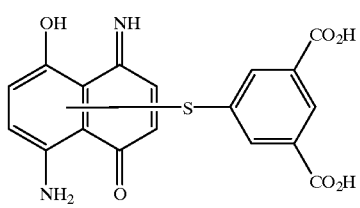
472
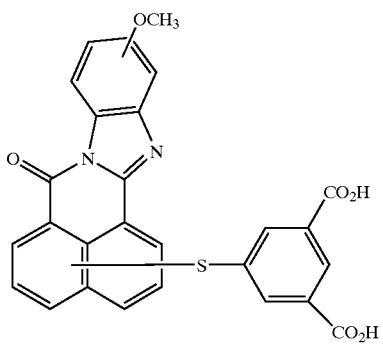
473
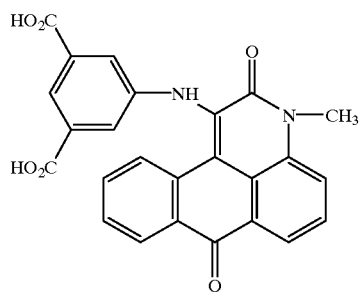
474
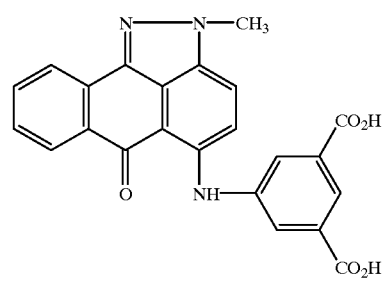

TABLE 21-continued
Miscellaneous Polydyes
475 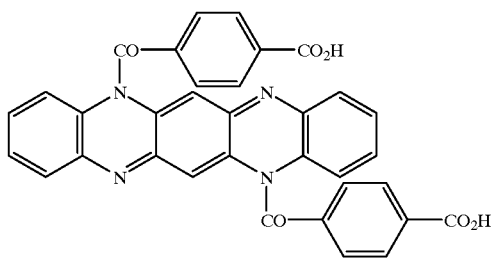
476 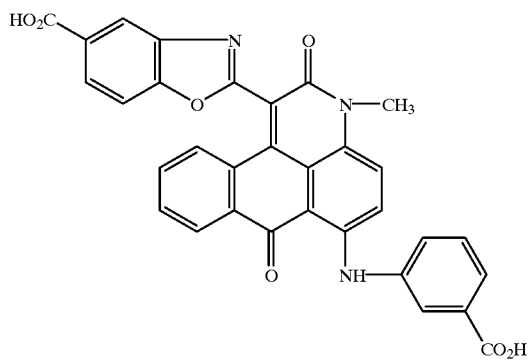
477 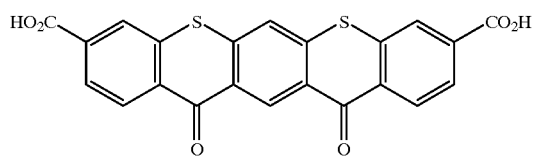
478 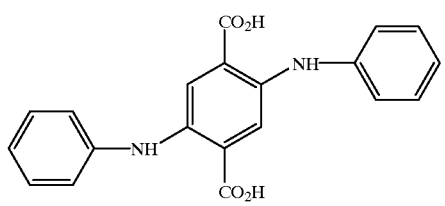
479 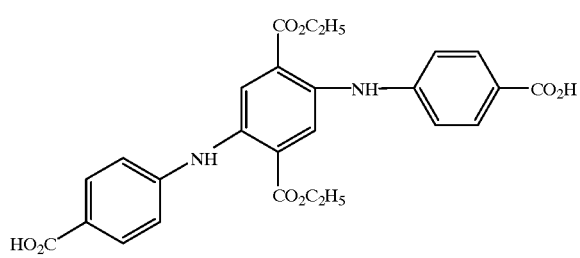

TABLE 21-continued
Miscellaneous Polydyes
480
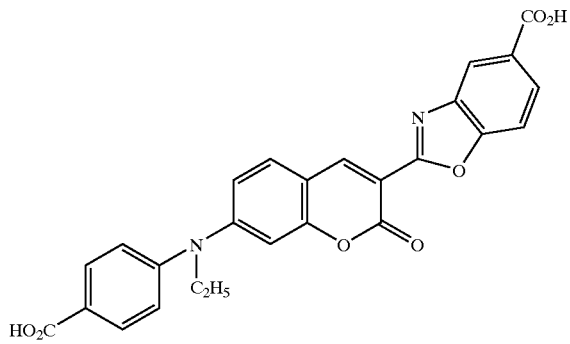
481
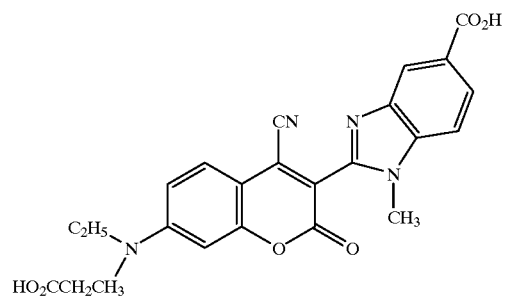
482
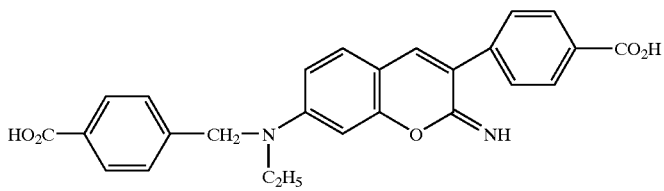
483
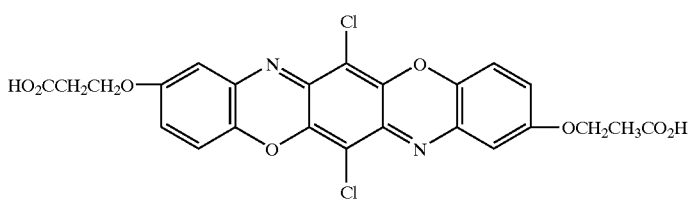
484
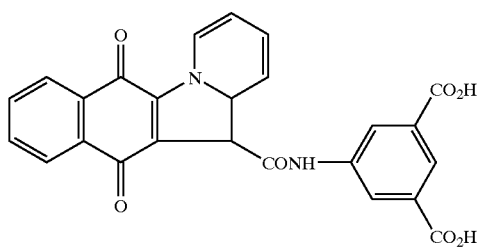

US 6,776,930 B2
TABLE 21-continued
Miscellaneous Polydyes
485
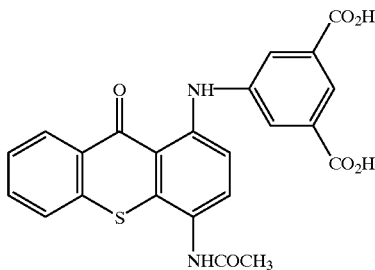
486
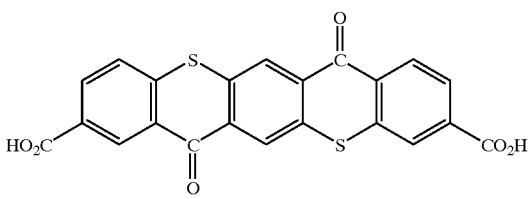
487
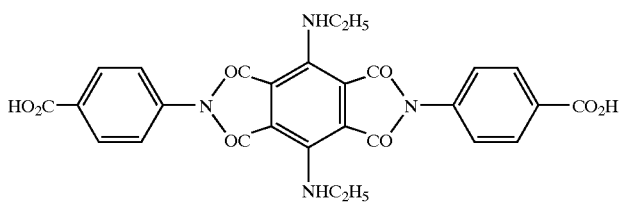
488
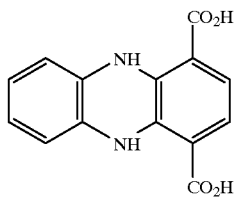
489
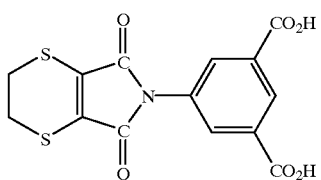
490
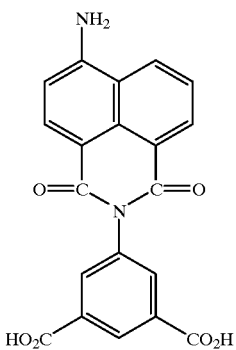

TABLE 21-continued
Miscellaneous Polydyes
491 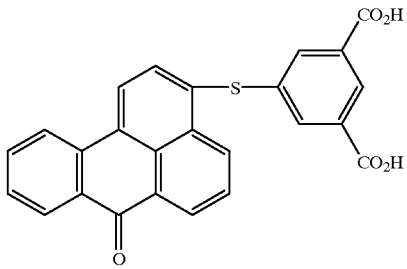
492 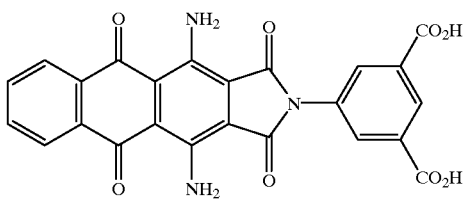
493 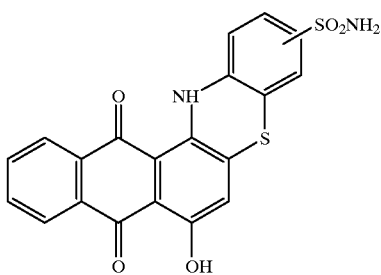
494 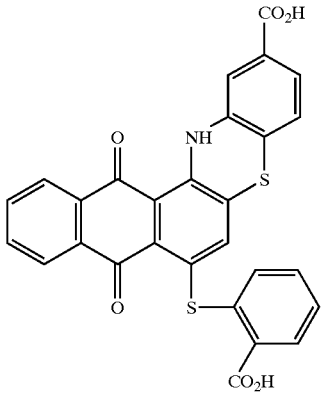
495 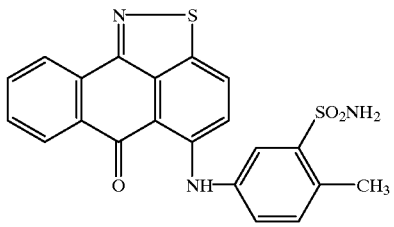

TABLE 21-continued
Miscellaneous Polydyes
496
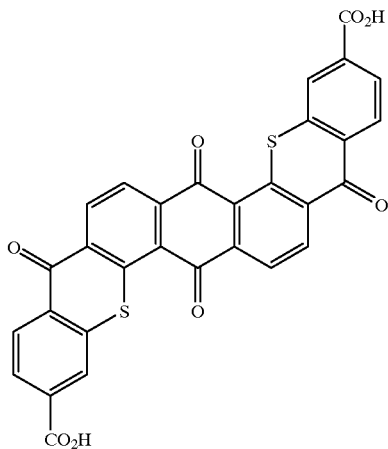
497
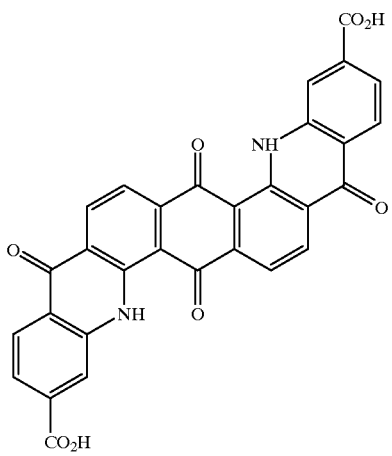
498
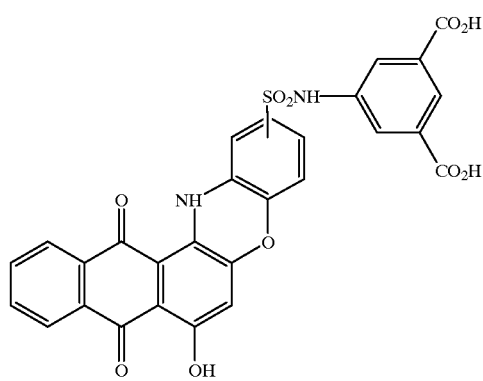
499
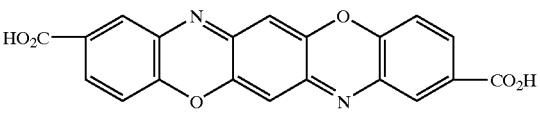

TABLE 21-continued
Miscellaneous Polydyes
500 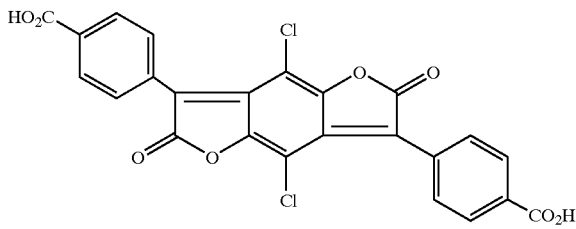
501 [CuPc]—SO₂NH₂
    Pc = pathacyanne
502 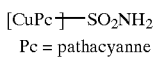 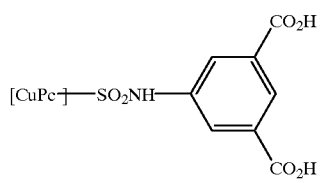
503 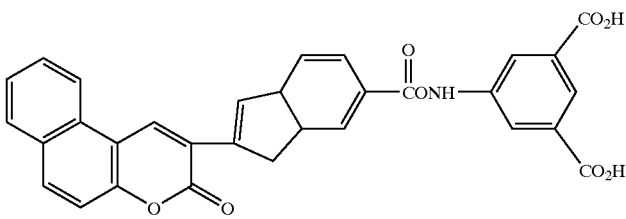
504 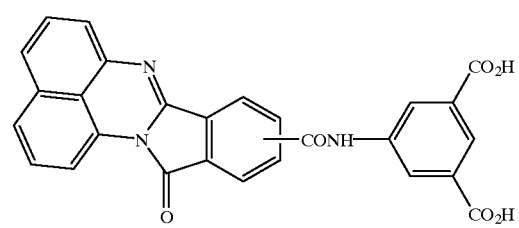
505 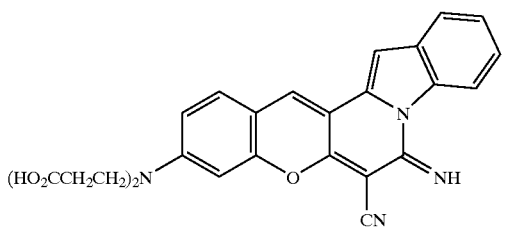
| Example No. | Disulfonate Compound Reacted | Color |
| --- | --- | --- |
| 466 | CH₃SO₂O(CH₂)₃OSO₂CH₃ | red |
| 467 | 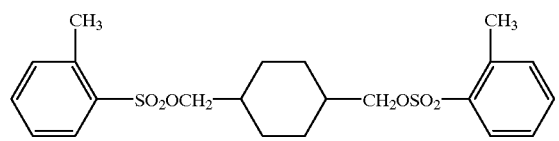 | |

TABLE 21-continued

Miscellaneous Polydyes

468

$$CH_3SO_2OCH\underset{\underset{CH_3\ CH_3}{|\ \ |}}{\overset{\overset{CH_3\ CH_3}{|\ \ |}}{\underset{|}{C}-\underset{|}{C}}}CHOSO_2CH_3$$

469

Structure: p-tolyl-SO₂OCH—[cyclobutane with 4 CH₃ groups]—CHOSO₂-p-tolyl

470  CH₂SO₂OCH₂CH₂O—C₆H₄—OCH₂CH₂OSO₂CH₂

471  C₆H₅—CH₂SO₃OCH₂CH₃OSO₂CH₂—C₆H₅

472  (3-NO₂-C₆H₄)—SO₂OCH₂CH₂OCH₃CH₂OSO₃—(3-NO₂-C₆H₄)    yellow

473  CH₃SO₂(OCH₂CH₂)₃OSO₂CH₃    yellow

474  CH₂SO₂OCH₂CH₂SCH₂CH₂OSO₂CH₃    red

475  $CH_3SO_2OCH_2CH_3\underset{\underset{SO_2CH_3}{|}}{N}CH_2CH_2OSO_2CH_3$    red 476  $CH_3SO_2OCH_2CH_3\underset{\underset{CH_3}{|}}{N}CH_2CH_3OSO_2CH_3$    violet 477  C₆H₅—N(CH₂CH₃OSO₂CH₃)(CH₂CH₃OSO₂CH₃) (CH₃SO₂OCH₃CH₃NCH₂CH₃OSO₂CH₃)    yellow 478  CH₃SO₂OCH₂CH₂OSO₂CH₃    orange
479  CH₂SO₂OCH₂CH₃OCH₂CH₂OSO₂CH₃    orange
480  CH₂SO₂OCH₂CH(CH₃)CH₂OSO₂CH₃    yellow
481  CH₃CH₂SO₂OCH₂CH₂CH₂OSO₂CH₂CH₃    red
482  n-C₄H₉SO₂OCH₂CH₂CH₂CH₂OSO₃C₄H₉    yellow
483  CH₂SO₂O(CH₂)₆OSO₂CH₃    red 484  CH₃SO₂OCH₂—[cyclohexane]—CH₂OSO₂CH₃    orange 485  C₆H₅—SO₂OCH₃CH₃OSO₃CH₃    reddish-yellow TABLE 21-continued Miscellaneous Polydyes

| | | |
|---|---|---|
| 486 | Cl—C₆H₄—SO₂OCH₂CH₂CH₂OSO₃—C₆H₄—Cl | yellow |
| 487 | CH₃—C₆H₄—SO₂O(CH₃)₂OSO₂—C₆H₄—CH₃ | blue |
| 488 | CH₃O—C₆H₄—SO₂OCH₂CH₂OSO₃—C₆H₄—OCH₃ | orange |
| 489 | (3,4-Cl₂-C₆H₃)—SO₂O(CH₂)₃OSO₂—(3,4-Cl₂-C₆H₃) | yellow |
| 490 | CH₃OCH₂SO₂O(CH₂)₄OSO₂CH₂OCH₃ | yellow |
| 491 | ClCH₂SO₂OCH₂CH₂OSO₂CH₂Cl | yellow |
| 492 | CH₃SO₂OCH₂CH₂OCH₂CH₂OSO₂CH₃ | blue |
| 493 | CH₃SO₂OCH₃—C₆H₄—CH₃OSO₃CH₃ | greenish-blue |
| 494 | CH₃SO₂OCH₂CH₃—C₆H₄—SCH₂CH₂OSO₂CH₃ | greenish-blue |
| 495 | CH₃SO₂OCH₃CH₂S—C₆H₄—SCH₂CH₂OSO₂CH₃ | red |
| 496 | CH₃SO₂OCH₂CH₂SO₂CH₃CH₂OSO₂CH₃ | orange |
| 497 | CH₂SO₂O(CH₂)₁₂OSO₂CH₃ | red |
| 498 | CH₂SO₂OCH₂C(CH₃)₂CH₂OSO₂CH₃ | blue |
| 499 | CH₃SO₂OCH₂CH₂O—C₆H₄—OCH₂CH₂OSO₂CH₃ | orange |
| 500 | CH₂SO₂O(CH₂)₆OSO₂CH₃ | red |
| 501 | CH₃SO₂OCH₂CH₂OSO₂CH₃ | blue |
| 502 | CH₃SO₂OCH₂CH₂OCH₂CH₂OSO₂CH₃ | blue |
| 503 | CH₃SO₂OCH₂CH₂SCH₂CH₂OSO₂CH₃ | |

TABLE 21-continued

Miscellaneous Polydyes

| 504 | [cyclohexane with CH₃SO₂OCH₂ and OCH₂OSO₂CH₃ substituents] | reddish-yellow |
|---|---|---|
| 505 | $CH_3SO_2OCH_2CH_2OSO_2CH_3$ | red |

TABLE 22

Polymeric Absorbers

| Example No. | Diacidic Compound Reacted | Disulfonate Compound Reacted |
|---|---|---|
| 506 | 2,5-thiophenedicarboxylic acid ($HO_2C$–thiophene–$CO_2H$) | $CH_2SO_2O(CH_2)_6OSO_2CH_3$ |
| 507 | $HO_3C$–C₆H₄–CH=CH–C₆H₄–$CO_2H$ | $CH_3SO_2OCH_2CH_3OSO_2CH_3$ |
| 508 | 5,6-dimethylbenzoxazole-2-CH=CH–C₆H₄–CONH–C₆H₃(CO₂H)₂ | $CH_3SO_2OCH_3$–C₆H₄–$CH_3OSO_3CH_3$ |
| 509 | 2,2',4-trihydroxybenzophenone | $CH_2SO_2O(CH_2)_4OSO_2CH_3$ |
| 510 | 2-(2-chlorophenyl)-4,6-bis(2,4-dihydroxyphenyl)-1,3,5-triazine | $CH_3SO_2O(CH_2)_3OSO_2CH_3$ |
| 511 | 5-[(3-ethoxycarbonyl-2-oxo-2H-chromen-7-yloxy)methyl]isophthalic acid | $CH_3SO_2O(CH_2)_6OSO_2CH_3$ |

TABLE 22-continued

Polymeric Absorbers

| Example No. | Diacidic Compound Reacted | Disulfonate Compound Reacted |
|---|---|---|
| 512 | HO₂C–C₆H₄–CH=CH–C₆H₄–(1,3,4-oxadiazole)–C₆H₄–CH=CH–C₆H₄–CO₂H | $CH_3SO_2OCH_2CH_2OSO_2CH_3$ |
| 513 | HO₂C–C₆H₄–CH=CH–C(O)–CH=CH–C₆H₄–CO₂H | $CH_3SO_2O(CH_2)_4OSO_2CH_3$ |
| 514 | HO₂C–(benzoxazole)–CH=CH–C₆H₄–CO₂H | $CH_3SO_2O(CH_2)_6OSO_2CH_3$ |
| 515 | 3,5-(HO₂C)₂–C₆H₃–O–C₆H₄–CH=C(CN)(CO₂CH₃) | $CH_3SO_2OCH_2CH(CH_3)CH_2OSO_2CH_3$ |
| 516 | HO₂C–(4H-3,1-benzoxazin-4-one)–C₆H₄–(4H-3,1-benzoxazin-4-one)–CO₂H | $CH_3SO_2O(CH_2CH_2O)_3SO_2CH_3$ |
| 517 | HO₂C–(phthalimide)–C₆H₄–SO₂–C₆H₄–(phthalimide)–CO₂H | $CH_3SO_2OCH_2CH_2OSO_2CH_3$ |

TABLE 22-continued
Polymeric Absorbers
| Example No. | Diacidic Compound Reacted | Disulfonate Compound Reacted |
|---|---|---|
| 518 | 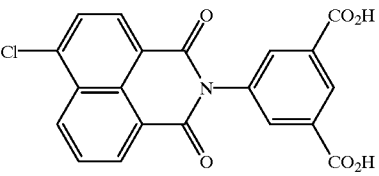 | $CH_3SO_2OCH_2CH_2SCH_2CH_2OSO_2CH_3$ |
| 519 | 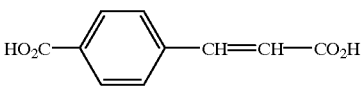 | $CH_3SO_2O(CH_2)_6OSO_2CH_3$ |
| 520 | 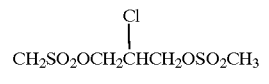 | 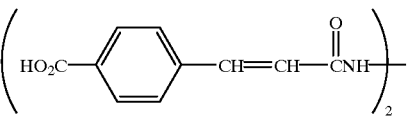 |
| 521 | 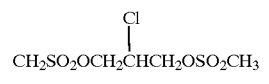 | 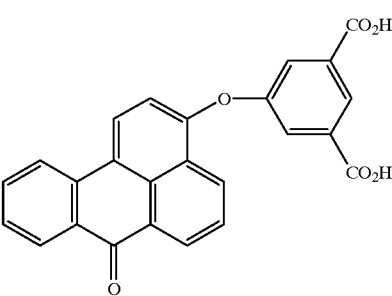 |
| 522 | 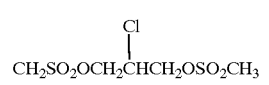 | 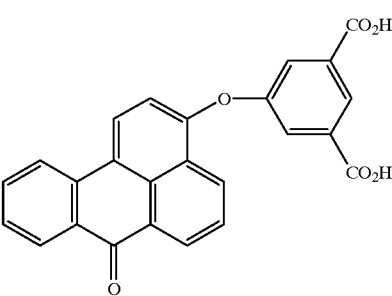 |

TABLE 23

Polymeric Infrared Light Absorbers

| Example No. | Diacidic Compound Reacted | Disulfonate Compound Reacted |
|---|---|---|
| 523 | [structure: bis-thiazine-fused anthraquinone with two CO$_2$H groups and two NH groups] | CH$_3$SO$_2$OCH$_2$CH$_3$OSO$_2$CH$_3$ |
| 524 | [structure: bis-thiazine-fused naphthoquinone with two CO$_2$H groups and two NH groups] | CH$_3$SO$_2$O(CH$_2$)$_3$OSO$_2$CH$_3$ |

TABLE 23-continued

Polymeric Infrared Light Absorbers

| Example No. | Diacidic Compound Reacted | Disulfonate Compound Reacted |
|---|---|---|
| 525 | ![structure with two phenothiazine units fused to anthracene diimide bearing 3,5-dicarboxyphenyl] | $CH_3SO_2O(CH_2)_4OSO_2CH_3$ |
| 526 | ![Ni dithiolene complex with four carboxyphenyl groups] | $CH_3SO_2O(CH_2)_6OSO_2CH_3$ |
| 527 | ![2,3-dicyano-5,8-bis(3-carboxyanilino)naphthoquinone] | $CH_3SO_2O(CH_2)_{12}OSO_2CH_3$ |

TABLE 23-continued

Polymeric Infrared Light Absorbers

| Example No. | Diacidic Compound Reacted | Disulfonate Compound Reacted |
|---|---|---|
| 528 | [anthraquinone structure with four NH-aryl substituents bearing OCH₃, CH₂O, and two 4-carboxyphenoxyphenyl groups] | $CH_3SO_2OCH_2CH_2OCH_2CH_2OSO_2CH_3$ |
| 529 | [bis(4-carboxybenzyl)amino-phenyl azo-thiazole-indanone dicyanomethylene structure with NHCOCH₂ and Cl substituents] | $CH_3SO_2OCH_2CH_2OSO_2CH_3$ |
| 530 | [squarylium dye structure with two benz[e]indolium groups bearing CO₂H substituents and N-CH₂ groups] | $CH_3SO_2OCH_2CH_2OSO_2CH_3$ |

TABLE 23-continued

Polymeric Infrared Light Absorbers

| Example No. | Diacidic Compound Reacted | Disulfonate Compound Reacted |
|---|---|---|
| 531 | [structure: anthraquinone-based compound with two SO groups, two NH groups, and two CO$_2$H-substituted phenyl groups] | CH$_3$SO$_2$OCH$_2$CH$_2$OSO$_2$CH$_3$ |
| 532 | [structure: thiophene-based azo compound with CN groups, NHCOCH$_3$, N(CH$_2$C$_6$H$_4$CO$_2$H)$_2$, and 2-CN-4-NO$_2$-phenyl substituents] | CH$_3$SO$_2$OCH$_2$CH$_2$OSO$_2$CH$_3$ |

TABLE 23-continued

Polymeric Infrared Light Absorbers

| Example No. | Diacidic Compound Reacted | Disulfonate Compound Reacted |
|---|---|---|
| 533 | ![anthraquinone derivative with two Cl, two NH-phenyl-O-phenyl-CO₂H groups, and two OH] | $CH_3SO_2OCH_2CH_2OSO_2CH_3$ |
| 534 | [PcAlOH]—SO₂NH₂<br>Pc = phthalocyanine | $CH_3SO_2OCH_2CH_2OSO_2CH_3$ |
| 535 | NcSi(OC₄H₉)₃₋₆ₐ(CO₂H)₂<br>Nc = naphthalocyanine | $CH_3SO_2OCH_2CH_2OSO_2CH_3$ |
| 536 | [PcAlOH]—(CO₂H)₂<br>Pc = phthalocyanine | $CH_3SO_2O(CH_2)_6OSO_2CH_3$ |

EXAMPLE 537

To dimethylformamide (DMF, 45.0 mL) was added 1,5-bis(2-carboxyphenyl-thio)anthraquinone (17.9 g, 0.035 mole). The mixture was stirred for about 10 minutes and then 1,8-diazabicyclo[5,4,0]undec-7-ene (DBU, 10.4 g, 0.068 mole) was added followed by 1,2-ethanediol, dimethanedisulfonate (7.64 g, 0.035 mole) and additional DMF (10.0 mL). The reaction mixture was stired at about 110° C. for 3.0 hours and allowed to cool to about 55° C. Methanol (35.0 g) was added dropwise with stirring followed by water (20 mL) and acetic acid (3.0 mL). The yellow solid was collected by filtration, washed with methanol (25 mL), warm water (50 mL) and then finally with methanol to facilitate drying. The yield of polymeric and cyclic yellow product was 18.2 g.

EXAMPLES 538–543

The procedure described in Example 537 was repeated exactly except that the reactant X—B—$X_1$ used in each example was as follows:
Example 538: 1,3-propanediol, dimethanedisulfonate
Example 539: 1,4-butanediol, dimethanedisulfonate
Example 540: diethylene glycol, dimethanedisulfonate
Example 541: 1,6-hexanediol, dimethanedisulfonate
Example 542: 1,4-cyclohexanedimethanol, dimethanedisulfonate
Example 543: 1,12-dodecanediol, dimethanedisulfonate The weight yields (Weight, g), percent yields (Yield), weight average molecular weights (Mw), number average molecular weights (Mn), and polydispersities (Mw/Mn, by GPC) for each of the light absorbing (yellow) compositions prepared in Examples 537–543 are presented in Table 24.

The percent yields were calculated by dividing the actual weight of the polymer

obtained in grams by the theoretical number of moles of repeating unit multiplied by the gram molecular weight of the repeating unit and then multiplying the number thus obtained by 100.

TABLE 24

| Example | Weight | Yield | Mw | Mn | Mw/Mn |
|---|---|---|---|---|---|
| 537 | 18.2 | 96.6 | 7,512 | 1,106 | 6.8 |
| 538 | 18.8 | 97.2 | 5,224 | 1,051 | 5.0 |
| 539 | 19.4 | 98.0 | 13,856 | 1,202 | 11.5 |
| 540 | 20.1 | 98.7 | 9,849 | 1,840 | 5.4 |
| 541 | 20.2 | 97.4 | 7,396 | 870 | 8.5 |
| 542 | 20.7 | 95.3 | 3,685 | 808 | 4.6 |
| 543 | 22.7 | 95.5 | 5,503 | 1,116 | 4.9 |

The approximate amount of cyclic compounds of formula I-A present in each of the light absorbing compositions produced in Examples 537–543 was determined by a combination of GPC, NMR and FDMS analyses. The weight percentages of the cyclic compounds having the structure

I-A

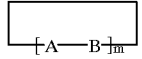

wherein m is 1, 2, 3, or 4 present in the compostiion of Examples 537–543 is set forth in Table 25. The remainder or balance of the light absorbing compositions was presumed to be a linear polymer.

TABLE 25

| Example | m = 1 | m = 2 | m = 3 | m = 4 |
|---|---|---|---|---|
| 537 | 0.1 | 3.4 | 1.5 | 0.7 |
| 538 | 0.8 | 3.3 | 1.3 | <0.1 |
| 539 | 6.9 | 4.1 | 1.3 | 0.2 |
| 540 | 9.5 | 3.1 | 0.8 | <0.1 |
| 541 | 26.7 | 4.0 | 1.1 | 0.2 |
| 542 | 20.4 | 4.0 | 0.7 | <0.1 |
| 543 | 20.1 | 2.2* | 0.5* | <0.1 |

*These peaks are unidentified but appear not to be oligomers.

We claim:

1. A method comprising reacting
   a) at least one diacidic monomer, comprising about 1 to 100 mole % of at least one light-absorbing monomer having a light absorption maximum between about 300 nm and about 1200 nm and 99–0 mole % of a non-light absorbing monomer which does not absorb significant light at wavelengths above 300 nm or has a light absorption maximum below 300 nm, with
   b) an organic compound having the formula

wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from the group consisting of —O—, —S—, —$SO_2$—, —NH—, —N($C_1$–$C_6$alkyl)-, —N(aryl)-, —N($SO_2C_1$–$C_6$ alkyl)-, —N($SO_2$aryl)-, —$SO_2$N($C_1$–$C_6$ alkyl)- and combinations thereof; X and $X_1$ are reactive groups and are independently selected from the group consisting of bromine, iodine and R—$SO_2$O; wherein R is selected from the group consisting of $C_1$–$C_6$ alkyl; $C_1$–$C_6$ alkyl substituted with chlorine, fluorine, $C_1$–$C_6$ alkoxy, aryl, aryloxy, arylthio or $C_3$–$C_8$ cycloalkyl; $C_3$–$C_8$ cycloalkyl or aryl, wherein said reaction is carried out in a solvent in the presence of a base to form a light absorbing polymeric composition having the formula

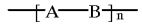

wherein B is as defined above, n is at least 2 and A comprises the residue of said diacidic monomer.

2. The process of claim 1 where said light-absorbing monomers have the formula

wherein H represents an acidic hydrogen atom; Y is a divalent light-absorbing moiety selected from the group consisting of chromophoric classes of azo, disazo, triazo, bis-azo, methine, arylidene, polymethine, azo-methine, azamethine, anthraquinone, anthrapyridone (3H-dibenz[f,ij]isoquinoline-2,7-dione, nitroarylamines anthrapyridine (7H-dibenz[f,ij]isoquinoline-7-one, phthaloylphenothiazine (14H-naphth[2,3-a]phenothiazine-8,13-dione, benzanthrone (7H(de)anthracene-7-one), anthrapyrimidine (7H-benzo[e]perimidine-7-one), anthrapyrazole, anthraisothiazole, triphenodioxazine, thiaxanthene-9-one, fluorindine (5,12-dihydroquinoxaline [2,3-b]phenazine, quinophthalone, phthalocyanine, metal phthalocyanine, naphthalocyanine, metal naphthalocyanine, nickel dithiolenes, squarylium compounds, croconium compounds, coumarin (2H-1-benzopyran-2-one), coumarin imine (2H-1-benzopyran-2-imine), perinone, benzodifuran, phthaloylacridone, phthaloylphenoxazine (14H-naphtho[2,3-a]phenoxazine-8,13-done, phthaloylacridone (13H-naphtho[2,3-c] acridine-5,8,14-trione), anthraquinonethioxanthane (8H-naphtho[2,3-c] thioxanthene-5,8,13-trione, anthrapyridazone, pyrrolo[3,4-c]pyrrole, indigo, thioindigo, quinoline, xanthene, acridine, azine, cyanine, oxazine, 1,4 and 1,5-naphthoquinones, 2,5-diarylaminoterephthalic acids and esters, pyromellitic acid dimide, naphthalene-1,4,5,8-tetracarboxylic acid diimide, 3,4,9,10-perylenetetracarboxylic acid diimide, 3-aryl-2,5-dioxypyrroline, 3-aryl-5-dicyanomethylene-2-oxopyrroline, arylisoindoline, hydroxybenzophenone, benoztriazole, naphthotriazole, diminoisoindoline, naphthopyran (3H-naphtho[2,1-6]pyran-3-one and 3-imine, phthalimides, 2-arylbenzazoles, carbostyryls, 1,2-diarylethenes, 2,5-diarylthiophenes, 2,5-diaryl-1,3,4-oxadiazoles, triazines, 2,5-diarylfurans, 2,5-diaryl-1,3,4-thiadiazoles, thiophenes, 1,3-diphenyl-2-pyrazolines, 2-arylbenzofurans, 2,6-diphenylbenzofurans, quinolines, quinoxalines, 3,4-diarylfuanones, distyrylarenes, benzanthrones, polyarenes and naphthalimides.

3. The method of claim 2 wherein the hydrogen atoms of said formula H—Y—H are independently bonded to an oxygen, sulfur, or nitrogen atom which is a part of the light absorbing moiety Y and which in combination provides two acidic functional groups.

4. The method of claim 3 wherein said acidic functional groups have pKa values of from about 1.5 to about 12.

5. The method of claim 3 wherein said acidic functional groups are independently selected from the group consising of —CO$_2$H, —SH, —OH attached to an aromatic ring, —CONHCO—, —SO$_2$—NH—CO—, —SO$_2$—NH—SO$_2$—, 1(H)-1,2,4-triazol-3-yl-, imidazolyl, benzimidazolyl, pyrazolyl, —SO$_2$H attached to aromatic ring, —NHSO$_2$R$_5$ and —SO$_2$NHR$_5$, wherein R$_5$ is selected from the group consisting of C$_1$–C$_6$ alkyl, C$_3$–C$_8$ cycloalkyl, aryl and C$_1$–C$_6$ alkyl substituted with at least one group selected from the group consisting of C$_1$–C$_6$ alkoxy, aryl, aryloxy, arylthio and C$_3$–C$_8$ cycloalkyl.

6. The method of claim 1 wherein said non light-absorbing monomers have the formula

wherein H represents an acidic hydrogen atom; Y$_1$ is a divalent moiety selected from the group consisting of —O$_2$C—R$_1$—CO$_2$— and —O—R$_2$—O— and —O$_2$C—R$_3$—O—, wherein R$_1$ is selected from the group consisting of C$_2$–C$_{12}$ alkylene, 1–4-cyclohexylene, arylene, arylene-O-arylene, arylene-SO$_2$—arylene, arylene-S-arylene, and C$_1$–C$_4$ alkylene-O—C$_1$–C$_4$ alkylene; wherein R$_2$ is selected from the group consisting of arylene, arylene-O-arylene, arylene-S-arylene, arylene-SO$_2$-arylene, phenylene-phenylene, and phenylene-C(R$_4$)$_2$-phenylene; wherein R$_4$ is selected from the group consisting of hydrogen and C$_1$–C$_4$ alkyl; wherein R$_3$ is selected from arylene.

7. The method of claim 1 wherein said polymeric composition is linear.

8. The method of claim 1 wherein said diacidic monomers have pK$_a$ values of about 12 or below.

9. The method of claim 2 wherein H—Y—H includes a moiety selected from the group consisting of carboxy groups attached to an aromatic ring carbon or aliphatic carbon, hydroxy groups attached to an unsubstituted or substituted phenyl or naphthyl radical, —CO—NHCO— groups attached to an aromatic ring to provide an imide and 1(H)-1,2,4-triazol-3-yl group having the formula

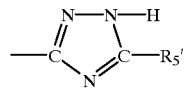

wherein R$_5$' is selected from the group consisting of hydrogen, C$_1$–C$_6$ alkyl and aryl.

10. The method of claim 1 where n is between about 2 and about 25.

11. The method of claim 1 wherein n is between about 3 and about 15.

12. The method of claim 1 wherein said base is selected from the group consisting of alkali metal carbonates, alkali metal bicarbonates and tertiary amines, aromatic nitrogen bases, bicyclic nitrogen containing bases having non-hindered electron pairs and mixtures thereof.

13. The method of claim 12 wherein said base is selected from the group consisting of triethylamine, tri-n-butylamine, N-methylpiperidine, N,N'-dimethylpiperazine, N-methylmorpholine and N,N,N',N'-tetramethylethylenediamine, pyridines, picolines, quinolines, isoquinolines, N-alkylpyrroles, N-alkylimidazoles, 1,8-diazabicyclo[5,4,0]undec-7-ene (DBU) 1,5-diazabicylco[4,3,0]non-5-ene (DBN) and 1,4-diazadicyclo[2,2,2]octane and mixtures thereof.

14. The method of claim 1 wherein said solvent is one or more aprotic polar solvents.

15. The method of claim 1 wherein said solvent is selected from the group consisting of N,N-dimethylacetamide, N,N-dimethylformamide, N-methyl-2-pyrrolidone, N-methyl-N-phenyl formamide, dimethylsulfoxide, aliphatic nitriles, sulfolane, hexamethyl phosphoramide, water, alcohols, ketones pyridine and ether-alcohols and mixtures thereof.

16. The method of claim 15 wherein said solvent is selected from the group consisting of N,N-dimethylacetamide, N,N-dimethylformamide, N-methyl-2-pyrrolidone, N-methyl-N-phenyl formamide, dimethylsulfoxide, aliphatic nitriles, sulfolane and hexamethyl phosphoramide and mixtures thereof.

17. The method of claim 1 wherein said reacting is conducted at a temperature between about 75° C. and about 125° C.

18. The method of claim 1 wherein said organic compound having the formula

is selected from the group consisting of disulfonate compounds where X and X$_1$ are both a sulfonate ester of the formula —OSO$_2$R, wherein R is selected from C$_1$–C$_4$ alkyl, phenyl or p-methylphenyl and wherein B is selected from C$_2$–C$_6$ alkylene, —CH$_2$-1,4-cyclohexylene-CH$_2$—, —CH$_2$CH$_2$(O —CH$_2$CH$_2$)$_{1-4}$ and —CH$_2$CH$_2$O-1,4-phenylene-O—CH$_2$CH$_2$—.

19. The method of claim 18 wherein said B moiety of the organic compound having the formula X—B—X$_1$ is selected from the group consisting of —CH$_2$CH$_2$—, —CH$_2$CH(CH$_3$)CH$_2$—, —CH$_2$C(CH$_3$)$_2$CH$_2$—, —(CH$_2$)$_4$—, —(CH$_2$)$_6$—, —CH$_2$CH$_2$OCH$_2$CH$_2$— and —CH$_2$-1,4-cyclohexylene-CH$_2$—.

20. The method of claim 1 wherein said organic compound having the formula X—B—X$_1$ is selected from the group consisting of 1,2-ethandiol, dimethanesulfonate; 1,2-ethanediol bis(4-methylbenzenesulfonate); 1,4 butanediol, dimethane sulfonate; 1,6-hexanediol, dimethanesulfonate; 1,3-propanediol, 2,2-dimethyl-, dimethanesulfonate; 1,4-cyclohexanedimethanol, dimethanesulfonate; 1,1,3,3-tetramethylcyclobutanediol, dimethanesulfonate, and ethanol 2,2'-oxybis-dimethanesulfonate.

21. The method of claim 1 wherein A of said light absorbing polymeric composition comprises 100 mole % of said light-absorbing monomer.

22. The method of claim 1 wherein said diacidic light absorbing monomer has a light absorption maximum between about 300 nm and about 1200 nm and is present in said light absorbing polymeric composition in an amount at least about 50% by weight %.

23. A colored light absorbing composition having the formula

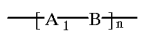

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2$ $C_1$–$C_6$ alkyl)-, —N(SO$_2$aryl)-, —SO$_2$N($C_1$–$C_6$ alkyl)- and combinations thereof; wherein n is at least 2 and wherein at least one of said diacidic monomer comprises at least about 50% by weight of the total composition.

24. A composition comprising a thermoplastic polymer blended with at least one colored light absorbing linear polymeric composition of claim 23.

25. The composition of claim 24 wherein said thermoplastic polymer is selected from the group consisting of polyesters, polyolefins, polyamides, polyimides, polyvinyl chloride, polyurethanes, polycarbonates, cellulose esters, polyacrylates, polyvinylesters, polyester-amides, polystyrene, polyacrylonitrile-butadiene-styrene, polystyrene-acrylonitrile and mixtures and blends thereof.

26. A light absorbing composition having the formula

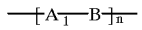

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2$$C_1$–$C_6$ alkyl)-, —N(SO$_2$aryl)-, —SO$_2$N($C_1$–$C_6$ alkyl)- and combinations thereof; wherein n is at least 2 and wherein at least one of said diacidic monomer comprises at least about 50% by weight of the total composition, wherein $A_1$ comprises the residue of at least one diacidic monomer having the structure

wherein H represents an acidic hydrogen atom and Y is a divalent light-absorbing moiety selected from the chromophoric classes consisting of azo, disazo, triazo, bis-azo, methine, arylidene, polymethine, azo-methine, azamethine, anthraquinone, anthrapyridone (3H-dibenz[f,ij]isoquinoline-2,7-dione, nitroarylamines anthrapyridine (7H-dibenz[f,ij]isoquinoline-7-one, phthaloylphenothiazine (14H-naphth[2,3-a]phenothiazine-8,13-dione, benzanthrone (7H(de)anthracene-7-one), anthrapyrimidine (7H-benzo[e]perimidine-7-one), anthrapyrazole, anthraisothiazole, triphenodioxazine, thiaxanthene-9-one, fluorindine (5,12-dihydroquinoxaline [2,3-b]phenazine, quinophthalone, phthalocyanine, metal phthalocyanine, naphthalocyanine, metal naphthalocyanine, nickel dithiolenes, squarylium compounds, croconium compounds, coumarin (2H-1-benzopyran-2-one), coumarin imine (2H-1-benzopyran-2-imine), perinone, benzodifuran, phthaloylacridone, phthaloylphenoxazine (14H-naphtho[2,3-a]phenoxazine-8,13-done, phthaloylacridone (13H-naphtho[2,3-c] acridine-5,8,14-trione), anthraquinonethioxanthane (8H-naphtho[2,3-c] thioxanthene-5,8,13-trione, anthrapyridazone, pyrrolo[3,4-c]pyrrole, indigo, thioindigo, quinoline, xanthene, acridine, azine, cyanines, oxazine, 1,4 and 1,5-naphthoquinones, 2,5-diarylaminoterephthalic acids and esters, pyromellitic acid dimide, naphthalene-1,4,5,8-tetracarboxylic acid diimide, 3,4,9,10-perylenetetracarboxylic acid diimide, 3-aryl-2,5-dioxypyrroline, 3-aryl-5-dicyanomethylene-2-oxopyrroline, arylisoindoline, hydroxybenzophenone, benoztriazole, naphthotriazole, diminoisoindoline, naphthopyran (3H-naphtho[2,1–6]pyran-3-one and 3-imine, phthalimides, 2-arylbenzazoles, carbostyryls, 1,2-diarylethenes, 2,5-diarylthiophenes, 2,5-diaryl-1,3,4-oxadiazoles, triazines, 2,5-diarylfurans, 2,5-diaryl-1,3,4-thiadiazoles, thiophenes, 1,3-diphenyl-2-pyrazolines, 2-arylbenzofurans, 2,6-diphenylbenzofurans, quinolines, quinoxalines, 3,4-diarylfuanones, distyrylarenes, benzanthrones, polyarenes and naphthalimides.

27. The composition of claim 25 wherein $A_1$ comprises the residue of at least one diacidic monomer having at least one acidic group other than carboxy and having a light absorption maximum between about 325 nm and about 1100 nm and wherein B is a divalent organic radical selected from $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2$ $C_1$–$C_6$ alkyl)-, —(SO$_2$aryl)-, —SO$_2$N($C_1$–$C_6$ alkyl)- and combinations thereof; wherein n is at least 2.

28. The process of claim 2 wherein said light absorbing monomer comprises two carboxy groups as acidic functional groups.

29. The process of claim 2 wherein said light absorbing monomer comprises two 1(H)-1,2,4-triazol-3-ylthio groups as acidic functional groups.

30. The process of claim 2 wherein said light absorbing monomer comprises one carboxy and one 1(H)-1,2,4-triazol-3-ylthio group as acidic functional groups.

31. The process of claim 2 wherein said light absorbing monomer comprises two hydroxy groups attached to aromatic ring(s).

32. The process of claim 2 wherein said light absorbing monomer comprises one imide group and one carboxy group.

33. The process of claim 2 wherein said light absorbing monomer comprises one imide group and one 1(H)-1,2,4-triazol-3-ylthio group.

34. The composition of claim 23 wherein said light absorbing monomer comprises two carboxy groups as acidic functional groups.

35. A light absorbing composition having the formula

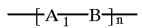

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2C_1$–$C_6$ alkyl)-, —N(SO$_2$aryl)-, —SO$_2$N($C_1$–$C_6$ alkyl)- and combinations thereof; wherein n is at least 2 and wherein at least one of said diacidic monomer comprises at least about 50% by weight of the total composition, wherein said light absorbing monomer comprises two 1(H)-1,2,4-triazol-3-ylthio groups as acidic functional groups.

36. A light absorbing composition having the formula

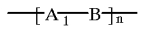

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arlene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2C_1$–$C_6$ alkyl)-, —N(SO$_2$aryl)-, SO$_2$N ($C_1$–$C_6$ alkyl)- and combinations thereof; wherein n is at least 2 and wherein at least one said diacidic monomer comprises at least about 50% by weight of the total compostion, wherein said light absorbing monomer comprises one carboxy and one 1(H)-1,2,4-triazol-3-ylthio group as acidic functional groups.

37. The composition of claim 23 wherein said light absorbing monomer comprises two hydroxy groups attached to aromatic ring(s).

38. A light absorbing composition having the formula

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2C_1$–$C_6$ alkyl)-, —N(SO$_2$aryl)-, —SO$_2$N($C_1$–$C_6$ alkyl)- and combinations thereof; wherein n is at least 2 and wherein at least one of said diacidic monomer comprises at least about 50% by weight of the total composition, wherein said light absorbing monomer comprises one imide group and one carboxy group.

39. A light absorbing composition having the formula

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ alkyl)-, —N(aryl)-, —N(SO$_2C_1$–$C_6$ alkyl)-, —N(SO$_2$aryl)-, —SO$_2$N($C_1$–$C_6$ alkyl)- and combinations thereof; wherein n is at least 2 and wherein at least one of said diacidic monomer comprises at least about 50% by weight of the total composition, wherein said light absorbing monomer comprises one imide group and one 1(H)-1,2,4-triazol-3-ylthio group.

40. A light absorbing composition having the formula

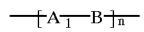

wherein $A_1$ comprises the residue of at least one diacidic monomer having a light absorption maximum between about 325 nm and about 1100 nm, and wherein B is a divalent organic radical selected from the group consisting of $C_2$–$C_{12}$ alkylene, $C_3$–$C_8$ cycloalkylene, $C_1$–$C_4$ alkylene-$C_3$–$C_8$-cycloalkylene-$C_1$–$C_4$ alkylene, $C_1$–$C_4$ alkylene-arylene-$C_1$–$C_4$ alkylene, and $C_2$–$C_4$-alkylene-L-arylene-L—$C_2$–$C_4$ alkylene and $C_2$–$C_4$ alkylene-(L—$C_2$–$C_4$ alkylene)$_{1-4}$, wherein L is a linking group selected from —O—, —S—, —SO$_2$—, —NH—, —N($C_1$–$C_6$ aryl)-, —N(aryl)-, —N(SO$_2C_1$–$C_6$ aryl)-, —N(SO$_2$aryl)-, —SO$_2$N ($C_1$–$C_6$ aryl)- and combinations thereof; wherein n is at least 2 and wherein at least one of said diacidic monomer comprises at least about 50% by weight of the total composition, wherein said light absorbing monomer comprises a diacidic sulfamoyl (—SO$_2$NH$_2$) group.

41. The composition of claim 23 wherein said light absorbing monomer comprises two acidic groups independently selected from the group consisting of —CO$_2$H, SH, hydroxy attached to an aromatic ring, —CONHCO— (imide), —SO$_2$NHCO—, —SO$_2$NHSO$_2$—, 1(H)-1,2,4-triazolyl-3-yl-, imidazolyl, benzimidazolyl, pyrazolyl, —SO$_2$H attached to an aromatic ring, —NHSO$_2$R$_5$ and —SO$_2$NHR$_5$, wherein R$_5$ is selected from the group consisting of $C_1$–$C_6$ alkyl; $C_1$–$C_6$ alkyl substituted with at least one group selected from $C_1$–$C_6$ alkoxy, aryl, aryloxy, arylthio and $C_3$–$C_8$ cycloalkyl; $C_3$–$C_8$ cycloalkyl; aryl.

42. The composition of claim 26 wherein the light absorbing portion of $A_1$ comprises the residue of at least one diacidic light absorbing monomer selected from the group consisting of the anthraquinone and anthrapyridone colorants having the structures:

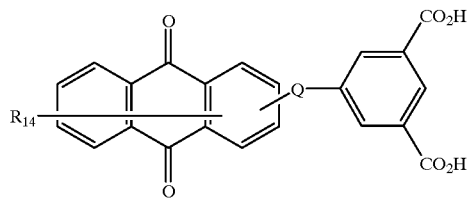
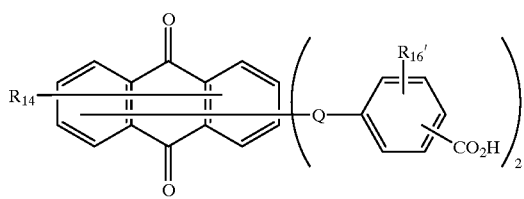
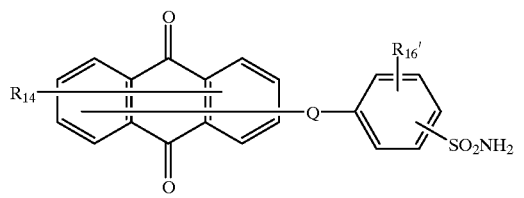
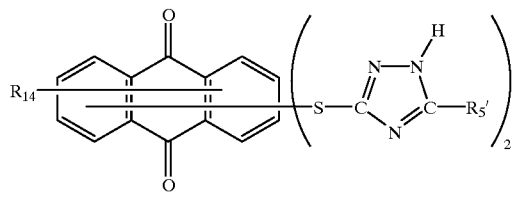
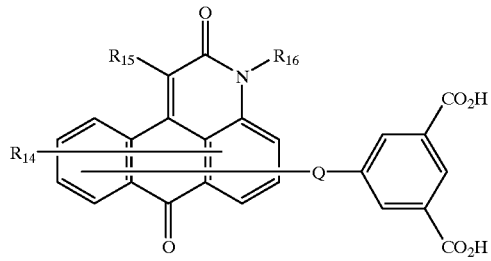
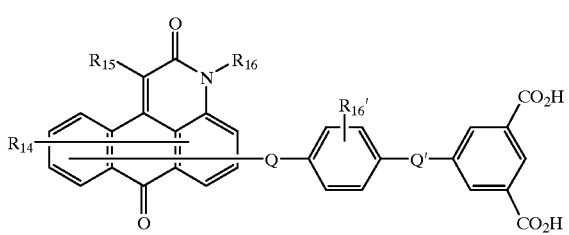
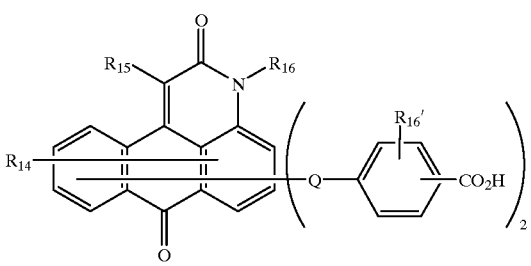

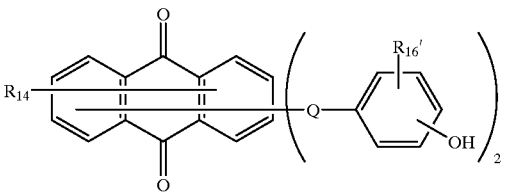
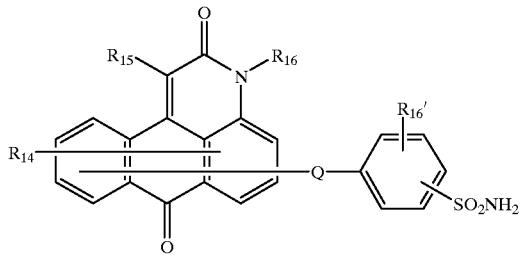
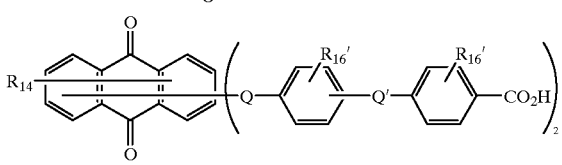
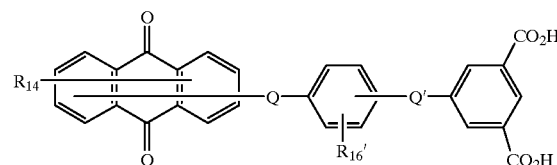
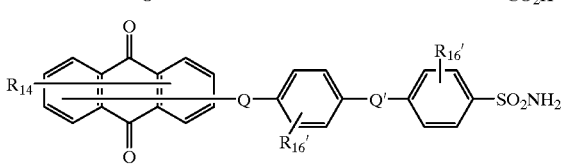
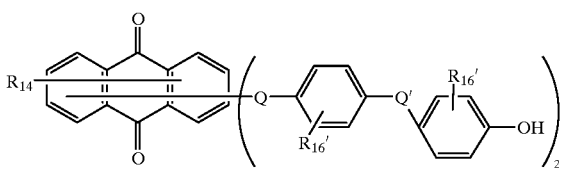
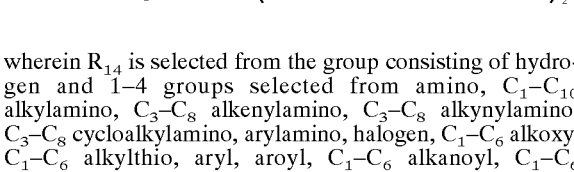
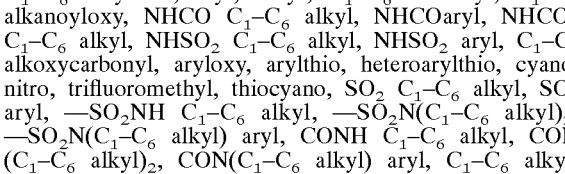

wherein $R_{14}$ is selected from the group consisting of hydrogen and 1–4 groups selected from amino, $C_1$–$C_{10}$ alkylamino, $C_3$–$C_8$ alkenylamino, $C_3$–$C_8$ alkynylamino, $C_3$–$C_8$ cycloalkylamino, arylamino, halogen, $C_1$–$C_6$ alkoxy, $C_1$–$C_6$ alkylthio, aryl, aroyl, $C_1$–$C_6$ alkanoyl, $C_1$–$C_6$ alkanoyloxy, NHCO $C_1$–$C_6$ alkyl, NHCOaryl, NHCO$_2$ $C_1$–$C_6$ alkyl, NHSO$_2$ $C_1$–$C_6$ alkyl, NHSO$_2$ aryl, $C_1$–$C_6$ alkoxycarbonyl, aryloxy, arylthio, heteroarylthio, cyano, nitro, trifluoromethyl, thiocyano, SO$_2$ $C_1$–$C_6$ alkyl, SO$_2$ aryl, —SO$_2$NH $C_1$–$C_6$ alkyl, —SO$_2$N($C_1$–$C_6$ alkyl)$_2$, —SO$_2$N($C_1$–$C_6$ alkyl) aryl, CONH $C_1$–$C_6$ alkyl, CON($C_1$–$C_6$ alkyl)$_2$, CON($C_1$–$C_6$ alkyl) aryl, $C_1$–$C_6$ alkyl, furfurylamino, tetrahydrofurfurylamino, 4-(hydroxymethyl)cyclohexanemethylamino,

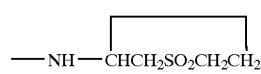

or hydroxy; Q and Q' are independently selected from the group consisting of —O—, —N(COR$_{10}$)—, —N(SO$_2$R$_{10}$)—, —N(R$_{10}$)—, —S—, —SO$_2$—, —CO$_2$—, —CON(R$_{10}$)—, SO$_2$N (R$_{10}$)—, wherein R$_{10}$ is selected from the group consisting of hydrogen, aryl, C$_3$–C$_8$ cycloalkyl, or C$_1$–C$_{10}$ alkyl; R$_{15}$ is selected from the group consisting of hydrogen, cyano, C$_1$–C$_6$ alkylamino, C$_1$–C$_6$ alkoxy, halogen, arylthio, aryl, heteroaryl, heteroarylthio, C$_1$–C$_6$ alkoxycarbonyl, aroyl or arylsulfonyl; R$_{16}$ is selected from the group consisting of hydrogen, C$_1$–C$_6$ alkyl, C$_3$–C$_8$ cycloalkyl and aryl; R$_{16}$' is selected from the group consisting of hydrogen, C$_1$–C$_6$ alkyl, halogen and C$_1$–C$_6$ alkoxy; wherein each C$_1$–C$_6$ alkyl group and C$_1$–C$_6$ alkyl group which is a portion of another group may contain at least one substituent selected from the group consisting of hydroxy, cyano, chlorine, fluorine, C$_1$–C$_6$ alkoxy, C$_3$–C$_8$ cycloalkoxy, C$_1$–C$_6$ alkylcyclohexyl, hydroxmethyl cyclohexyl, aryl and heteroaryl; with the provision that two acidic groups containing one acidic proton each or one acidic group containing two acidic hydrogens be present in the diacidic compounds.

43. The composition of claim 26 wherein the light absorbing portion of A$_1$ comprises the residue of at least one light absorbing monomer selected from the group consisting of azo, disazo, bis-azo and azomethine and having respectively the structures:

R$_6$—N=N—Z, R$_6$—N=N—R$_7$—N=N—Z, R$_6$—N=N—Y$_1$—N=N—R$_6$ and

D=HC—N=N—Z wherein R$_6$ is the residue of an aromatic or heteroaromatic amine which has been dizaotized and coupled with a coupling component H—Z and is derived from an amine selected from the group consisting of aromatic and heteroaromatic amine classes selected from the group consisting of aniline, 1-aminonaphthalene, 1-aminoanthraquinone, 4-aminoazobenzene, 2-aminothiazole, 2-aminobenzothiazole, 3-amino-2,1-benzisothiazole, 2-aminothieno[2,3-d]thiazole, 5-aminoisothiazole, 5-aminopyrazole, 4-aminopyrazoloisothiazole, 2-amino-1,3,4-thiadiazole, 5-amino-1,2,4-thiadiazole, 5-amino-1,2,3-triazole, 2-amino-1,3,4-triazole, 2(5) aminoimidazole, 3-aminopyridine, 2(3) aminothiophene, 2(3) aminobenzo[b]thiophene, 2-aminothieno[3,2-b]thiophene, 3-aminothieno[2,3-c]isothiazole, 3-amino-7-benz-2,1-isothiazole, 3-aminobenzothienoisothiazole, 3-aminoisothiazole[3,4-d]pyrimidine, 5-amino-1,2,3-triazole, 3(4) aminophthalimide and 5(6) amino-1,2-benzisothiazolon-1,1-dioxide with said aromatic and heteroaromatic ring systems being unsubstituted or substituted with one or more groups selected from C$_1$–C$_{10}$ alkyl, C$_1$–C$_6$ alkoxy, C$_3$–C$_8$ cycloalkyl, carboxy, halogen, C$_1$–C$_6$ alkoxycarbonyl, formyl, C$_1$–C$_6$ alkanoyl, C$_1$–C$_6$ alkanoyloxy, dicyanovinyl, C$_3$–C$_8$-cycloalkanoyl, thiocyano, trifluroacetyl, cyano, carbamoyl, —CONH— C$_1$–C$_6$ alkyl, CONHaryl, CON(C$_1$–C$_6$ alkyl)$_2$, sulfamoyl, SO$_2$NH C$_1$–C$_6$ alkyl, SO$_2$N(C$_1$–C$_6$ alkyl)$_2$, SO$_2$NHaryl, SO$_2$NH C$_3$–C$_8$ cycloalkyl, CONH C$_3$–C$_8$ cycloalkyl, aryl, aroyl, —NHSO$_2$ C$_1$–C$_6$ alkyl, —N(C$_1$–C$_6$ alkyl)SO$_2$ C$_1$–C$_6$ alkyl, —NHSO$_2$ aryl, NHCO C$_1$–C$_6$ alkyl, NHCO C$_3$–C$_8$ cycloalkyl, NHCOaryl, NHCO$_2$ C$_1$–C$_6$ alkyl, NHCONH C$_1$–C$_6$ alkyl, NHCONHaryl, N(C$_1$–C$_6$ alkyl)aryl, arylazo, heteroaryl, aryloxy, arylthio, C$_3$–C$_8$ cycloalkoxy, heteroarylazo, heteroarylthio, arylsulfonyl, tricyanovinyl, aryloxysulfonyl, C$_1$–C$_6$ alkylsulfonyl, trifluoromethyl, fluorosulfonyl, trifluoromethylsulfonyl, thiocyano, hydroxy, nitro or CH=D, wherein D is the residue of an active methylene compound selected from the group consisting of malononitrile, α-cyanoacetic acid esters, malonic acid esters, α-cyanacetic acid amides, α-C$_1$–C$_6$ alkylsulfonylacetonitriles, α-arylsulfonylacetonitriles, α-C$_1$–C$_6$ alkanoylacetonitriles, α-aroylacetonitriles, α-heteroarylacetonitriles, bis(heteroaryl)methanes, 1,3-indanediones, 2-furanones, benzo-2-furanones, naphtho-2-furanones, 2-indolones, 3-cyano-1,6-dihydro-4-methyl-2,6-dioxy (2H)-pyridines, benzo (b) thieno-3-ylidene propane dinitrile-5,5-dioxides, 1,3-bis(dicyanomethylene) indanes, barbituric acid, 5-pyrazolones, dimedone, 3-oxo-2,3-dihydro-1-benzothiophene-1,1-dioxides or aryl-C(CH$_3$) C=C(CN)$_2$; wherein R$_7$ is a divalent aromatic or heteroaromatic radical selected from the group consisting of 1,4-phenylene, naphthalene-1,4-diyl, thiazol-2,5-diyl and thiophene-2,5-diyl:

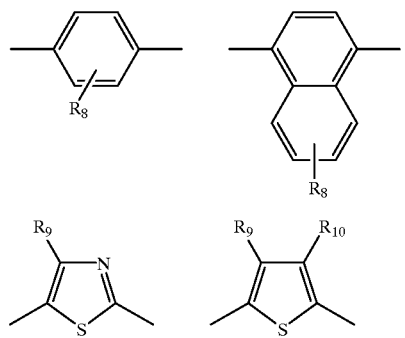

wherein R$_8$ is selected from the group consisting of hydrogen or 1–2 groups selected from C$_1$–C$_6$ alkyl, C$_1$–C$_6$ alkoxy, cyano, halogen, —NHCO C$_1$–C$_6$ alkyl, —NHCO$_2$ C$_1$–C$_6$ alkyl, —NHCO aryl, —NHCONH aryl or NHCONH C$_1$–C$_6$ alkyl; R$_9$ is selected from the group consisting of hydrogen, C$_1$–C$_6$ alkyl, halogen, aryl, heteroaryl; R$_{10}$ is selected from the group consisting of hydrogen, C$_1$–C$_6$ alkoxycarbonyl, cyano, carbamoyl, aryl, arylsulfonyl, aroyl, —CONH C$_1$–C$_6$ alkyl, or C$_1$–C$_6$ alkylsulfonyl; wherein Z is the residue of a coupling compound selected from the group consisting of electron rich compound classes of anilines, 1-aminonaphthalenes, 1,2-dihydroquinolines, 1,2,3,4-tetrahydroquinolines, benzomorpholines (3,4-dihydro-2H-1, 4-benzoxazine), pyrazolones, pyrazoles, 3-cyano-6-hydroxy-2-pyridones, 2,3-dihydroindoles, indoles, 4-hydroxycoumarins, 4-hydroxy-2-quinolones, imidazo[2, 1-b]thiazoles, julolidines (2,3,6,7-tetrahydro-1H, 5H-benzo [ij]quinolizines), 1-oxajulolidines, 1,2,5,6-tetrahydro-4H-pyrrolo[3,2,1-ij]quinolines, 2,6-diamino-3 cyanopyridines, 2-aminothiazoles, 2-aminothiophenes, 5,5-dimethyl-1,3-cyclohexanedione (dimedone), phenols, naphthols, 2,4-pentanediones or acetoacetarylides; wherein Y$_1$ is the residue of a bis coupling component selected from the group consisting of anilines, 1,2-dihydroquinolines, 1,2,3,4-tetrahydroquinolines, benzomorpholines (3,4-dihydro-2H-1, 4-benzoxazines), 3-cyano-6-hydroxy-2-pyridones, 2,6-diaminopyridines, 2,3-dihydroindoles, naphthylamines, 2-aminothiazoles, or a combination of these; with the provision that two acidic functional groups containing one acidic hydrogen each or a functional group containing two acidic hydrogen are present in the diacidic light absorbing monomer.

44. The composition of claim 43 wherein Z is selected from the group consisting of:

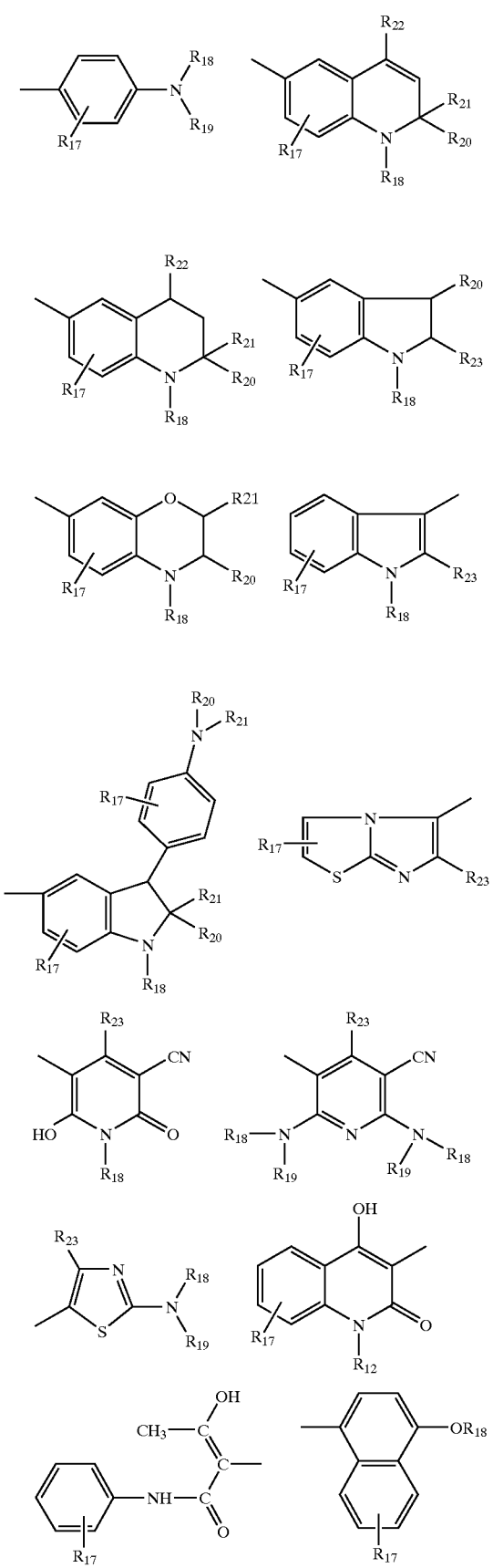

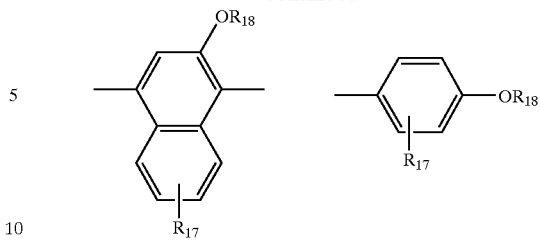

wherein $R_{17}$ is selected from the group consisting of hydrogen, 1–2 groups selected from $C_1$–$C_6$ alkyl, $C_1$–$C_6$ alkoxy, $C_1$–$C_6$ alkylthio, —O $C_2$–$C_6$ alkylene-OH, O $C_2$–$C_6$ alkylene-$C_1$–$C_6$ alkanoyloxy, $C_1$–$C_6$ alkylene-OH, $C_1$–$C_6$ alkylene-$C_1$–$C_6$ alkanoyloxy, halogen, carboxy, $C_1$–$C_6$ alkoxycarbonyl, trifluoromethyl, $NHCOR_{24}$, $NHCO_2R_{24}$, $NHCON(R_{24})R_{25}$, and $NHSO_2R_{25}$, wherein $R_{24}$ is selected from the group consisting of hydrogen, $C_1$–$C_{10}$ alkyl, $C_3$–$C_8$ cycloalkyl or aryl, $R_{25}$ is selected from the group consisting of $C_1$–$C_{10}$ alkyl, $C_3$–$C_8$ cycloalkyl or aryl wherein each $C_1$–$C_{10}$ alkyl group in $R_{24}$ and $R_{25}$ may be further substituted with one or more groups selected from the group consisting of $C_3$–$C_8$ cycloalkyl, aryl, aryloxy, arylthio, $CO_2H$, $CO_2$ $C_1$–$C_6$ alkyl, cyano, hydroxy, succinimido, $C_1$–$C_6$ alkoxy,

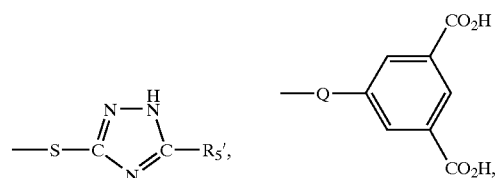

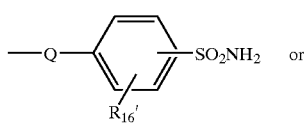

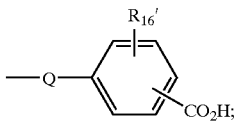

wherein $R_5'$ is selected from the group consisting of hydrogen, $C_1$–$C_6$ alkyl or aryl; $R_{16}'$ is selected from hydrogen or one or two groups selected from $C_1$–$C_6$ alkyl, halogen and $C_1$–$C_6$ alkoxy; Q is selected from the group consisting of —O—, —N(COR$_{10}$)—, —N(R$_{10}$)—, —S—, —SO$_2$—, —CO$_2$—, —CON(R$_{10}$), —SO$_2$(R$_{10}$)—, wherein $R_{10}$ is selected from the group consisting of hydrogen, aryl, $C_3$–$C_8$ cycloalkyl or $C_1$–$C_{10}$alkyl; $R_{18}$ and $R_{19}$ are independently selected from the group consisting of hydrogen, unsubstituted $C_1$–$C_{10}$ alkyl, substituted $C_1$–$C_{10}$ alkyl, $C_3$–$C_8$ cycloalkyl, $C_3$–$C_8$ alkenyl, $C_3$–$C_8$ alkynyl and aryl or $R_{18}$ and $R_{19}$ may be combined with another element to which they are attached to form a radical Z having the formula

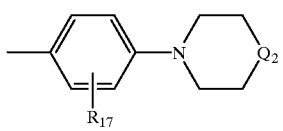

wherein $Q_2$ is selected from the group consisting of a covalent bond, —O—, —S—, —SO$_2$—, —CO—, —CO$_2$—, —N—(C$_1$–C$_6$ aryl)-, —N(COC$_1$–C$_6$ aryl)-, —N(SO$_2$C$_1$–C$_6$ aryl)-, —N(CO aryl)-, or —N(SO$_2$ aryl); $R_{20}$, $R_{21}$ and $R_{22}$ are independently selected from the group consisting of hydrogen or C$_1$–C$_6$ alkyl; $R_{23}$ is selected from the group consisting of hydrogen, C$_1$–C$_6$ alkyl, C$_3$–C$_8$ cycloalkyl, heteroaryl or aryl.

45. The composition of claim 26 wherein the light absorbing portion of A$_1$ comprises the residue of at least one light absorbing monomer selected from the group consisting of methine, arylidene, polmethine, azamethine, 3-aryl-2,5-dioxypyrroline, 3-aryl-5-dicyanomethylene-2-oxypyrroline and arylisoindoline and having respectively the structures:

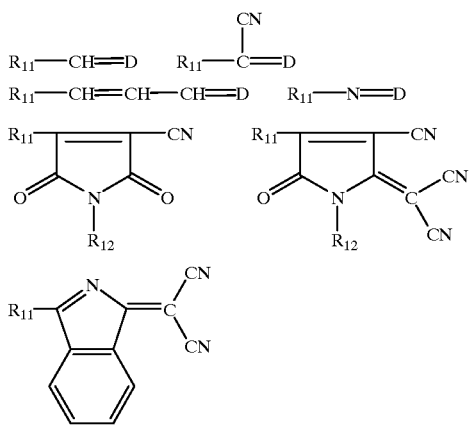

wherein $R_{11}$ is the residue of an electron rich aromatic compound selected from the group consisting of an aniline, 1-naphthylamine, 1,2-dihydroquinoline, 1,2,3,4-tetrahydroquinoline, 1,3,3-trimethyl-2-methyleneindole, 1,3-dihydro-2-methylene-1,1,3-trimethyl-2H-benz[e]indole, imidazo [2,1-b] thiazole, benzomorpholine (3,4-dihydro-2H-1,4, benzoxazine), 2,3-dihydroindole, indole, 2-aminothiazole, julolidine (2,3,6,7-tetrahydro-1H, 5H-benz[ij] quinolizine, 1-oxajulolidine, 4H-pyrrolo [3,2,1-ij]-quinoline, phenol, naphthol, thiophenol, pyrrole, pyrazole, furan, thiophene, carbazole, phenothiazine or phenoxazine compound; $R_{12}$ is selected from the group consisting of hydrogen, C$_1$–C$_{10}$ alkyl, C$_3$–C$_8$ alkenyl, C$_3$–C$_8$-alkynyl, C$_3$–C$_8$ cycloalkyl, aryl, (—CH$_2$CH$_2$O—)$_{1-3}$ R$_{13}$ and C$_1$–C$_4$ alkylene-C$_3$–C$_8$ cycloalkylene, wherein the C$_1$–C$_6$ alkyl groups may be substituted by at least one group selected from the group consisting of carboxy, C$_1$–C$_6$ carbalkoxy, C$_1$–C$_6$ alkanoyloxy, cyano, hydroxy, chlorine, fluorine, C$_1$–C$_6$ alkoxy, C$_3$–C$_8$ cycloalkyl or aryl; $R_{13}$ is selected from the group consisting of hydrogen, C$_1$–C$_6$ alkoxy or C$_1$–C$_6$ alkanoyloxy; wherein D is the residue of an active methylene compound selected from the group consisting of malononitrile, α-cyanoacetic acid esters, malonic acid esters, α-cyanacetic acid amides, α-C$_1$–C$_6$ alkylsulfonylacetonitriles, α-arylsulfonylacetonitriles, α-C$_1$–C$_6$ alkanoylacetonitriles, α-aroylacetonitriles, α-heteroarylacetonitriles, bis(heteroaryl)methanes, 1,3-indanediones, 2-furanones, benzo-2-furanones, naphtho-2-furanones, 2-indolones, 3-cyano-1,6-dihydro-4-methyl-2,6-dioxy (2H)-pyridines, benzo (b) thieno-3-ylidene propane dinitrile-5,5-dioxides, 1,3-bis(dicyanomethylene) indanes, barbituric acid, 5-pyrazolones, dimedone, 3-oxo-2,3-dihydro-1-benzothiophene-1,1-dioxides or aryl-C(CH$_3$)C=C(CN)$_2$, with the proviso that two acidic functional groups containing one acidic hydrogen each, or a functional group containing two acidic hydrogens are present.

46. The composition of claim 45 wherein $R_{11}$ is selected from the group consisting of the electron rich aromatic residues corresponding to the structures:

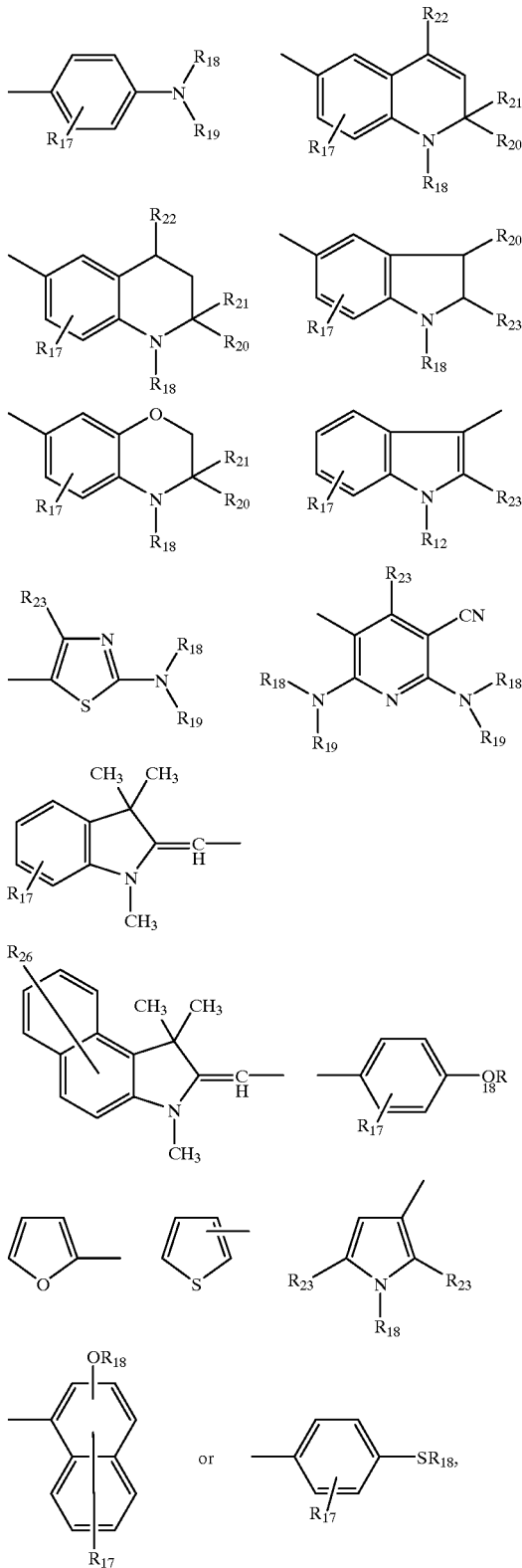

wherein $R_{26}$ is selected from the group consisting of hydrogen or a group selected from the group consisting of C$_1$–C$_6$ alkoxycarbonyl, $CO_2H$, $C_1$–$C_6$ alkyl or $C_1$–$C_6$ alkoxy; wherein $R_{17}$ is selected from the group consisting of hydrogen, and 1–2 groups selected from $C_1$–$C_6$ alkyl, $C_1$–$C_6$ alkoxy, $C_1$–$C_6$ alkylthio, —O $C_2$–$C_6$ alkylene-OH, O $C_2$–$C_6$ alkylene-$C_1$–$C_6$ alkanoyloxy, $C_1$–$C_6$ alkylene-OH, $C_1$–$C_6$ alkylene-$C_1$–$C_6$ alkanoyloxy, halogen, carboxy, $C_1$–$C_6$ alkoxycarbonyl, trifluoromethyl, $NHCOR_{24}$, $NHCO_2R_{24}$, $NHCON(R_{24})R_{25}$, and $NHSO_2R_{25}$, wherein $R_{24}$ is selected from the group consisting of hydrogen, $C_1$–$C_{10}$ alkyl, $C_3$–$C_8$ cycloalkyl or aryl, $R_{25}$ is selected from the group consisting of $C_1$–$C_{10}$ alkyl, $C_3$–$C_8$ cycloalkyl or aryl wherein each $C_1$–$C_{10}$ alkyl group in $R_{24}$ and $R_{25}$ may be further substituted with one or more groups selected from the group consisting of $C_3$–$C_8$ cycloalkyl, aryl, aryloxy, arylthio, $CO_2H$, $CO_2$ $C_1$–$C_6$ alkyl,

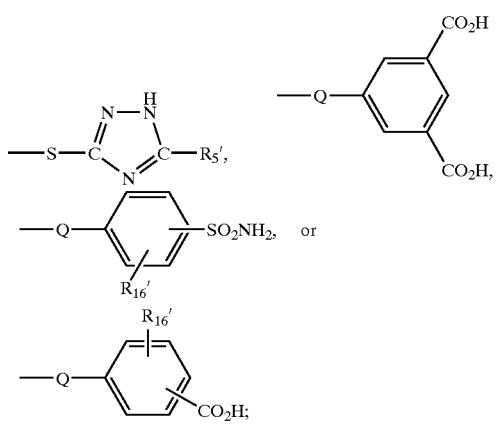

wherein $R_5'$ is selected from the group consisting of hydrogen, $C_1$–$C_6$ alkyl or aryl; $R_{16}'$ is selected from the group consisting of hydrogen, one or two groups selected from $C_1$–$C_6$ alkyl, halogen and $C_1$–$C_6$ alkoxy; Q is selected from the group consisting of —O—, —N($COR_{10}$)—, —N($R_{10}$)—, —S—, —$SO_2$—, —$CO_2$—, $CON(R_{10})$—, $SO_2(R_{10})$—, wherein $R_{10}$ is selected from the group consisting of hydrogen, aryl, $C_3$–$C_8$ cycloalkyl or $C_1$–$C_{10}$ alkyl; $R_{18}$ and $R_{19}$ are independently selected from the group consisting of hydrogen, unsubstituted $C_1$–$C_{10}$ alkyl, substituted $C_1$–$C_{10}$ alkyl, $C_3$–$C_8$ cycloalkyl, $C_3$–$C_8$ alkenyl, $C_3$–$C_8$ alkynyl and aryl or $R_{18}$ and $R_{19}$ may be combined with another element to which they are attached to form a radical Z having the formula

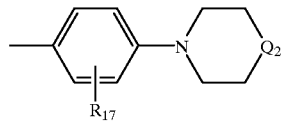

wherein $Q_2$ is selected from the group consisting of a covalent bond, —O—, —S—, —$SO_2$—, —CO—, —$CO_2$—, —N—($C_1$–$C_6$ aryl)-, —N(CO $C_1$–$C_6$ aryl)-, —N($SO_2$ $C_1$–$C_6$ aryl)-, —N(CO aryl)-, or —N($SO_2$ aryl); $R_{20}$, $R_{21}$ and $R_{22}$ are independently selected from the group consisting of hydrogen or $C_1$–$C_6$ alkyl; $R_{23}$ is selected from the group consisting of hydrogen, $C_1$–$C_6$ alkyl, $C_3$–$C_8$ cycloalkyl, heteroaryl or aryl.

47. The composition of claim 26 wherein the light absorbing portion of $A_1$ comprises a residue of at least one diacidic coumarin compounds selected from the group consisting of the structures

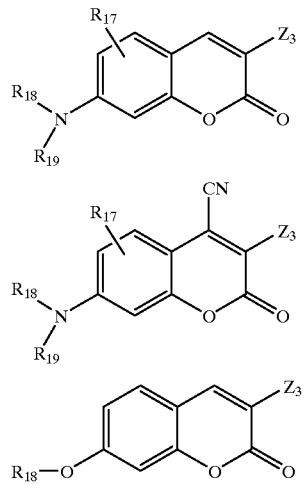

wherein $Z_3$ is selected from the group consisting of cyano, $C_1$–$C_6$ alkoxycarbonyl, $C_1$–$C_6$ alkylsulfonyl, arylsulfonyl, aryl, heteroaryl, formyl, aroyl, $C_1$–$C_6$ alkanoyl or —CH=D, wherein $R_{17}$ is selected from the group consisting of hydrogen, 1–2 groups selected from $C_1$–$C_6$ alkyl, $C_1$–$C_6$ alkoxy, $C_1$–$C_6$ alkylthio, —O $C_2$–$C_6$ alkylene-OH, O $C_2$–$C_6$ alkylene-$C_1$–$C_6$ alkanoyloxy, $C_1$–$C_6$ alkylene-OH, $C_1$–$C_6$ alkylene-$C_1$–$C_6$ alkanoyloxy, halogen, carboxy, $C_1$–$C_6$ alkoxycarbonyl, trifluoromethyl, $NHCOR_{24}$, $NHCO_2R_{24}$, $NHCON(R_{24})R_{25}$, and $NHSO_2R_{25}$, wherein $R_{24}$ is selected from the group consisting of hydrogen, $C_1$–$C_{10}$ alkyl, $C_3$–$C_8$ cycloalkyl or aryl, $R_{25}$ is selected from the group consisting of $C_1$–$C_{10}$ alkyl, $C_3$–$C_8$ cycloalkyl or aryl wherein each $C_1$–$C_{10}$ alkyl group in $R_{24}$ and $R_{25}$ may be further substituted with one or more groups selected from the group consisting of $C_3$–$C_8$ cycloalkyl, aryl, aryloxy, arylthio, $CO_2H$, $CO_2$ $C_1$–$C_6$ alkyl, cyano, hydroxy, succinimido, $C_1$–$C_6$ alkoxy,

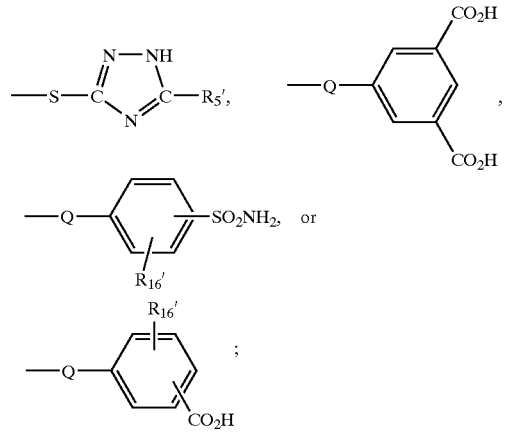

wherein $R_5'$ is selected from the group consisting of hydrogen, $C_1$–$C_6$ alkyl or aryl; $R_{16}'$ is selected from hydrogen or one or two groups selected from $C_1$–$C_6$ alkyl, halogen, and $C_1$–$C_6$ alkoxy; Q is selected from the group consisting of —O—, —N($COR_{10}$)—, —N($R_{10}$)—, —S—, —$SO_2$—, —$CO_2$—, $CON(R_{10})$, $SO_2(R_{10})$—, wherein $R_{10}$ is selected from the group consisting of hydrogen, aryl, $C_3$–$C_8$ cycloalkyl or $C_1$–$C_{10}$ alkyl; $R_{18}$ and $R_{19}$ are independently selected from the group consisting of hydrogen, unsubstituted $C_1$–$C_{10}$ alkyl, substituted $C_1$–$C_{10}$ alkyl, $C_3$–$C_8$ cycloalkyl, $C_3$–$C_8$ alkenyl, $C_3$–$C_8$ alkynyl and aryl or $R_{18}$ and $R_{19}$ may be combined with another element to which they are attached to form a radical Z having the formula

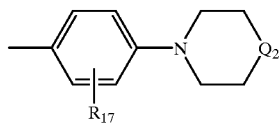

wherein $Q_2$ is selected from the group consisting of a covalent bond, —O—, —S—, —$SO_2$—, —CO—, —$CO_2$—, —N—($C_1$–$C_6$ aryl)-, —N(CO $C_1$–$C_6$ aryl)-, —N($SO_2$ $C_1$–$C_6$ aryl)-, —N(CO aryl)-, or —N($SO_2$ aryl); $R_{20}$, $R_{21}$ and $R_{22}$ are independently selected from the group consisting of or $C_1$–$C_6$ alkyl; $R_{23}$ is selected from the group consisting of hydrogen, $C_1$–$C_6$ alkyl, $C_3$–$C_8$ cycloalkyl, heteroaryl or aryl; wherein D is the residue of an active methylene compound selected from the group consisting of malononitrile, α-cyanoacetic acid esters, malonic acid esters, α-cyanacetic acid amides, α-$C_1$—$C_6$ alkylsulfonylacetonitriles, α-arylsulfonylacetonitriles, α-$C_1$–$C_6$ alkanoylacetonitriles, α-aroylacetonitriles, α-heteroarylacetonitriles, bis(heteroaryl)methanes, 1,3-indanediones, 2-furanones, benzo-2-furanones, naphtho-2-furanones, 2-indolones, 3-cyano-1,6-dihydro-4-methyl-2,6-dioxy (2H)-pyridines, benzo (b) thieno-3-ylidene propane dinitrile-5,5-dioxides, 1,3-bis(dicyanomethylene) indanes, barbituric acid, 5-pyrazolones, dimedone, 3-oxo-2,3-dihydro-1-benzothiophene-1,1-dioxides or aryl-C(CH$_3$) C=C(CN)$_2$, with the proviso that two acidic functional groups containing one acidic hydrogen each, or a functional group containing two acidic hydrogens are present.

48. The composition of claim 44 wherein the light absorbing portion of $A_1$ comprises the residue of at least one bis-azo light absorbing monomer wherein the bis coupling component $Y_1$ is represented by the structure $Z_1$—$L_1$—$Z_2$, wherein $Z_1$ and $Z_2$ are independently selected from the group consisting of

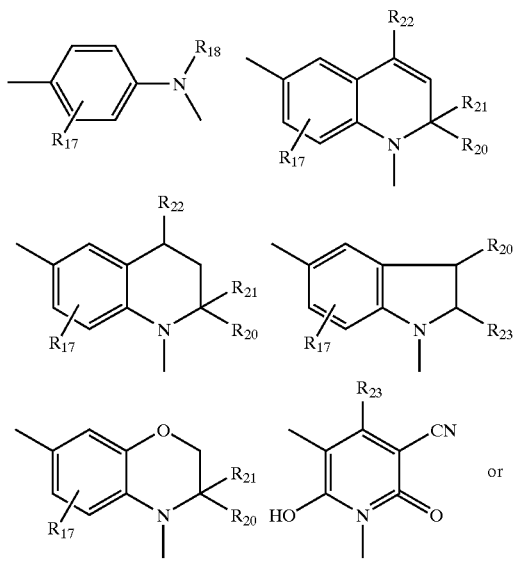

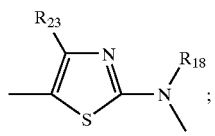

wherein, $L_1$ is bonded to the nitrogen atom of $Z_1$ and $Z_2$; wherein $L_1$ is selected from the group consisting of $C_2$–$C_{12}$ alkylene, $C_3$–$C_8$ cycloalkylene, arylene, $C_1$–$C_4$ alkylene-$C_3$–$C_8$ cycloalkylene-$C_1$–$C_4$ alkylene, $C_1$–$C_4$ alkylene-arylene-$C_1$–$C_4$ alkylene, $C_2$–$C_4$ alkylene-O-arylene-O—$C_2$–$C_4$ alkylene, (—$C_2$–$C_4$ alkylene O—)$_{1-3}$ $C_2$–$C_4$ alkylene, $C_2$–$C_4$ alkylene-S—$C_2$—$C_4$ alkylene, $C_2$–$C_4$ alkylene-$SO_2$—$C_2$–$C_4$ alkylene, $C_2$–$C_4$ alkylene-N($SO_2$ $C_1$–$C_6$ alkyl)-$C_2$–$C_4$ alkylene, $C_2$–$C_4$ alkylene-N($SO_2$ aryl)-$C_2$–$C_4$— alkylene, $C_2$–$C_4$ alkylene-$OCO_2$—$C_2$–$C_4$ alkylene, $C_2$–$C_4$ alkylene-$O_2$C-arylene-$CO_2$—$C_2$–$C_4$ alkylene, $C_2$–$C_4$ alkylene-$O_2$C—$C_1$–$C_{12}$ alkylene-$CO_2$—$C_2$–$C_4$ alkylene, $C_2$–$C_4$ alkylene-$O_2$C—$C_3$–$C_8$ cycloalkylene-$CO_2$—$C_2$–$C_4$ alkylene, $C_2$–$C_4$ alkylene-NHCO—$C_2$–$C_4$ alkylene and $C_2$–$C_4$ alkylene-$NHSO_2$—$C_2$–$C_4$ alkylene; wherein $R_{17}$ is selected from the group consisting of hydrogen, 1–2 groups selected from $C_1$–$C_6$ alkyl, $C_1$–$C_6$ alkoxy, $C_1$–$C_6$ alkylthio, —O $C_2$–$C_6$ alkylene-OH, O $C_2$–$C_6$ alkylene-$C_1$–$C_6$ alkanoyloxy, $C_1$–$C_6$ alkylene-OH, $C_1$–$C_6$ alkylene-$C_1$–$C_6$ alkanoyloxy, halogen, carboxy, $C_1$–$C_6$ alkoxycarbonyl, trifluoromethyl, $NHCOR_{24}$, $NHCO_2R_{24}$, $NHCON(R_{24})R_{25}$, and $NHSO_2R_{25}$, wherein $R_{24}$ is selected from the group consisting of hydrogen, $C_1$–$C_{10}$ alkyl, $C_3$–$C_8$ cycloalkyl or aryl, $R_{25}$ is selected from the group consisting of $C_1$–$C_{10}$ alkyl, $C_3$–$C_8$ cycloalkyl or aryl wherein each $C_1$–$C_{10}$ alkyl group in $R_{24}$ and $R_{25}$ may be further substituted with one or more groups selected from the group consisting of $C_3$–$C_8$ cycloalkyl, aryl, aryloxy, arylthio, $CO_2H$, $CO_2$ $C_1$–$C_6$ alkyl, cyano, hydroxy, succinimido, $C_1$–$C_6$ alkoxy,

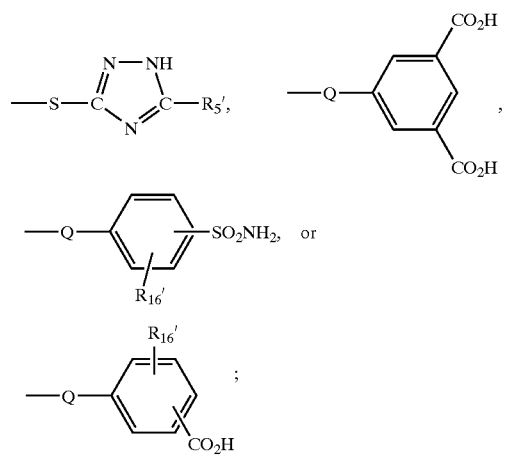

wherein $R_5'$ is selected from the group consisting of hydrogen, $C_1$–$C_6$ alkyl or aryl; $R_{16}'$ is selected from hydrogen or one or two groups selected from $C_1$–$C_6$ alkyl, halogen and $C_1$–$C_6$ alkoxy; Q is selected from the group consisting of —O—, —N(COR$_{10}$)—, —N(R$_{10}$)—, —S—, —SO$_2$—, —CO$_2$—, CON(R$_{10}$), SO$_2$(R$_{10}$)—, wherein R$_{10}$ is selected from the group consisting of hydrogen, aryl, $C_3$–$C_8$ cycloalkyl or $C_1$–$C_{10}$ alkyl; R$_{18}$ is selected from the group consisting of hydrogen, unsubstituted $C_1$–$C_{10}$ alkyl, substituted $C_1$–$C_{10}$ alkyl, $C_3$–$C_8$ cycloalkyl, $C_3$–$C_8$ alkenyl, $C_3$–$C_8$ alkynyl and aryl; R$_{20}$, R$_{21}$ R$_{22}$ are independently selected from the group consisting of or $C_1$–$C_6$ alkyl; R$_{23}$ is selected from the group consisting of hydrogen, $C_1$–$C_6$ alkyl, $C_3$–$C_8$ cycloalkyl, heteroaryl or aryl.

* * * * *

UNITED STATES PATENT AND TRADEMARK OFFICE
CERTIFICATE OF CORRECTION

PATENT NO. : 6,776,930 B2 Page 1 of 1
DATED : August 17, 2004
INVENTOR(S) : Weaver et al.

It is certified that error appears in the above-identified patent and that said Letters Patent is hereby corrected as shown below:

Title page,
Item [73], Assignee, "Eastman Kodak Company" should read -- Eastman Chemical Company --

Signed and Sealed this

Fourteenth Day of December, 2004

JON W. DUDAS
*Director of the United States Patent and Trademark Office*